(12) United States Patent
Krishnan et al.

(10) Patent No.: US 8,494,832 B2
(45) Date of Patent: Jul. 23, 2013

(54) METHOD AND APPARATUS FOR SOFTWARE SIMULATION

(76) Inventors: Sanjeev Krishnan, Bangalore (IN); Sudheendra Hangal, Stanford, CA (US)

( * ) Notice: Subject to any disclaimer, the term of this patent is extended or adjusted under 35 U.S.C. 154(b) by 742 days.

(21) Appl. No.: 12/665,915

(22) PCT Filed: Jun. 18, 2008

(86) PCT No.: PCT/IN2008/000383
§ 371 (c)(1),
(2), (4) Date: Dec. 21, 2009

(87) PCT Pub. No.: WO2008/155779
PCT Pub. Date: Dec. 24, 2008

(65) Prior Publication Data
US 2010/0198799 A1      Aug. 5, 2010

Related U.S. Application Data

(60) Provisional application No. 60/945,192, filed on Jun. 20, 2007.

(51) Int. Cl.
*G06F 9/44*  (2006.01)
*G06F 9/45*  (2006.01)

(52) U.S. Cl.
USPC .............................. 703/22; 717/126; 717/135

(58) Field of Classification Search
USPC ........................... 703/22; 717/135, 144, 126
See application file for complete search history.

(56) References Cited

U.S. PATENT DOCUMENTS

| | | | |
|---|---|---|---|
| 7,490,031 B1 * | 2/2009 | Qiu | 703/22 |
| 2005/0183094 A1 * | 8/2005 | Hunt | 719/315 |
| 2006/0117274 A1 * | 6/2006 | Tseng et al. | 716/1 |

* cited by examiner

*Primary Examiner* — David Silver
*Assistant Examiner* — Andre Pierre Louis
(74) *Attorney, Agent, or Firm* — Rahman LLC

(57) ABSTRACT

A software simulation method and program storage device for software defect detection and obtaining insight into software code is disclosed, where simulation consists of executing target software program code for multiple input values and multiple code paths at the same time, thus achieving 100% coverage over inputs and paths without actually running the target software. This allows simulation to detect many defects that are missed by traditional testing tools. The simulation method runs a plurality of algorithms where a plurality of custom defined and pre-defined rules are verified in target software to find defects and obtain properties of the software code.

52 Claims, 60 Drawing Sheets

METHOD AND APPARATUS FOR SOFTWARE SIMULATION

CROSS-REFERENCE TO RELATED APPLICATION(S)

This application claims priority to PCT application Ser. No. PCT/IN2008/000383, filed Jun. 18, 2008, which claims priority to provisional application Ser. No. 60/945,192 titled "A method and apparatus for software simulation", filed Jun. 20, 2007.

BACKGROUND

1. Technical Field

The embodiments herein generally relate to software simulation, and, more particularly, to use software simulation for software defect detection and software code insight without running or testing the software.

2. Description of the Related Art

Businesses worldwide incur huge losses due to poor software quality. This is because software is too complex and despite significant investment in software testing, a large number of defects remain in software when it is used for mission critical applications. Businesses also spend large amounts of money on maintenance of legacy software which cannot be migrated to more efficient software architectures because of poor understanding of the existing legacy codebase.

Commercial software consists of millions of lines of code and usually has hundreds of inputs, each having billions of possible values, thus leading to an exponential complexity of input combinations and paths through the code, which is impossible to test completely. Existing software testing technologies are unable to handle such complexity as it would take too long too execute all possible combinations. Existing technologies either do syntactic checking of code for trivial defects in localized parts of a program or do not check possible run-time values or support a small number of rules and are not extensible to add more rules.

SUMMARY

Accordingly, in one aspect, embodiments herein provide a method of software simulation of a target software without actually running or testing the target software. The software simulation method comprises of the steps of (a) reading a first set of configuration files that contain details of the code to be simulated, the simulation parameters, and output format; (b) reading a second set of configuration files that contain details of the rules to be applied to the code being simulated; (c) loading rules which describe the expected behavior of the software, the rules being loaded from said configuration files; (d) reading target software program source code and/or binary code; (e) constructing a program model, which is a memory representation of program structure of the target software; (f) attaching the loaded rules to specific nodes in the program model in accordance with the rules; (g) running a plurality of simulation algorithms on the target software program without running the target software, to check for defects and obtain metrics and other attributes of the target software code, the step further comprising: (ga) loading program variables and objects from the program model to be used for performing arithmetic, logical and pointer operations as specified in the source code of the target software; (gb) storing resulting values in the program model; (gc) applying language specific rules to check for any violations; (gd) invoking rules loaded from the configuration files, and (ge) reporting defects on program structure and variable values violating the requirements of the rules; (h) generating an output with defects and other results reported by the plurality of algorithms; and (i) displaying the output on an interface.

In a preferred embodiment, the target programs being simulated are written in Java.

In a preferred embodiment, the target programs being simulated are written in Javascript.

In a preferred embodiment, the configuration files containing rules are defined in XML.

Embodiments herein provide plurality of algorithmic and heuristic solutions to enable software simulation for automated software defect detection and correction, performing such simulation globally for the whole or part of a large target software program accurately, reducing the number of false alarms reported, supporting common programming language constructs such as object-orientation and prototypes, reducing the amount of memory required for performing simulations, reducing the amount of computation involved in simulation, detecting a plurality of classes of defects including reliability/security/concurrency/resource management/framework usage, allowing user to specify application-specific classes of defects for detection during simulation at specific points in the target program, performing incremental simulations or simulations which co-relate defects across multiple versions of the target program, defining project configuration templates, auto generation of rules using dynamic analysis and simulation, unified simulation and testing architecture which uses concrete values and rules from test frameworks for simulation and result values from simulation for more thorough testing, user-friendly interface for viewing simulation results, prioritized error reporting, and automatically correcting certain types of defects reported by simulation, applying simulation for the purpose of software quality assessment and increasing efficiency of maintenance, and applying simulation for the purpose of detecting errors in SQL queries.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Definitions

Figure 1:
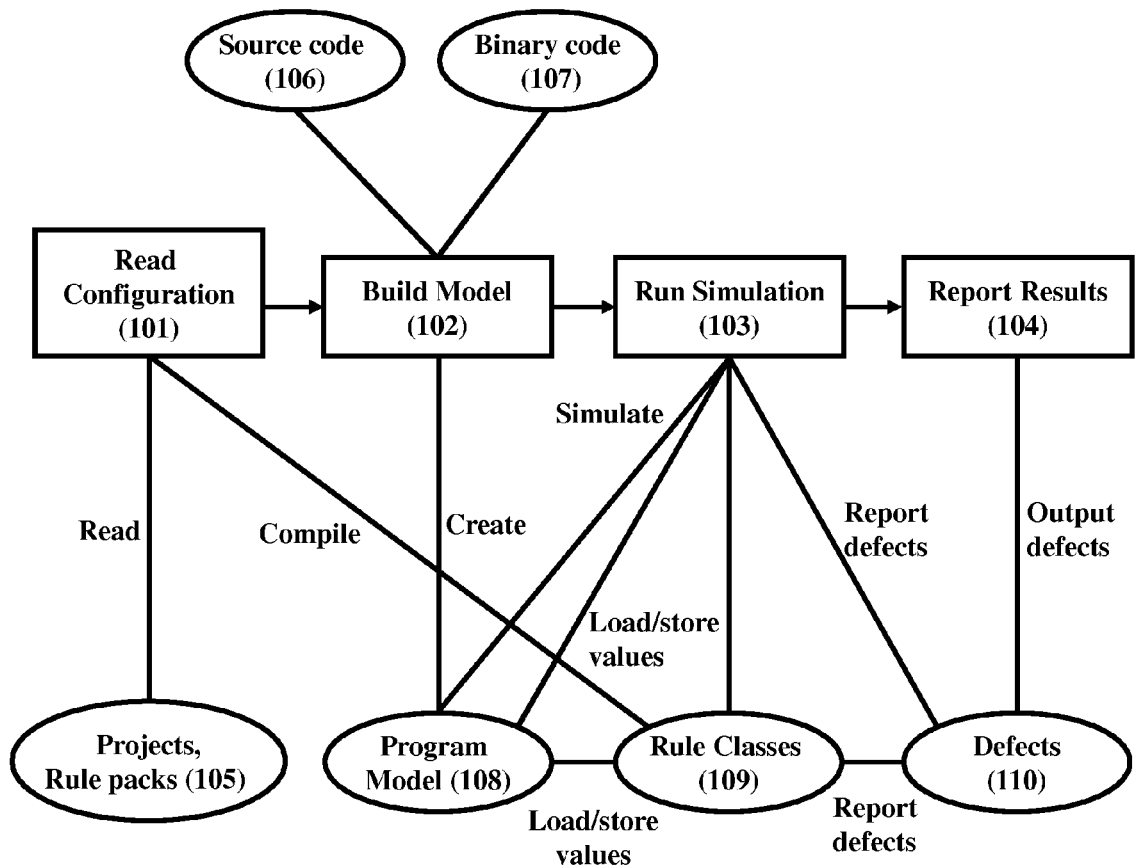
FIG. 1 is a high level software architecture diagram.

Software Simulation: is the process of exercising all operations on all paths through the code of a target software program, without actually executing the program, computing possible run-time values of variables in the program, and applying rules to detect defects in the program or to gain insight about the program.

Rule: A rule is a specification of expected behavior of a software program. A rule may be specific to an application or general purpose (applying to all applications using a particular programming language or a particular programming library/framework). A rule may be specified using a script or as an annotation.

Defect: A defect is any error, issue, or non-conformance with rules of programming found in the target software during the process of software simulation. Other synonymous words used are "error", "bug", "problem" and "issue".

Call graph: The data structure which is conventionally used to represent the caller-callee relationship between methods in the program.

Flow graph: The data structure conventionally used to represent control flow within a method body.

DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve software simulation of a target software without actually running or testing the target software. Referring now to the drawings, and more particularly to FIGS. 1 through 51, where similar reference characters denote corresponding features consistently throughout the figures, there are shown preferred embodiments.

Software Architecture

FIG. 1 shows the high level software architecture diagram for simulation of a target software program. The figure shows the broad steps involved in the simulation process using square blocks and the entities used in the process of simulation in oval shaped blocks. The steps of simulation comprise of reading configuration files (101), building a program model (102), running simulation algorithms on a target software (103), and reporting results in the form of various defects found in the target software in a prioritized manner (104). The configuration details of target software program and custom rules to be used for simulation are found in a set of configuration files (105). After loading the configuration, the simulation process involves loading the source code (106) and/or object code (107) to build a program model (108). Further, simulation algorithms are run on the target software using the program model built by attaching various nodes of the program model with rules appropriately as defined in the rules loaded. Apart from custom rules loaded, various predefined rules that are defined in rule classes are also loaded which are used to verify if the target software program code conforms to the programming standards of the language used in writing the program. Upon completion of the simulation, the output is presented with the defects identified in the target software.

Method of Software Simulation

Figure 2:
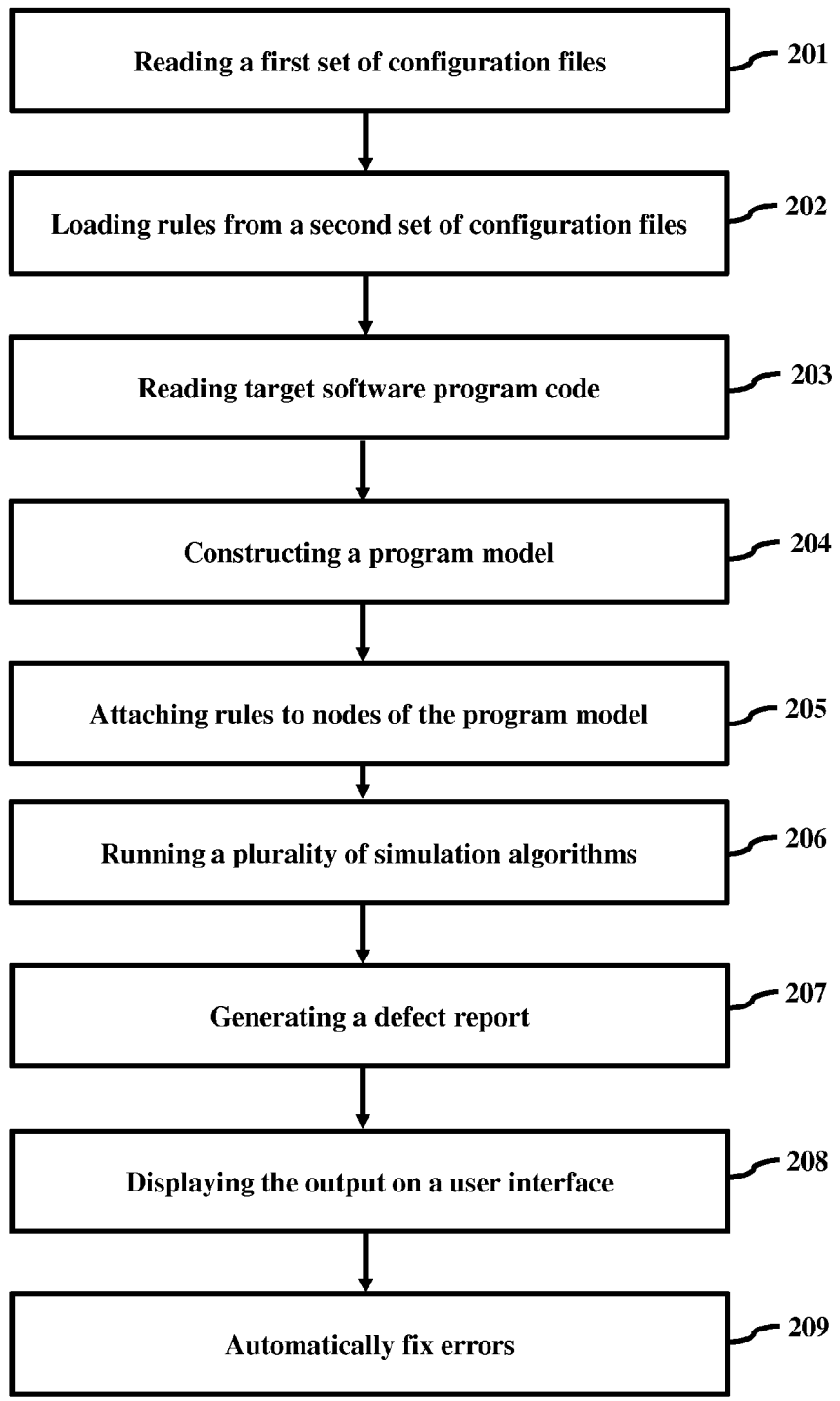
FIG. 2 is a flow chart illustrating the method of software simulation according to an embodiment herein.

FIG. 2 shows the flow chart illustrating the method of software simulation. The method comprises of the steps of (a) reading a first set of configuration files that contain details of the code to be simulated, the simulation parameters, and output format (201); (b) reading a second set of configuration files that contain details of the rules to be loaded and applied to the code being simulated and loading rules (including annotations), the rules being loaded from said configuration files (202); (d) reading target software program source code and/or binary code (203); (e) constructing a program model, which is a memory representation of program structure of the target software (204); (f) attaching the loaded rules to specific nodes in the program model in accordance with the rules (205) wherein the algorithms for attaching the loaded rules include the algorithms as described in FIGS. 33 and 35; (g) running a plurality of simulation algorithms on the target software program without running the target software to check for defects, the step further comprising (206); (h) generating an output with defects reported by the plurality of algorithms (207); and (i) displaying the output on an interface (208) using algorithms which includes the algorithm as described by FIG. 46. The errors are automatically fixed (209) using algorithms which includes the algorithm as described by FIG. 47.

Reading a First Set of Configuration Files

Figure 3:
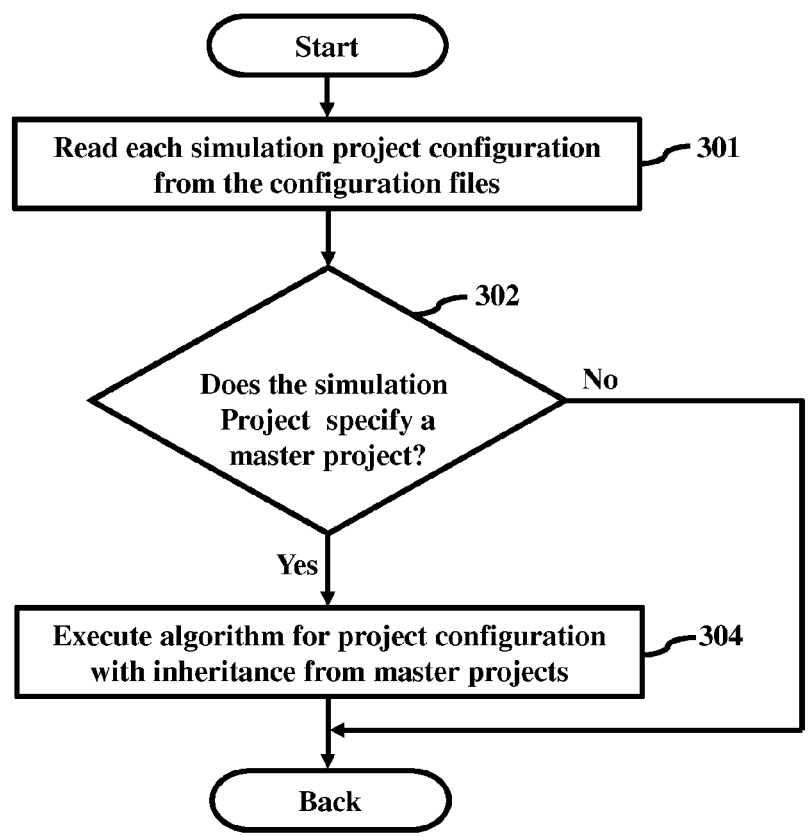
FIG. 3 illustrates a method of simulation project configuration according to an embodiment.

FIG. 3 illustrates a method according to an embodiment for reading (201) a first set of configuration files (301). If the simulation project specifies a master project (302) the algorithm for project configuration with inheritance form master projects is executed (303).

Constructing a Program Model

Figure 4:
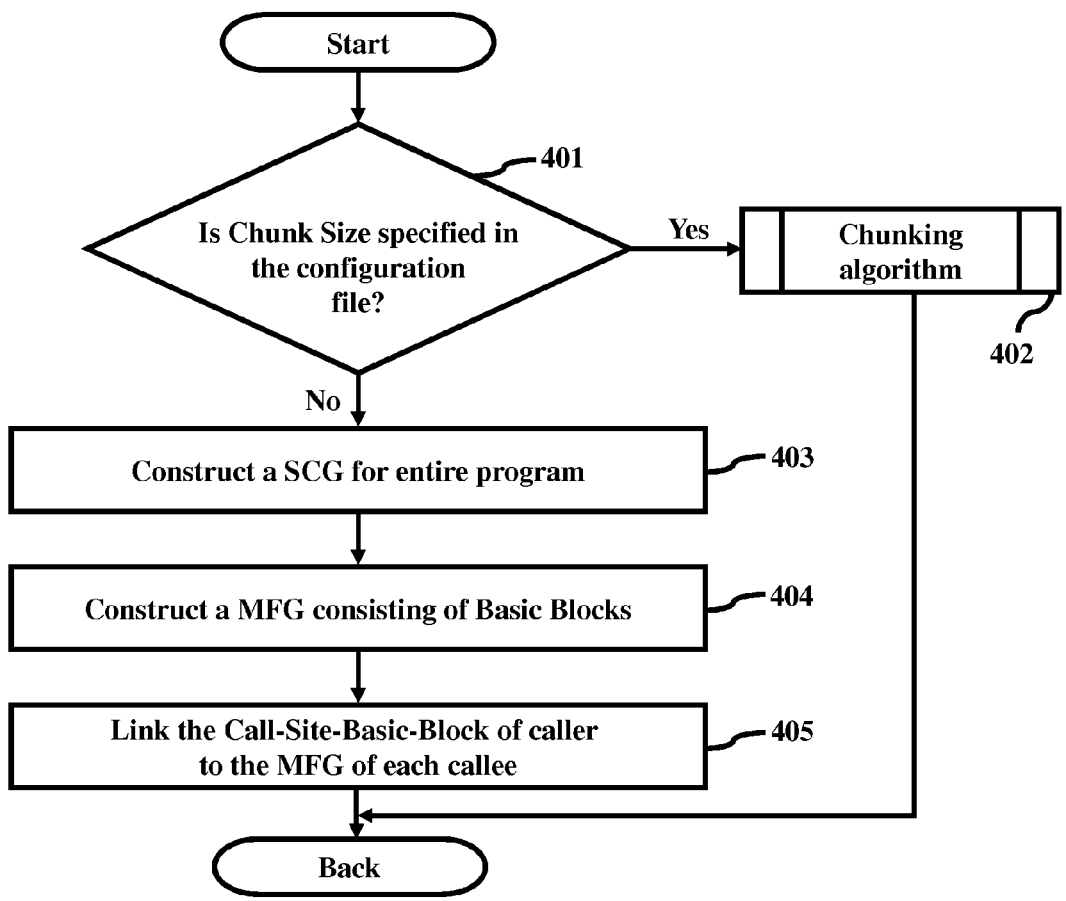
FIG. 4 illustrates a method of constructing a program model according to an embodiment.

FIG. 4 illustrates a method of constructing a program model (204) according to an embodiment wherein if the chunk size is specified in the configuration file (401), an algorithm for chunking is executed which includes but is not limited to the chunking algorithm described in FIG. 19. If the chunk size is not specified in the configuration file, a Simulation Call Graph (SCG) for entire program is constructed (403). Further, for each method in each class to be simulated, a Method Flow Graph (MFG) consisting of Basic Blocks is constructed (404) and for each call site node in SCG, the Call-Site-Basic-Block of caller is linked to the MFG of each callee (405)

Generating a Defect Report

Figure 5:
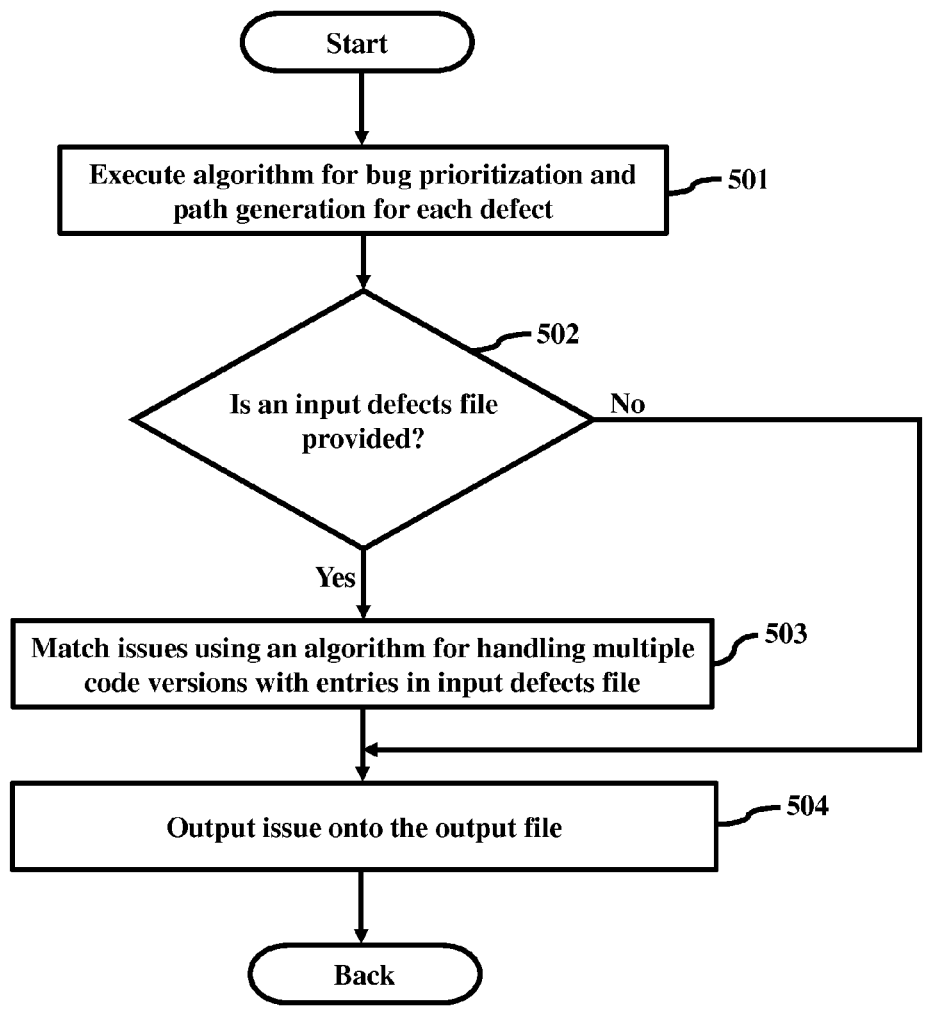
FIG. 5 illustrates a method of defect prioritization and handling multiple code versions according to an embodiment herein.
Figure 38:
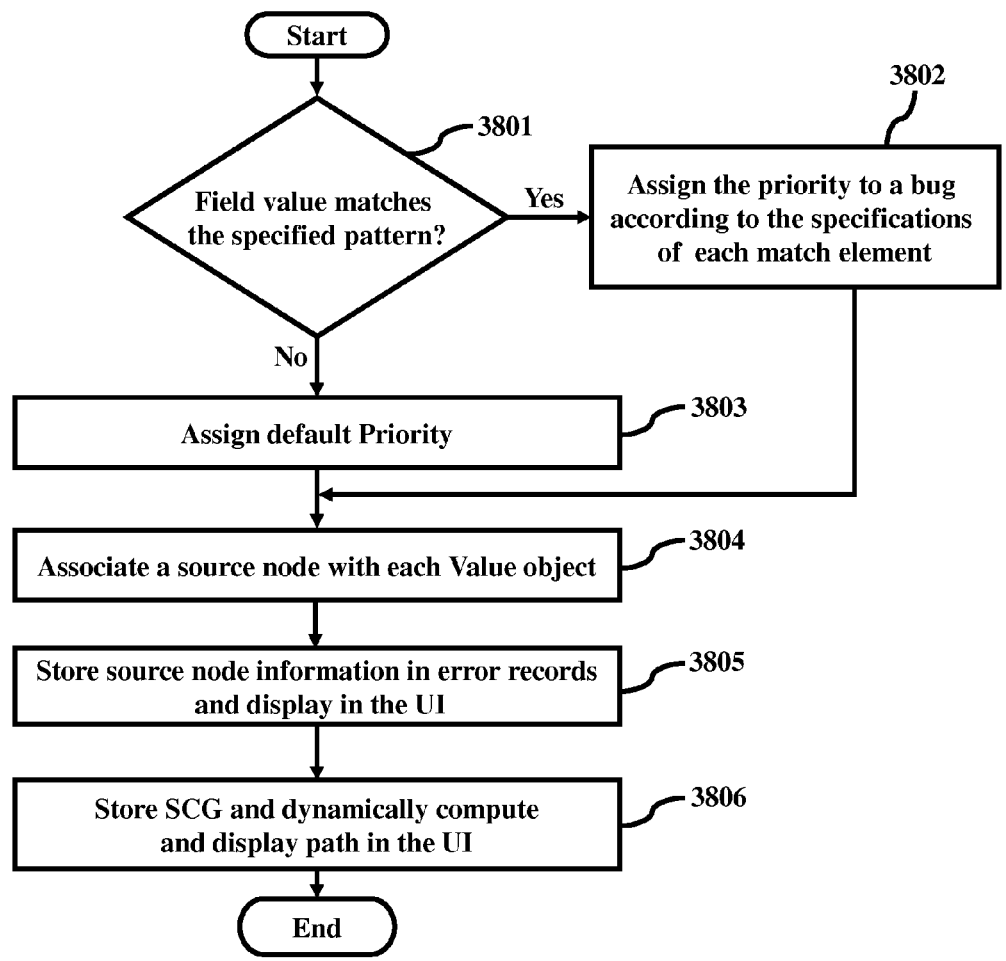
FIG. 38 illustrates a method for bug prioritization policies and path generation according to an embodiment herein.

FIG. 5 illustrates a method according to an embodiment wherein an algorithm for bug prioritization and path generation for each defect (207) is executed (501) wherein the algorithm includes the algorithm for bug generation policies and path generation as described in FIG. 38. If the input defects file is provided (502), the issues are matched using an algorithm for handling multiple code versions with entries in input defects file (503) and the issue is output onto the output file (504)

Running Simulation Algorithm

Figure 6:
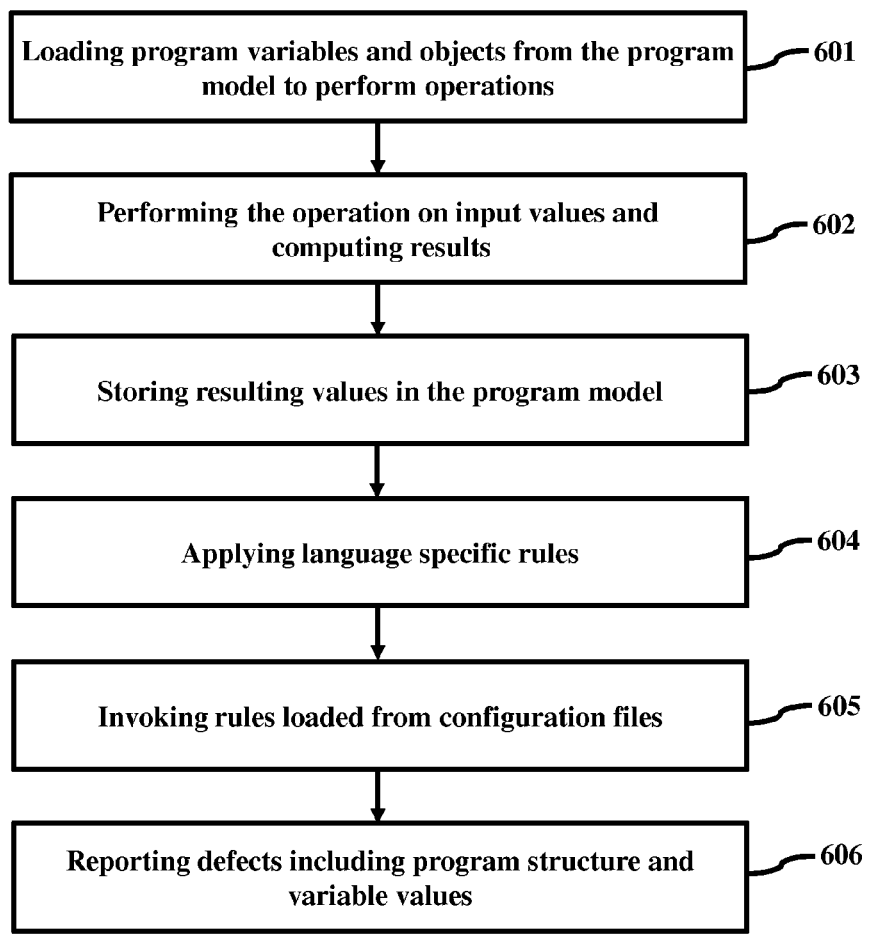
FIG. 6 illustrates a method of performing the simulation according to an embodiment.
Figure 7A:
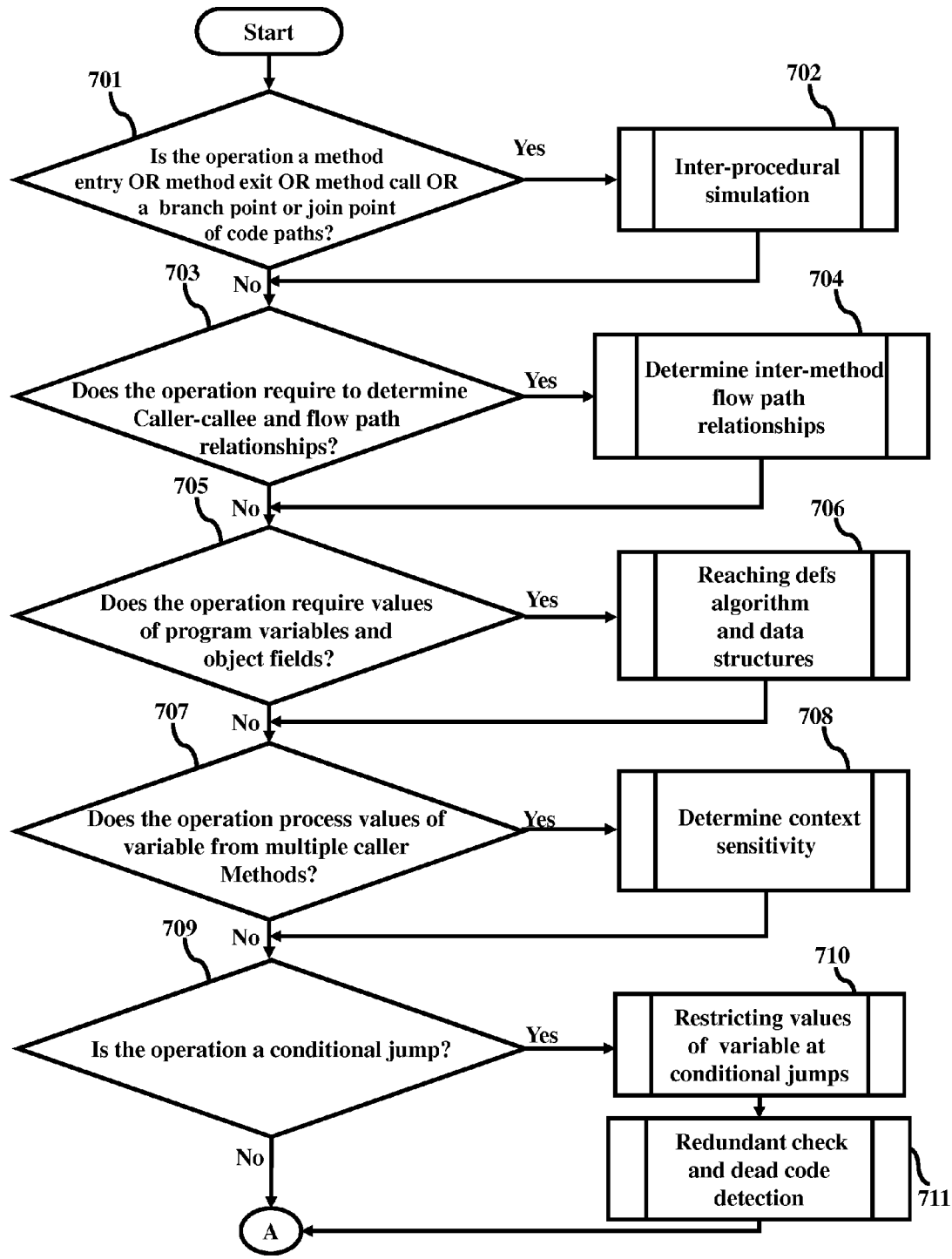
FIGS. 7A through 7E are continuing flow charts illustrating the method of software simulation to be applied to each operation and statement in the target program according to an embodiment herein.
Figure 7B:
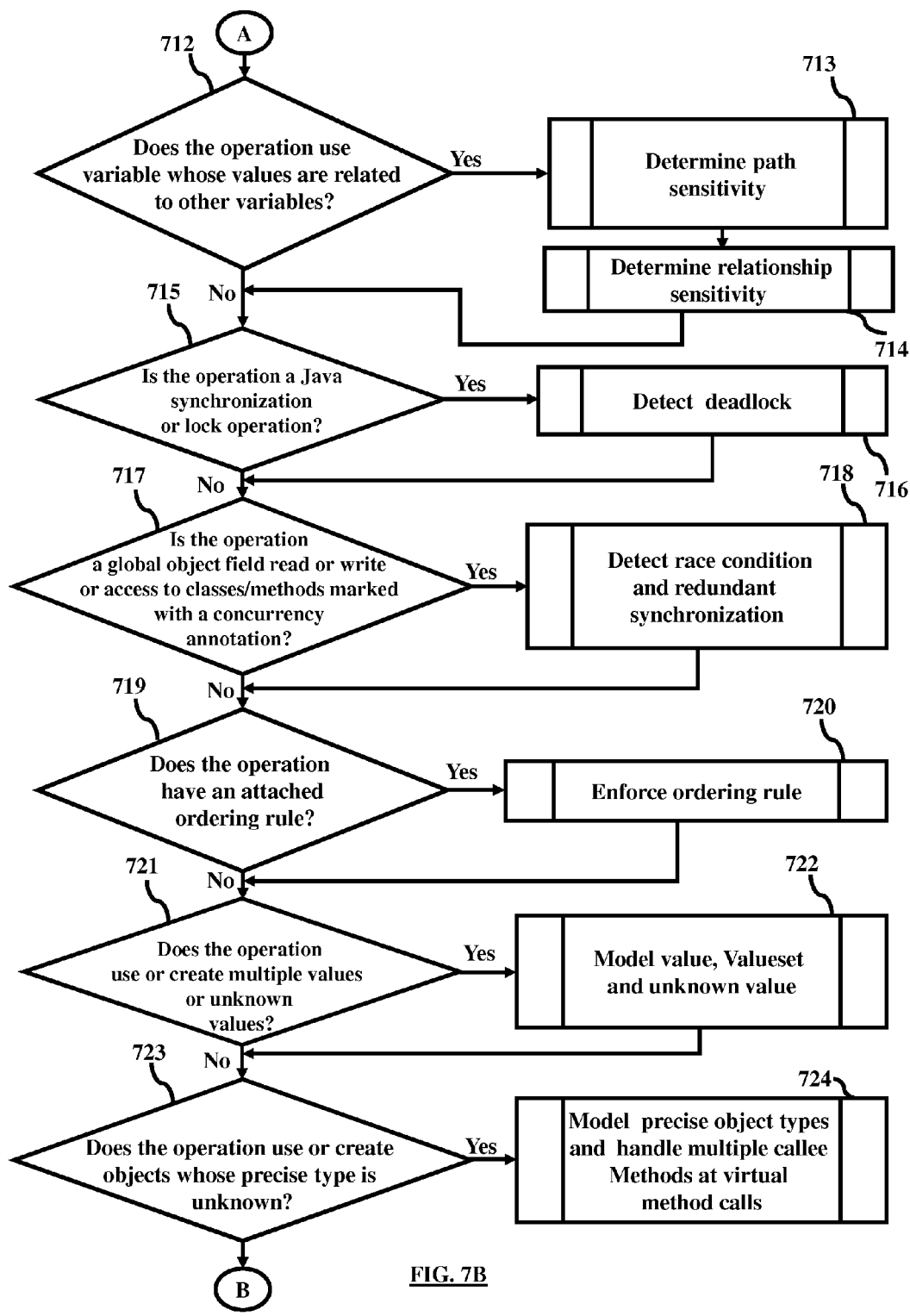
Figure 7C:
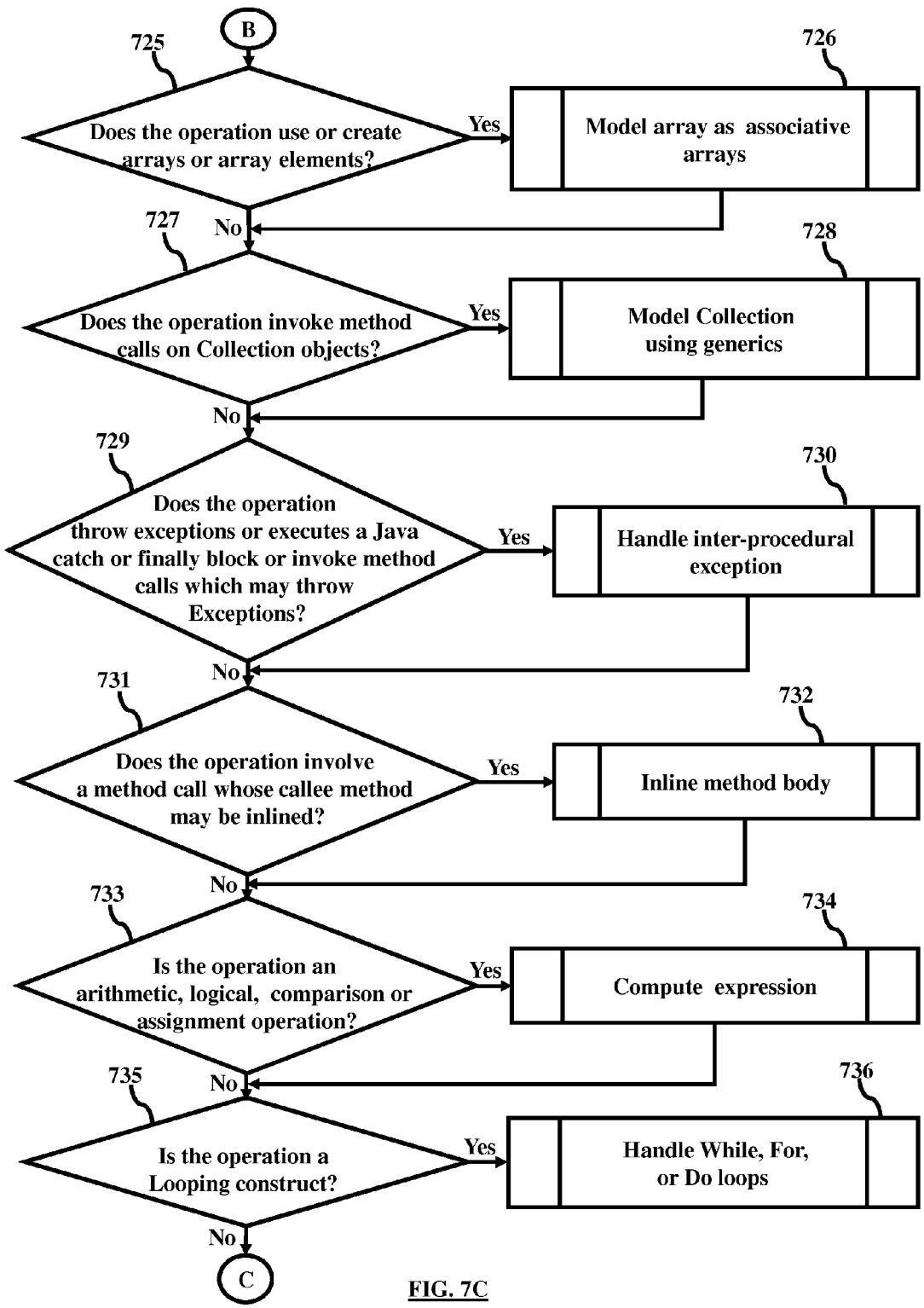
Figure 7D:
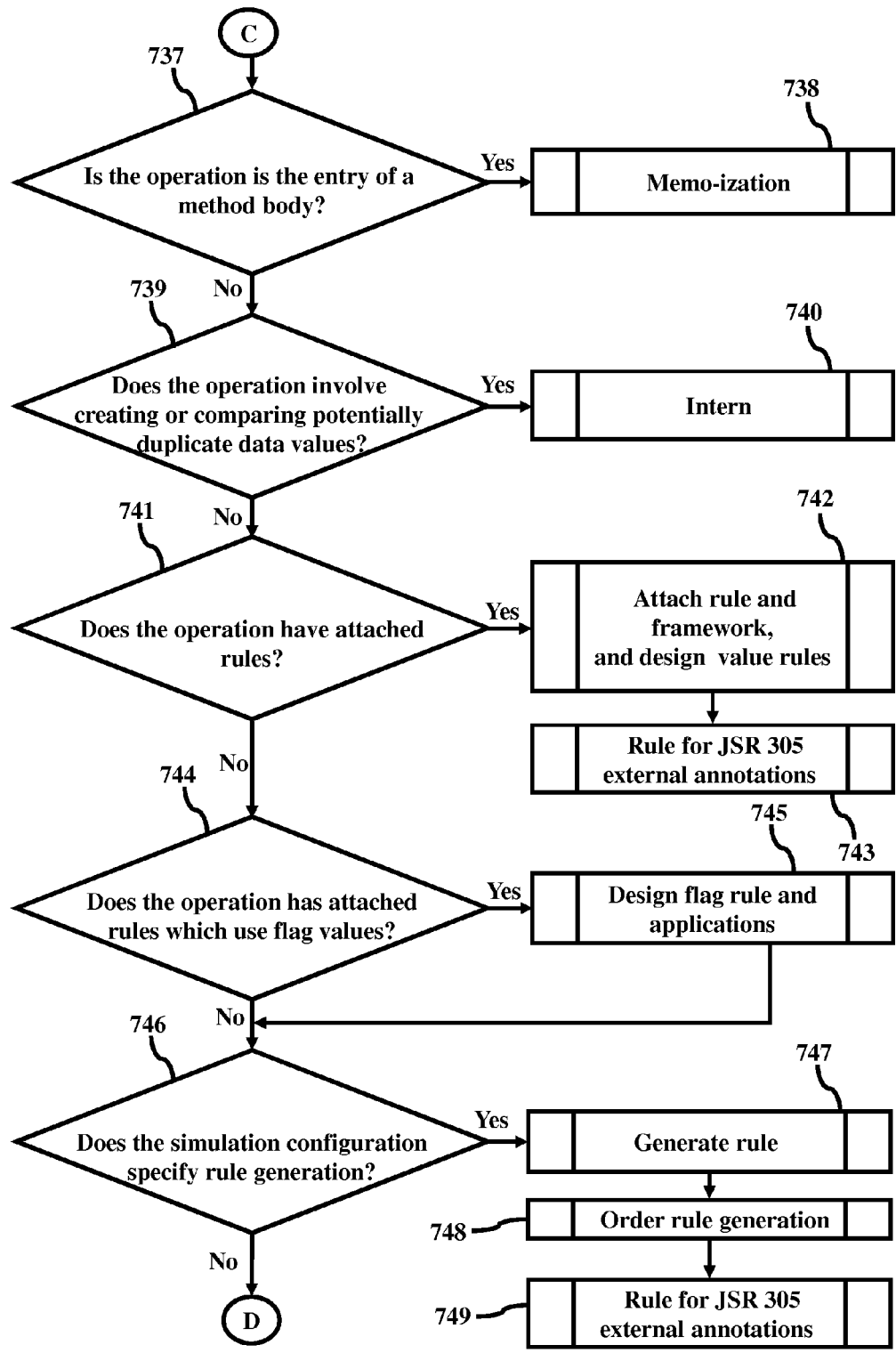
Figure 7E:
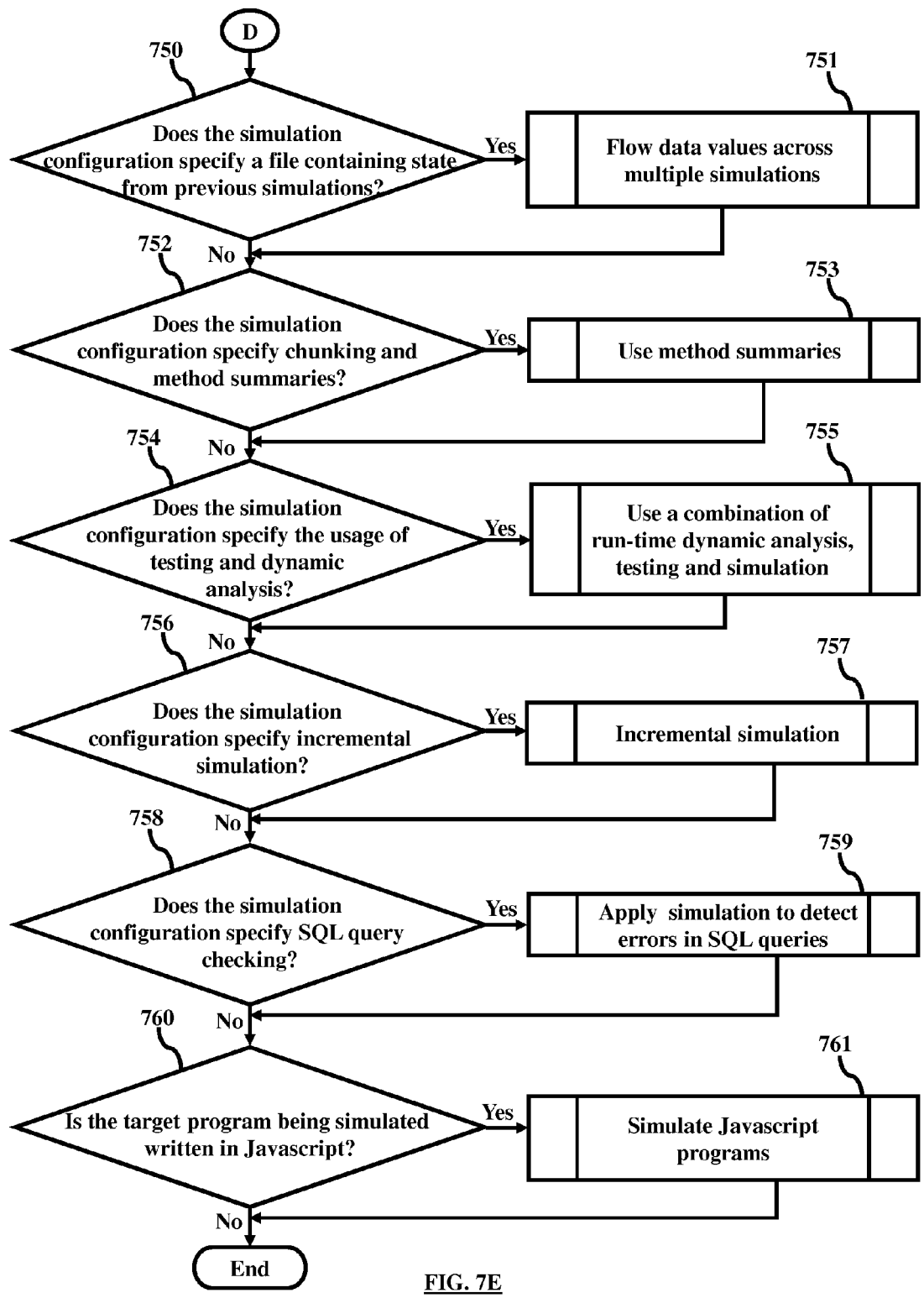

The step of running simulation algorithms further comprises of steps illustrated in FIG. 6. The steps are loading the input values of program variables and objects from the program model to be used for performing arithmetic, logical and pointer operations as specified in the source code of the target software (601); performing the computation using the input values (602); storing resulting values in the program model (603); applying language specific rules to check for any violations (604); invoking rules loaded from the configuration files (605); and reporting defects on program structure and variable values which violate the requirements of the rules (606).

The process of simulation involves various problems. According to a preferred embodiment attends to these problems through algorithmic and heuristic approaches. The various problems and their solutions are enlisted according to category of problems.

Simulation Process

Figure 9:
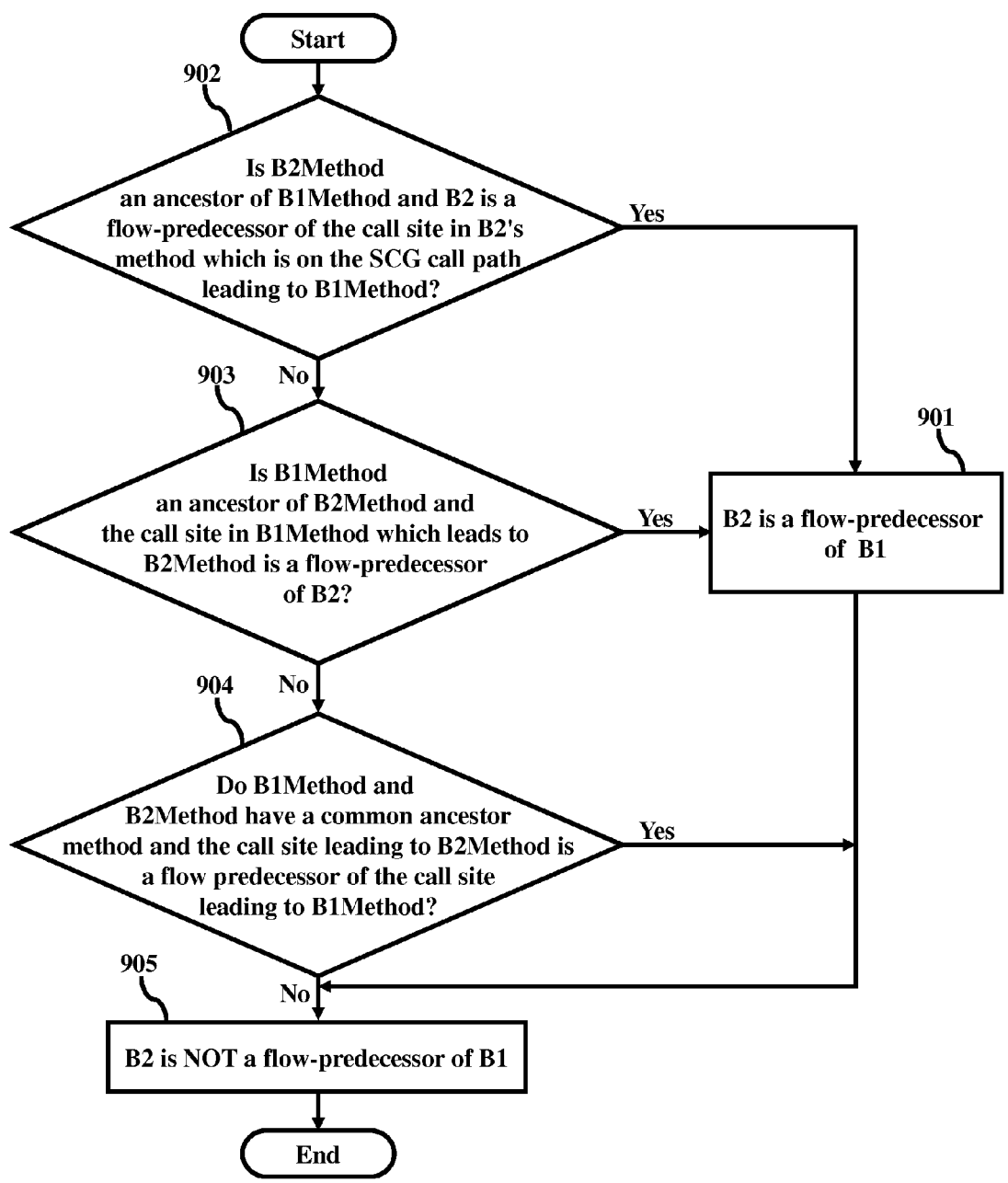
FIG. 9 illustrates the denotation of the flow-predecessor according to an embodiment herein, and is a subflow detailing the step 704 in FIG. 7A.
Figure 10:
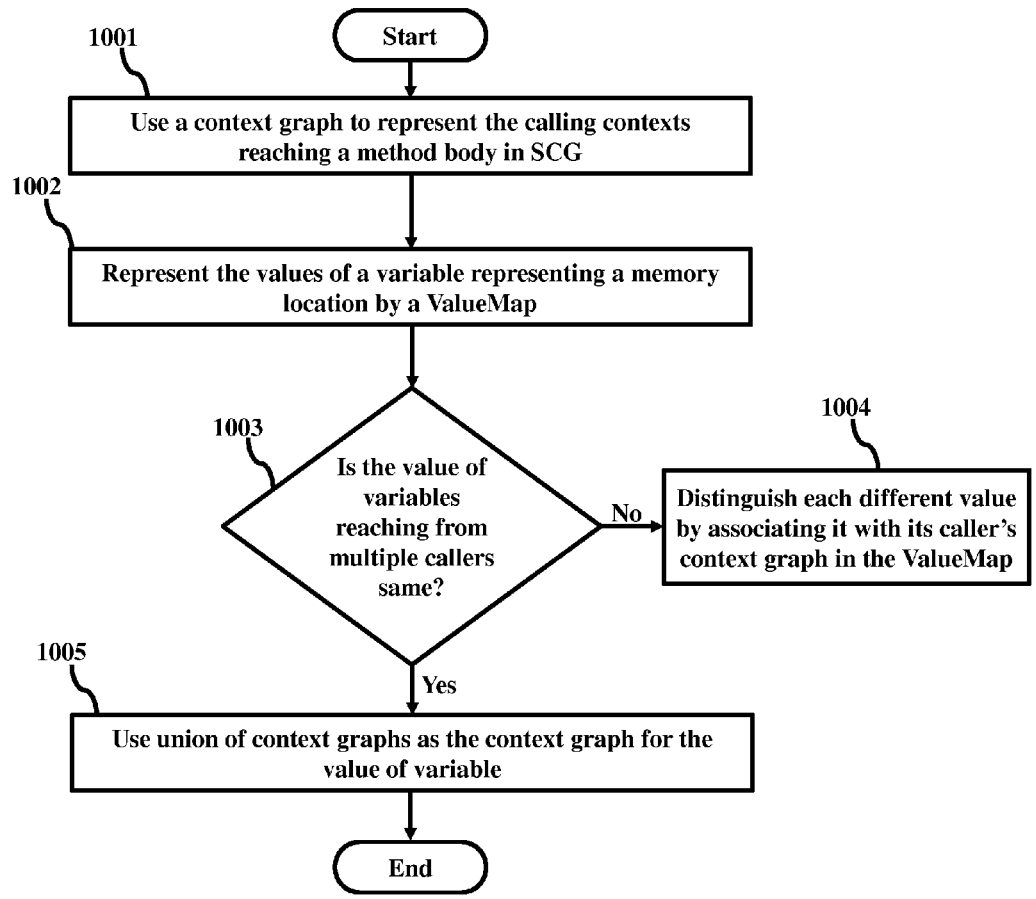
FIG. 10 illustrates the context sensitivity algorithms and data structures according to an embodiment herein, and is a subflow detailing the step 708 in FIG. 7A.
Figure 11A:
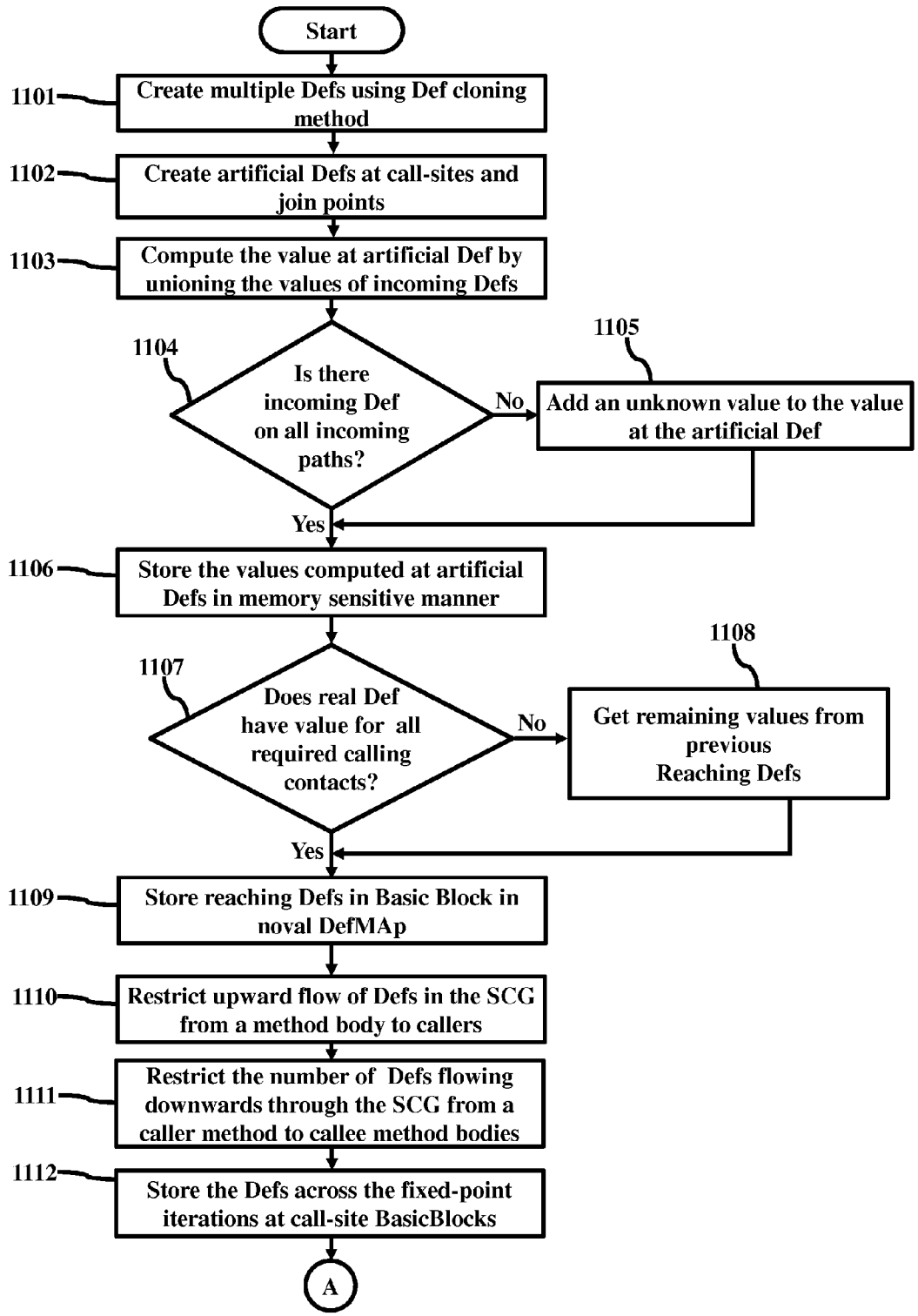
FIGS. 11A and 11B are continuing flow charts illustrating a method to provide a def cloning method according to an embodiment herein, and is a subflow detailing the step 706 in FIG. 7A.
Figure 11B:
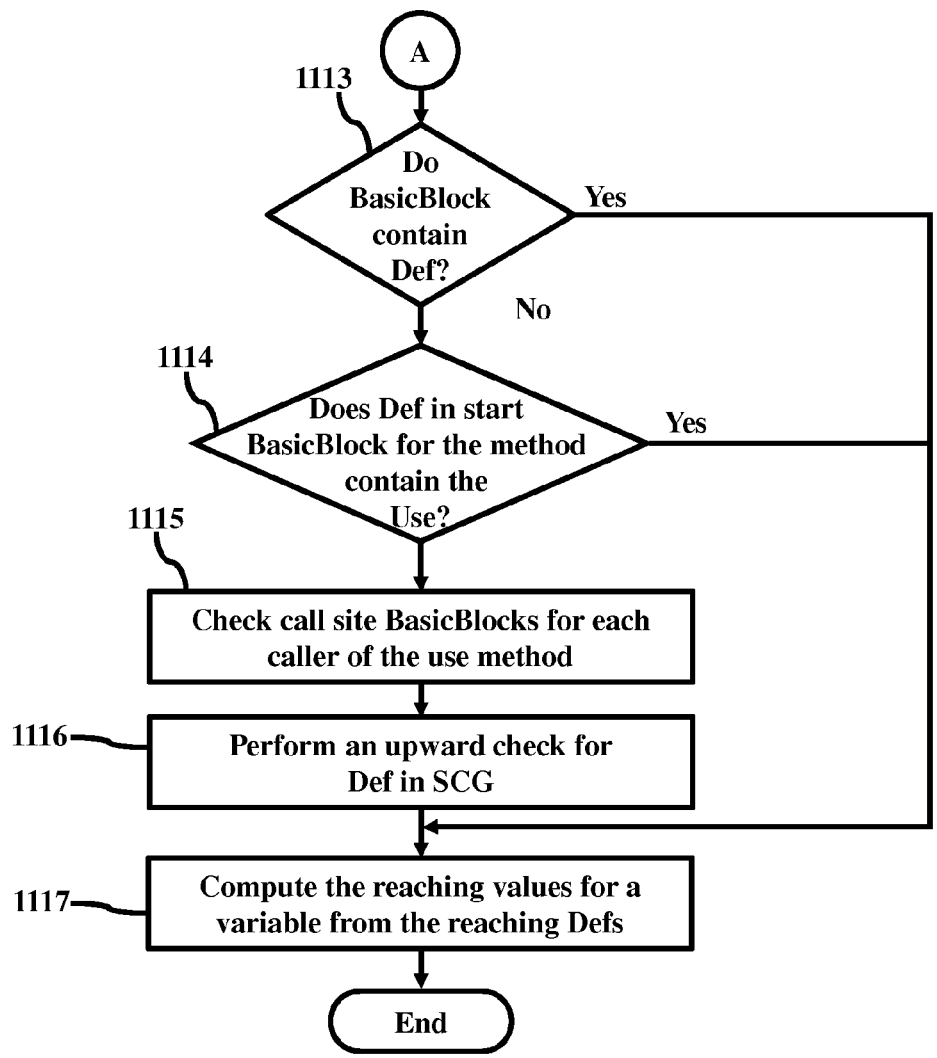
Figure 12:
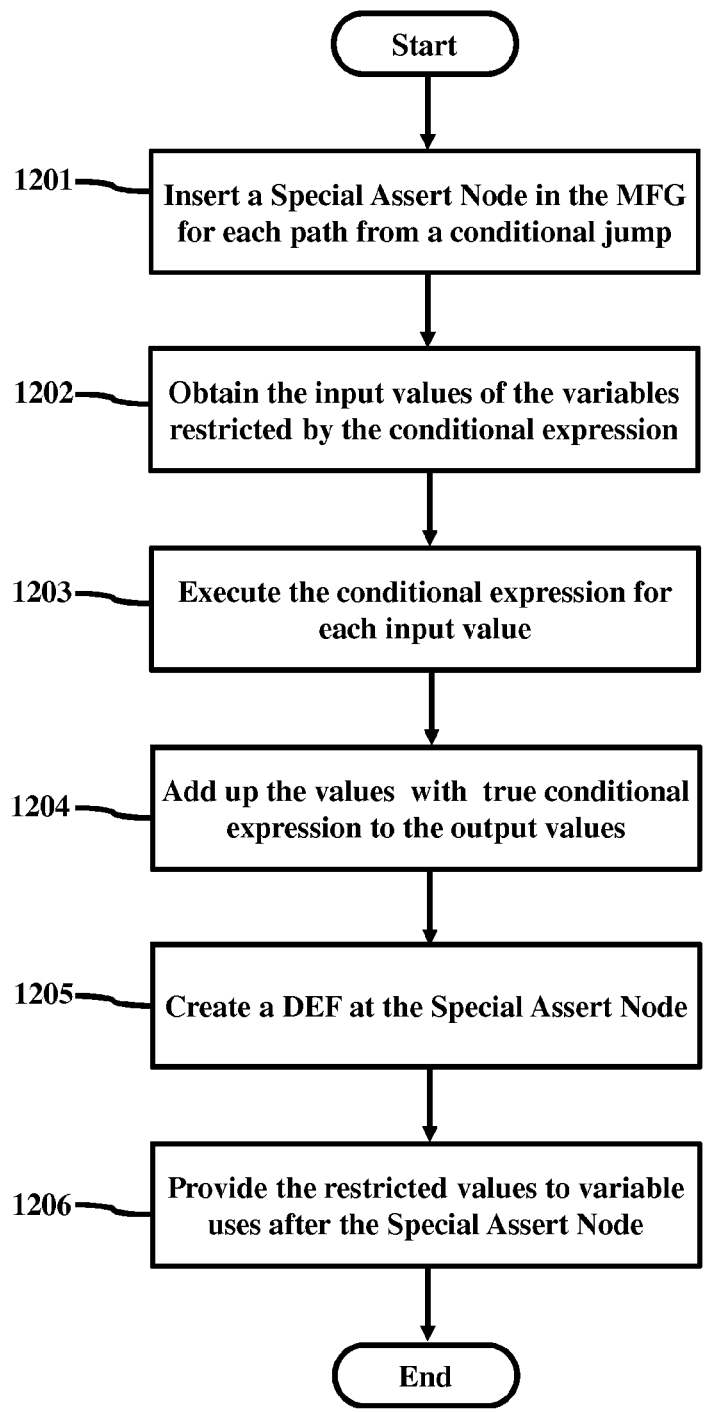
FIG. 12 illustrates a method to for restricting values of variables at conditional jumps according to an embodiment herein, and is a subflow detailing the step 710 in FIG. 7A.
Figure 29:
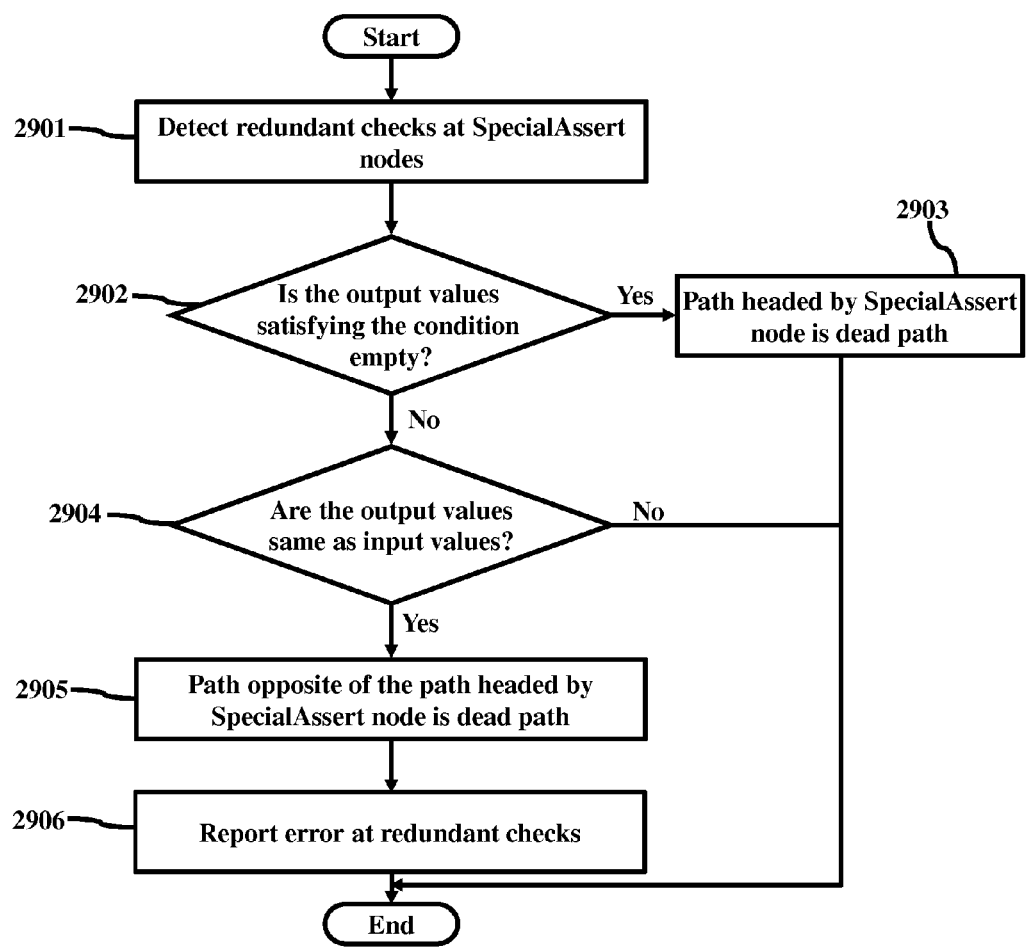
FIG. 29 illustrates a method for redundant check and dead code detection according to an embodiment herein, and is a subflow detailing the step 711 in FIG. 7A.

FIGS. 7A through 7E are continuing flow charts illustrating the process of simulation involved for various problems. According to various embodiments, if the operation involves a method wherein the method is involves a single or a plurality of methods for entry, exit, call, or branch point or join point of code paths (701), then an algorithm for inter-procedural simulation, which includes the algorithm illustrated by FIGS. 8A through 8C (para 0028), is invoked (702). If the operation requires to determine inter-method flow path relationships (703), the algorithm to determine inter-method flow path relationship is invoked (704) wherein the algorithm includes the algorithm and data structures to determine inter-method flow path relationships as illustrated by FIG. 9 (para 0042). If the operation requires values of program variables and object fields (705), the algorithm to determine accurate Reaching defs and data structures is invoked (706) wherein the algorithm fir reaching defs and data structures includes the algorithm as illustrated by FIGS. 11A and 11B (para 0055). If the operation process values of variable from multiple caller methods (707), the algorithm to determine context sensitivity (708) is accessed wherein the algorithm includes the algorithm for context sensitivity and data structures as illustrated by FIG. 10 (para 0046). If the operation is a conditional jump (709), the algorithm to restrict values of variable at conditional jump is used (710) wherein the algorithm includes the algorithm to restrict values of variable at conditional jumps as illustrated by FIG. 12 (para 0063) and redundant check and dead code is detected by the appropriate algorithm (711) which includes the algorithm as illustrated by FIG. 29. If the operation uses a variable whose values are related to other variables (712), the path sensitivity is determined (713) using algorithms which includes the algorithm illustrated by FIG. 13 (para 0067); and the relationship sensitivity is determined (714) by algorithms which includes the algorithm as illustrated by FIG. 14 (para 0072). If the operation is a Java synchronization or lock operation (715), the deadlock is detected (716) by algorithms which includes the algorithm illustrated by FIG. 15 (para 0079). If the operation is a global object field read, write or access to classes/methods is marked with a concurrency annotation (717), the race condition and redundant synchronization is detected (718) by algorithms which includes the algorithm as illustrated by FIG. 16 (para 0085). If the operation has an attached ordering rule (719), the ordering rule is enforced (720) by algorithms which includes the algorithm illustrated by FIG. 18 (para 0098). If the operation uses or creates multiple values or unknown values (721), the algorithm to determine the Model value, Valueset and unknown value is invoked (722) wherein the algorithm includes the algorithm illustrated by FIG. 20 (para 0114). If the operation use or create objects whose precise type is unknown (723), the algorithm to model precise object types and handle multiple callee methods at virtual method calls (724) is used wherein the algorithm includes the algorithm illustrated by FIG. 21 (para 0120). If the operation uses or creates arrays or array elements (725), the algorithm to model array as associative array is used (726) wherein the algorithm includes the algorithm illustrated by FIG. 22 (para 0125). If the operation invokes method calls on Collection objects (727), the algorithm to model Collection using generics is used (728) wherein the algorithm includes the algorithm illustrated by FIG. 23 (para 0183). If the operation throws exceptions or executes a Java catch or finally blocks or invokes method calls which may throw exceptions (729), the algorithm to handle inter-procedural exception is used (730) wherein the algorithm includes the algorithm illustrated by FIG. 25 (para 0193). If the operation involves a method call whose callee method may be inlined (731), the algorithm to inline method body (732) is used wherein the algorithm includes the algorithm illustrated by FIG. 26 (para 0197). If the operation is an arithmetic, logical, comparison or assignment operation (733), the algorithm to compute the expressions is used (734) wherein the algorithm includes the algorithm illustrated by FIG. 27 (para 0201). If the operation a looping construct (735), the algorithm to handle the looping constructs which include while, for, or do loops is invoked (736) wherein the algorithm includes the algorithm illustrated by FIG. 30 (para 0216). If the operation is the entry of a method body (737), the algorithm to memo-ization algorithm is used (738) wherein the algorithm includes the algorithm illustrated by FIG. 31 (para 0221). If the operation involves creating or comparing potentially duplicate data values (739), the interning algorithm (740) is used wherein the algorithm includes the algorithm illustrated by FIG. 32 (para 0225). If the operation has attached rules (741), the algorithms to attach rule and framework, design value rules (742) and to frame rules for JSR 305 external annotations are invoked (743) wherein the algorithm to attach rule and framework is illustrated by FIG. 33 (para 0178). If the operation has attached rules which use flag values (744), the algorithm to design flag rule and applications (745) is used wherein the algorithm includes the algorithm illustrated by FIG. 35. If the simulation configuration specifies rule generation (746), the algorithms to generate rules (747) wherein the algorithm includes the algorithm illustrated by FIG. 36 (para 0189); algorithm to order rule generation (748) wherein the algorithm includes the algorithm illustrated by FIG. 37 (para 0195); and to an algorithm to frame rules for JSR 305 external annotations (749) wherein the algorithm includes the algorithm illustrated by FIG. 44 (para 0227) are invoked. If the simulation configuration specifies a file containing a state from previous simulations (750), the algorithm to flow data values across multiple simulations is used (751) wherein the algorithm includes the algorithm illustrated by FIG. 39 (para 0206). If the simulation configuration specifies chunking and method summaries (752), the algorithm to use method summaries (753) is invoked wherein the algorithm includes the algorithm illustrated by FIG. 40 (para 0212). If the simulation configuration specifies the usage of testing and dynamic analysis (754), the algorithm to use a combination of run-time dynamic analysis, testing and simulation (755) is invoked wherein the algorithm includes the algorithm illustrated by FIGS. 43A and 43B (para 0224). If the simulation configuration specifies incremental simulation (756), the algorithm to simulate incrementally (757) is used wherein the algorithm includes the algorithm illustrated by FIG. 45 (para 0230). If the simulation configuration specifies SQL query checking (758), the algorithm to apply simulation to detect errors in SQL queries (759) is used wherein the algorithm includes the algorithm illustrated by FIG. 50 (para 0247). If the target program being simulated is written in Javascript (760), the algorithm to simulate Javascript programs (761) is used as described herein.

Inter-Procedural Simulation

According to an embodiment, there is provided a method to handle the inter-procedural simulation in the presence of inheritance, cycles in the flow graph and recursive cycles wherein the problems to satisfy the requirements and the solutions are as described herein.

Problem:

The Simulation Architecture does a global simulation of the whole program across program units (methods/functions, classes, source files, packages and modules) wherein the key problems can include:

i. Execution of multiple methods at a call site when the called object may be of different types in a type inheritance hierarchy.
 ii. Execution of the program when it has recursive cycles which leads to loops in the call graph. Further, a naïve algorithm which does a depth-first traversal over the call graph will execute forever.
 iii. Execution of the program when a method is called from many call sites. A depth-first traversal over all paths in the call graph would take too long, because a large program could have over $10^{15}$ acyclic paths (calling contexts) through the call graph.
 iv. Execution of the program when it has decision symbol in the call graph leading to loops in the program flow graph, e.g. A→B and A→C→B, (where A, B, C are methods, and A calls C after it calls B in its flow graph), in which case a simple topological traversal will deadlock because B cannot execute until C executes, and C cannot execute because the call site for C in A's body is not reached until B finishes execution.
 v. Optimization of the order in which methods are executed to minimize the simulation time.
 vi. Execution of a flow graph in the presence of branches and joins.

Figure 8A:
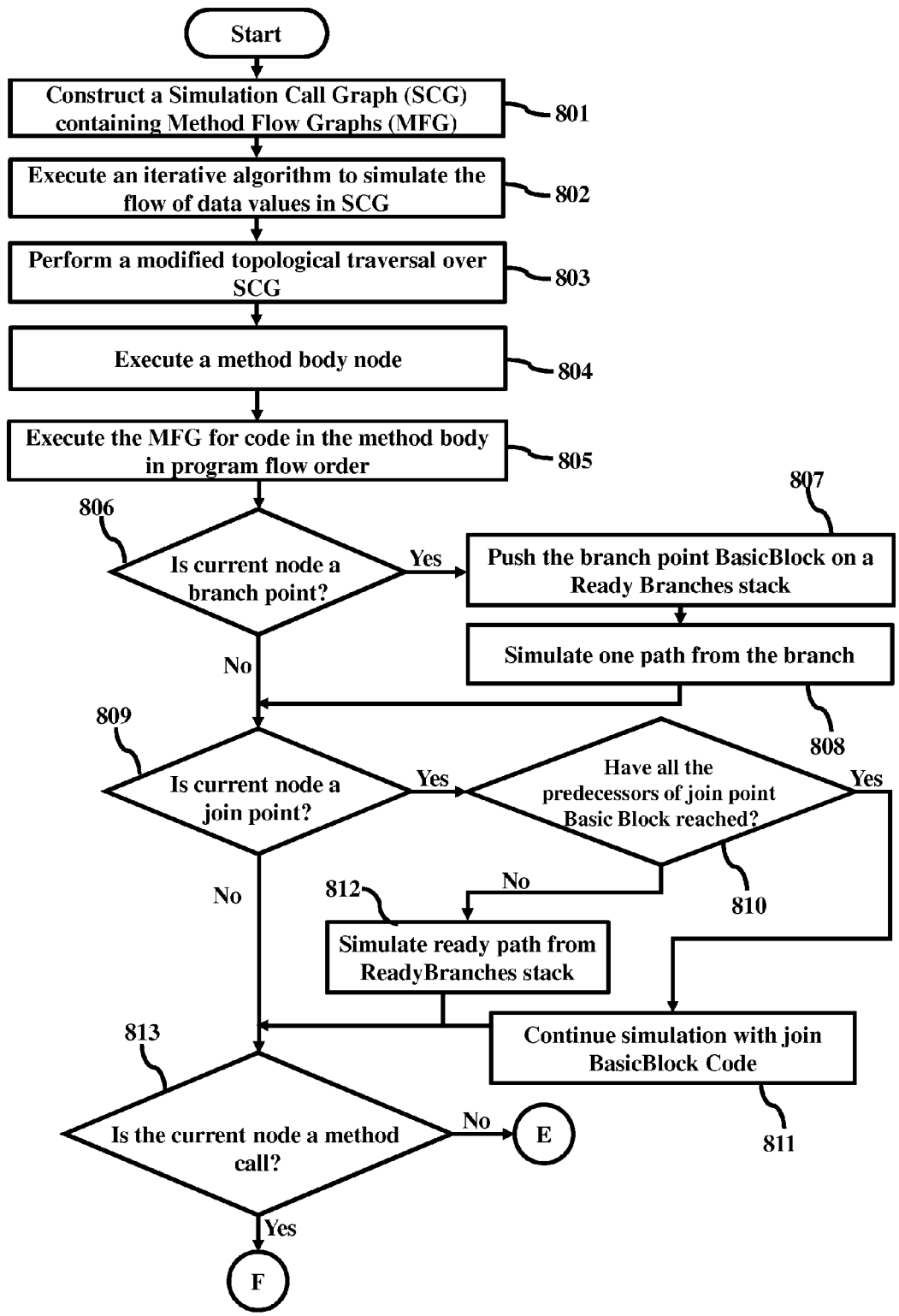
FIGS. 8A through 8C are continuing flow charts illustrating a method to handle the inter-procedural simulation according to an embodiment herein, and is a subflow detailing the step 702 in FIG. 7A.
Figure 8B:
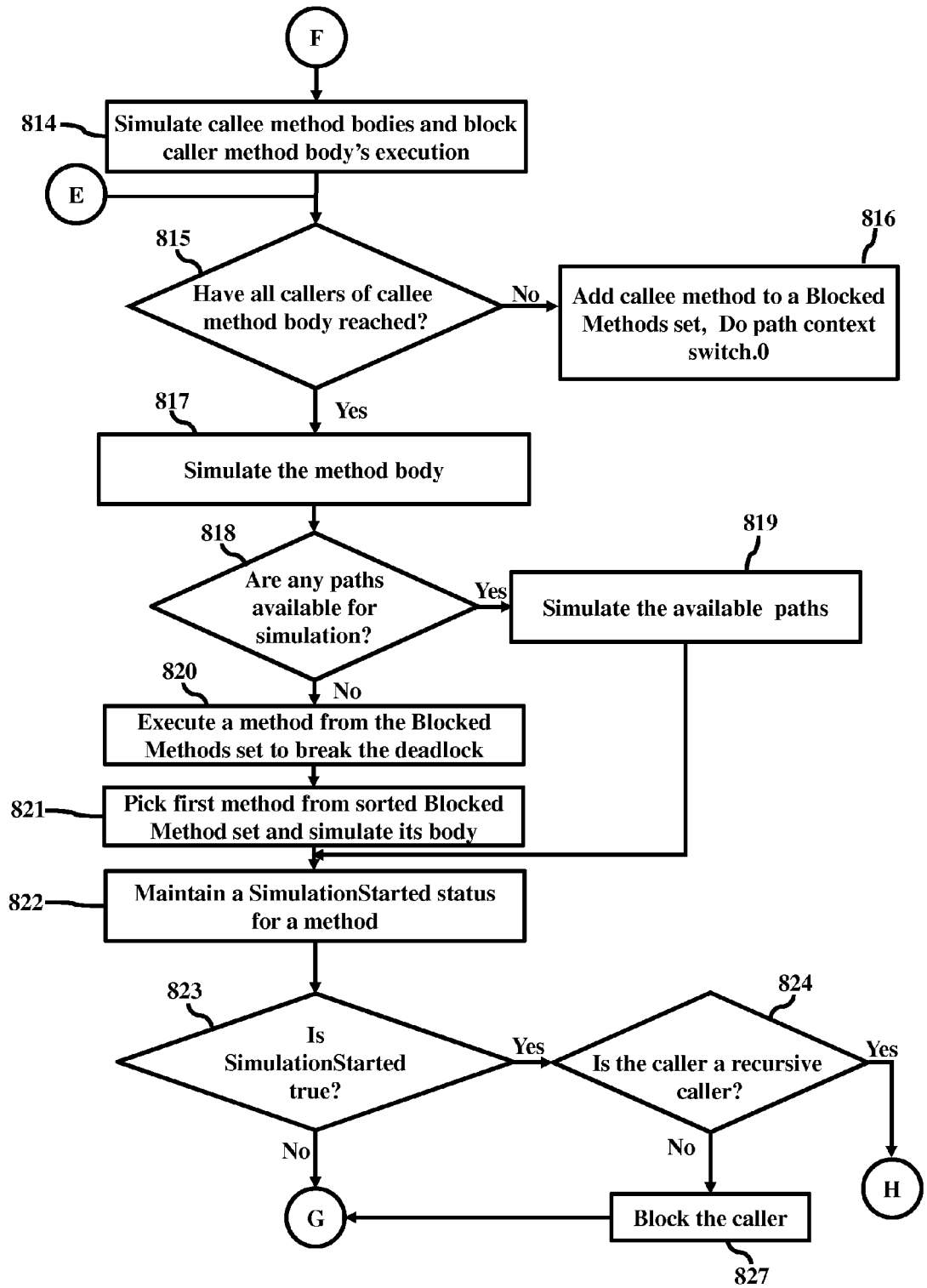
Figure 8C:
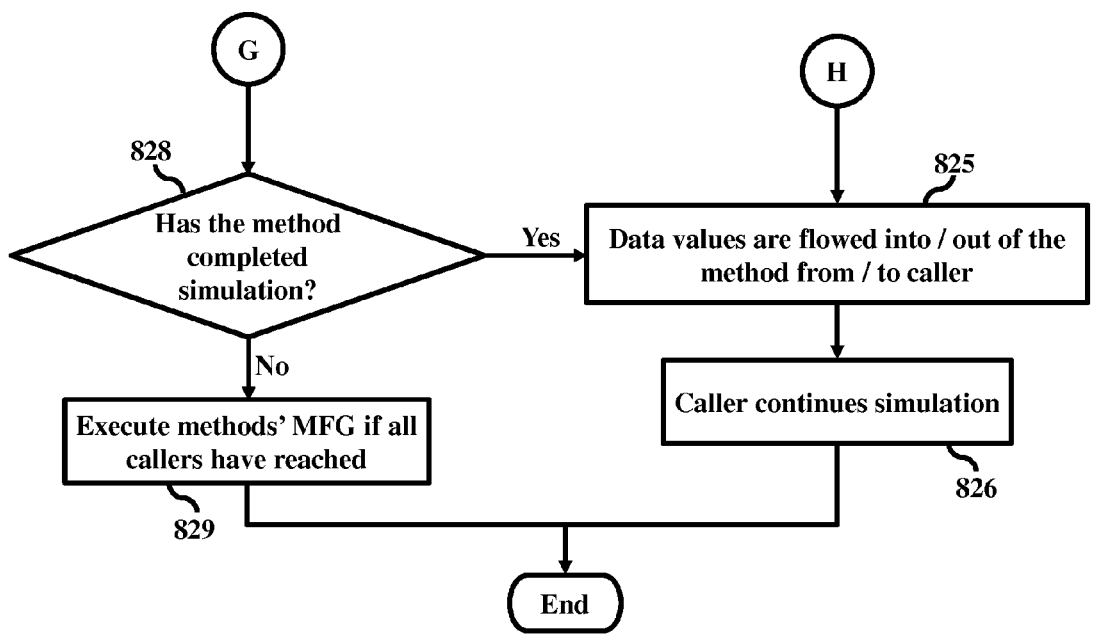

Solution:

FIGS. 8A through 8C are continuing flow charts illustrating a method to handle the inter-procedural simulation in the presence of inheritance, cycles in the flow graph and recursive cycles wherein a Simulation Call Graph (SCG) containing a Method Flow Graph (MFG) is constructed (801). There are two kinds of nodes in the SCG: method body nodes and method call site nodes. Each method body node represents a method body, and contains edges to all the call site nodes for method calls in the body of the method. Each method call node represents a single call site in the program code, and has edges to all the method body nodes which can be called from the call site wherein there may exist more than 1 edges if the call is to an instance method of a class and/or interface in an inheritance hierarchy which has subclasses that override the method.

Each method body node in the SCG is represented by MFG whose nodes are Basic Blocks representing straight-line code. A special Start BasicBlock is the root of the MFG from which simulation starts, and a special Exit BasicBlock represents the exit of the method at which simulation ends. A Basic Block B1 has an edge to another Basic Block B2 if control can flow from B1 to B2 during program execution at run time. The MFG may have loops when there are loop constructs e.g., "for", "while", in the method body. Branches and joins exist in the flow paths. A branch happens at a conditional jump (such as an "if" statement after which there are branches to true and false paths, which later join at the end of the "if" statement). The plurality of MFGs of methods are linked at call sites, which are represented by a special Call-Site-Basic-Block which transfers control to callee method bodies, and a matching Call-Join-Basic-Block at which control returns after executing the callee method bodies. A branch happens at a Call-Site-Basic-Block which has more than one callee method bodies, for which the corresponding join is at the Call-Join-Basic-Block. Note that branches and joins are not necessarily paired.

An iterative fixed-point global inter-procedural data-flow analysis algorithm is executed which simulates the flow of data values through nodes in the SCG (802).

A modified topological traversal is done over the SCG (803), starting from all root method body nodes which represent entry point methods that do not have an incoming edge for a caller. A method body node is executed (804) only after at least one incoming edge to the method from a call site in a caller method has been traversed. All non-recursive callers of a method are executed before a method is executed, on a best-effort basis.

When simulating a method body, the MFG for code in the method body is executed in program flow order which includes topological traversal over the MFG (805). Is a branch is reached (806), one of the paths from the branch is arbitrarily selected for simulation (808), and the branch point BasicBlock is pushed on a ReadyBranches stack (807). If a join point is reached (809), if all predecessors of the join point BasicBlock have reached (810), then simulation continues with the join BasicBlock code (811). Otherwise, path-context-switch happens to the topmost ready path from the ReadyBranches stack which is then simulated (812).

On reaching a call site (813), the caller method body's execution blocks, and the callee method bodies are simulated (814), then after they complete the caller method body simulation resumes from the call site. If one or more callee method bodies have other callers which have not reached (715), then those callee methods are added to a BlockedMethods Set, and simulation of that call path is stopped, a path-context-switch happens, and another path is selected for simulation (816). If all the callers of callee method body are reached, the method body is simulated (817).

The algorithm provides the ability to maintain partially simulated method body states for multiple methods at the same time, and doing path-context-switches across paths in different method bodies. This maximizes the data-flow values that flow into a path before it executes and thus minimizes the number of iterations needed to reach fixed point.

A deadlock happens when there is a loop in the flow graph, because of which there are no remaining paths available for simulation (i.e. the ReadyBranch stack is empty). If there exists a path for simulation (818) the available path is simulated (819) else the deadlock is broken by executing a method from the BlockedMethods Set (B in the example described in the Problem statement above) even if all its callers have not executed (820). The choice of which method body node in the SCG to execute (since there may be multiple methods such as B) is made using a heuristic which tries to maximize the values that have flowed into the method from callers, which reduces the number of iterations needed to reach fixed point, and thus reduces simulation time. The heuristic sorts the BlockedMethods Set in descending order of number of call sites that have reached a method, and picks the first method from this SortedSet when breaking a deadlock (821).

A recursive cycle is treated effectively as a single large method containing loops, so once the cycle has been entered through one entry point, it cannot be re-entered through another entry point, the cycle's SCG sub-graph must execute in the cyclic call graph order.

Further, according to the embodiment, in order to handle recursion and the possibility of call sites reaching a method body after it has started simulation, a method body node maintains a SimulationStarted state (822), which is True if the method has started but not completed simulation. A MFG cannot be simulated more than once in a fixed-point iteration, and cannot be simulated in a re-entrant manner. When a call-site reaches a method body whose SimulationStarted state is True (823), the caller's data flow values are accumulated at the method's MFG's Start BasicBlock. Then a check is made to determine if the caller is a recursive caller (824). If recursive, data flow values from the Exit BasicBlock of the MFG (which would have been computed in the previous fixed-point iteration) are flowed back to the caller (825), and then the caller continues simulation from its call-site (826). If not recursive, the caller is added to a ParallelCallers Set for the method, and the caller is blocked (827). When the method completes simulation (828), the data-flow values from the Exit BasicBlock are flowed back to the caller (825), and then the caller continues simulation (826). If the SimulationStarted state is False, but the method has already completed simulation in the current fixed point iteration, then data flow values are flowed into and out of the method and the caller continues simulation without blocking. The MFG of the method is executed if all callers are reached and the method has completed simulation (829).

Algorithms and Data Structures to Determine Inter-Method Flow Path Relationships According to an embodiment, there is provided a method to determine the algorithms and data structures to determine inter-method flow path relationships wherein the problems to satisfy the requirements and the solutions are as described herein.

Problem:

Many algorithms require a fast way to determine if a method is a caller or callee of another method in the SCG. Many algorithms also require a fast way to determine if one BasicBlock is a flow-predecessor of another BasicBlock, i.e. control can flow from the first BasicBlock to the second at run-time.

Solution:

Each method body node in the SCG maintains an AncestorCallers Map whose key is an ancestor method body node and value is a List of method call sites in the ancestor method on the call path to the current method. This allows near constant-time checks for ancestor-descendant relationships in the SCG.

Each BasicBlock B1 maintains a bit-vector containing information about all flow-predecessors of that BasicBlock in the MFG for the method in which the BasicBlock is contained. There is one bit in the bit-vector for each BasicBlock in the MFG, and the bit for BasicBlock B2 is "1" if B2 is a flow-predecessor of B1. This allows constant-time checks for flow-predecessor relationships within a method body.

FIG. 9 describes the denotation of the flow-predecessor according to a preferred embodiment. An algorithm checks the flow-predecessor relationships for BasicBlocks across methods, wherein B2 in B2Method is a flow-predecessor of B1 in B1Method, (901) if and only if:

B2Method is an ancestor of B1Method and B2 is a flow-predecessor of the call site in B2's method which is on the SCG call path leading to B1Method (902).

OR

B1Method is an ancestor of B2Method and the call site in B1Method which leads to B2Method is a flow-predecessor of B2 (903).

OR

B1Method and B2Method have a common ancestor method, and the call site leading to B2Method is a flow predecessor of the call site leading to B1Method (904).

Wherein said algorithm is near-constant time.

The algorithm to check the flow-predecessor as described herein further denotes B2 as the flow-predecessor of B1 (905) wherein a single or plurality of the conditions to denote B2 as the flow-predecessor as described herein is not satisfied as shown in the figure.

Determination of Context Sensitivity

According to an embodiment, there is provided a method to determine the Context sensitivity algorithms and data structures wherein the problems to satisfy the requirements and the solutions are as described herein.

Problem:

Since each method is simulated after multiple callers have reached the method, the simulation needs to simultaneously happen for values from multiple calling contexts (call paths). However, care must be taken to avoiding polluting results of computations from 1 calling context with results from other calling contexts. E.g. For the method: int sum(int a, int b) {return a+b;} which is executed by 2 callers: Caller1: sum(1, 2); and Caller2: sum(10,20); the result for Caller1 should be 3 and the result for Caller2 should be 30, there should not be mixed results (1+20=21 and 2+10=12). A naïve implementation which stores a separate set of values for each calling context would not work because large programs can have more than $10^{15}$ calling contexts.

Solution:

FIG. 10 illustrates the context sensitivity algorithms and data structures according to a preferred embodiment wherein a Context Graph is used to compactly represent a potentially very large set of calling contexts reaching a given method body node in the SCG (1001). The nodes in a context graph are BasicBlocks for call-sites, and an edge from B1 to B2 represents all calling context paths from B1 to B2 wherein there may exist a plurality of intermediate method body and/or call-site nodes in the call paths from B1 to B2. There is a distinguished Root node for all context graphs. If a context graph contains only the Root node, it represents all calling contexts. A context graph represents all call paths in the SCG which contain all nodes of at least 1 path in the context graph from Root to leaf.

The values of a variable which represents a memory location to be either a local stack variable or a global heap variable for an object field or array element at a given point in the program are represented by a ValueMap (1002). The Value Map contains multiple entries representing different values of the variable on different calling contexts. Each entry consists of a ValueSet representing a set of values and a ContextGraph representing the calling contexts on which the variable has those values. Each value appears only once in any ValueSet in the ValueMap. The ValueMap needs only as many entries as are necessary to distinguish different values from different calling contexts. Thus even if a method has $10^{15}$ calling contexts reaching it, but a particular parameter value to the method has only 2 values, then the ValueMap for that parameter variable needs a maximum of 2 entries.

The ContextGraph needs only as many nodes as are needed to distinguish different values reaching a method body from different calling contexts. At the Start node of a method body, if the value of a variable reaching from multiple callers is the same (1003), then the ContextGraph for the value is the Union of the ContextGraphs from the callers (1005). If the values reaching are different, then each different value is distinguished by associating with the value of a ContextGraph in the ValueMap (1004), wherein said value is the caller's ContextGraph Intersected with the Call-Site-Basic-Block for that caller, which ensures that it represents only paths through that call site.

The ContextGraph Intersection algorithm combines two ContextGraphs so that the resulting ContextGraph represents only paths which are in both input ContextGraphs.

```
ContextSet intersection(ContextSet xset, ContextSet yset) {
    if ( xset.equals(yset) || yset.equals(RootContextSet) )
        return xset;
    if ( xset.equals(RootContextSet) )
        return yset;
    zroot = intersection(xset.root, yset.root, null);
    if ( zroot == null )
        return null;
    else
        return new ContextSet(zroot);
}
// Recursive Depth-First-Traversal of subgraphs below xnode and ynode
Node intersection(xnode, ynode, zparent) {
    // Check cache of intersection results for a pair of nodes
    // to avoid traversing subgraph below xnode & ynode multiple times
    if ( intersectionCache.containsIntersection(xnode, ynode) )
        return intersectionCache.getIntersection(xnode, ynode);
    if ( xnode.isEquivalent(ynode) ) {
        znode = addChild(zparent, xnode);
        xchildren = xnode.getChildren( );
        ychildren = ynode.getChildren( );
        // If one of x/y has no children, append the other's subtree
        if ( xchildren.size( ) == 0 && ychildren.size( ) == 0 )
            return znode;
        else if ( xchildren.size( ) == 0 ) {
            // append all ychildren and their subtrees under znode
            appendSubtree(znode, ychildren);
            return znode;
        }
        else if ( ychildren.size( ) == 0 ) {
            appendSubtree(znode, xchildren);
            return znode;
        }
    }
    else if ( isAncestor(xnode, ynode) ) {
        znode = addChild(zparent, xnode);
        xchildren = xnode.getChildren( );
        // If x has no children, append y's subtree
        if ( xchildren.size( ) == 0 ) {
            appendSubtree(znode, ynode);
            return znode;
        }
        ychildren.add(ynode);
    }
    else if ( isAncestor(ynode, xnode) ) {
        znode = addChild(zparent, ynode);
        ychildren = ynode.getChildren( );
        if ( ychildren.size( ) == 0 ) {
            // append xnode and its subtree under znode
            appendSubtree(znode, xnode);
            return znode;
        }
        xchildren.add(xnode);
    }
    else {
        // xnode and ynode are unrelated, intersection is empty
        // for this path thru xgraph/ygraph.
        return null;
    }
    // Now compute intersection for all pairs of x/ychildren recursively
    intersectionExists = false;
    for ( xchild: xchildren ) {
        for ( ychild: ychildren ) {
            ContextsGraphNode zchild = intersection(xchild, ychild);
            if ( zchild != null )
                intersectionExists = true;
        }
    }
    if ( intersectionExists )
        return znode;
    else {
        if ( zparent != null && znode.getChildren( ).size( ) == 0 )
            zparent.removeChild(znode);
        return null; // none of x & ychildren intersect
    }
} // End of intersection algorithm
```

The ContextGraph Union algorithm combines two ContextGraphs so that the resulting ContextGraph represents all paths which are in either one or both input ContextGraphs.

```
ContextSet unionGraphs(ContextSet graph1, ContextSet graph2) {
    if ( graph1.equals(RootContextSet) )
        return graph1;
    else if ( graph2.equals(RootContextSet) )
        return graph2;
    // First create root of unioned graph
    if ( graph1.root == graph2.root || graph1.root.isAncestor(graph2.root) )
        mergedGraph = graph1.copy( );
        toMerge = graph2;
    }
    else if ( graph2.root.isAncestor(graph1.root) )
        mergedGraph = graph2.copy( );
        toMerge = graph1;
    }
    else {
        // root1 & root2 are unrelated, use root of entire flow graph
        mergedGraph = graph1.copy( );
        toMerge = graph2;
        mergedRoot = ContextGraphRoot;
        mergedRoot.addChild(graph1.root);
        mergedRoot.addChild(graph2.root);
        mergedGraph.setRoot(mergedRoot);
    }
    // Merge all nodes in toMerge into mergedGraph
    for ( node: toMerge ) {
    mergedNode = mergedGraph.createNode(node);
        for ( child: node.children ) {
            mergedNode.addChild(mergedGraph.createNode(child));
        }
    }
    return mergedGraph;
}
```

The ValueMap Union algorithm combines two ValueMaps so that the resulting ValueMap has all values which are in either one or both input ValueMaps along with their corresponding ContextGraphs.

```
ValueMap union(valueMap1, valueMap2) {
    unionedMap = valueMap1.copy( );
    for each ( [valueSet, contextGraph] entry in valueMap2 ) {
        if ( valueSet existed in unionedMap with existingGraph ) {
            newContextGraph = union(contextGraph, existingGraph);
            replace existingGraph with newContextGraph in unionedMap;
            continue to next entry;
        }
        remaining ValueSet = empty;
        if ( contextGraph existed in unionedMap with existingValueSet ) {
            for ( value : valueSet ) {
                if ( value was not in unionedMap )
                    existingValueSet.add(value);
                else if ( value had a different ContextGraph in unionedMap )
                    remainingValues.add(value);
            }
        }
        else {
            remainingValues = valueSet;
        }
        for ( value : remainingValues ) {
            newContextGraph = contextGraph;
            if ( value existed in unionedMap with existingGraph )
                newContextGraph = union(contextGraph, existingGraph);
            unionedMap.addEntry(value, newContextGraph);
        }
    }
}
```

Further in the embodiment the ContextGraph union and intersection as described herein is performed for cases which include but are not limited to:
  i. Whenever two or more paths meet at a join point, the ValueMaps for a variable on all incoming paths are unioned to create the ValueMap for the variable for the outgoing path.

ii. For binary operations, the operation is performed only for pairs of values corresponding to the same calling context.

Reaching Defs Determination Algorithm and Data Structures

According to an embodiment, there is provided a method to determine Reaching defs algorithm and data structures wherein the problems to satisfy the requirements and the solutions are as described herein.

Problem:

The flow of data values within a method body's MFG and across methods through the SCG requires careful design to ensure accurate flow-sensitive and context-sensitive values are available during simulation, without consuming too much memory and time. Traditional reaching-defs algorithms store values in a definition ("def") at each assignment operation and then propagate a Set of defs through the MFG/SCG, with union operations on the Set at join points where paths meet, and then at a use of a variable the values from all defs are unioned to get the reaching values. However, this loses accuracy in the following cases:

1. If Def node DN is in a different method (ancestor/descendant/peer of use U's method), then the values to be used by U are a subset of values set at DN, for the set of calling contexts which are common to DN and U. E.g.
Method a( ){p.setX(1);}
Method b( ){p.setX(2); c( )}
Method c( ) {println(p.x); // should print only 2, traditional algorithm would provide 1 & 2}
Assume p points to the same object instance in all the methods.

2. The set of values from DN reaching U need to be further restricted to those common calling contexts on which DN is not killed by another def of the same variable that is used at U. E.g. Diamond call graph A→B→C and A→D→C, where A has def ptr.x=1; B has def ptr.x=2; so the value of ptr.x in C should be 2 for A→B→C and 1 for A→D→C.

3. Special case of (2) is when DN kills itself. E.g.
p.setX(1); p.setX(2); println(p.x); // should print 2

4. A def may not have values of a variable for all calling contexts, so it cannot kill all previous reaching defs.
ptr.x=1; // DN1: ptr is either ptr1/ptr2 on contexts ctx1/ctx2
print ptr1.x; // should print 1 for ctx1 and should also print ptr1.x value reaching from ctx2 which has not been killed by DN1

5. If DN sets the values of >1 global heap variables (e.g. ptr.x=RHS; where ptr may point to obj1 or obj2 on different calling contexts), and later on the path to use only obj1 is set by another def DN2, then DN2 cannot kill DN1 because that would lose values of obj2.x, on the other hand if DN2 is not killed then spurious obj1.x values flow to the use after DN2. E.g.
ptr.x=1; // DN1: ptr is either obj1 or obj2 on diff calling ctxs
obj1.x=2; // DN2: kills only obj1.x from DN1
println(obj2.x); // should print 1, initial
println(obj1.x); // should print 2
obj2.x=3; // DN3: kills only obj2.x from DN1
println(ptr.x); // should print 2,3 not 1

6. If no defs reach the use U on some paths, then Unknown values need to be added to the possible values of the variable used at U. So there exists a need to find if there is any path from an entry point to U on which there is no def.

7. The above problems need to be solved without using too much memory and without reducing performance.

Solution:

FIGS. 11A and 11B are continuing flow charts illustrating a method to provide a def cloning method according to a preferred embodiment wherein multiple defs are created (1101) at an assignment, one clone def for each global heap variable (obj1.field, obj2.field etc). Each clone def is then flowed along with all other defs and may be independently executed including but not limited to union of plurality of defs or killing a def without affecting other clones. The described method for the creation of multiple defs may handle cases including but not limited to case 5 described herein.

Further in the embodiment, to handle plurality of cases including 1,2,3 and 6, artificial defs are created at call-sites and join points (1102), and the existence of exactly 1 def wherein said def may be real or artificial which reaches any use of a variable is ensured.

An artificial def as described herein does not store any value, it only points to one or more previously reaching defs. At a join point where paths meet which includes at the Start of a method body which has more than 1 callers, the artificial def would point to the reaching defs flowing in from all the incoming paths. The value at the artificial def is computed by unioning the values of incoming defs (1103), and if there was no incoming def on any incoming path (1104), then an Unknown value is added (1105) for cases including case 6 as described herein. An artificial def is created at a join point only if different defs reach from different incoming paths (1106) [Please verify accuracy]. At a call-site, the artificial def for variable points to the real/artificial def inside the callee method body, and the values of the artificial def are the values of the def inside the callee with its ContextGraph truncated to remove nodes in the subgraph under the callee. This provides the context-sensitivity and flow-sensitivity needed while computing the reaching values for a variable from the reaching defs.

Further in the embodiment, the Problem 4 mentioned herein is handled by lazily computing additional values at a Def, in case the values from the RHS of the assignment do not cover all calling contexts (1107), then values for the remaining calling contexts are obtained from the previous defs reaching from code prior to the def (1108).

Further in the embodiment, the Problem 7 mentioned herein is handled by computing the values of an artificial def lazily if the defs variable is ever used by traversing the artificial defs graph from use to real defs, this avoids the performance and memory overhead of unnecessarily propagating values through the flow graph if the values will not be used. Also, values computed at artificial defs are stored in the artificial def in a memory-sensitive manner, they are wrapped in a weak reference and could be deleted to free up memory, and recomputed later lazily.

Every BasicBlock holds a reachingDefs Map which provides the Def reaching the BasicBlock for every variable. In order to reduce memory usage and improve performance while flowing reaching defs through nodes in the MFG across methods, the according to a embodiment a special DefMap data structure is used which implements a Map using an internal sorted array of Defs (1109). This sorted array uses much less memory than the traditional Bit-Vector or Hash-Map implementations.

Further restrictions can be laid for the kind of defs which flow upwards in the SCG from a method body to its callers (1110). If this is not done, the ReachingDefs Maps stored in BasicBlocks become too large because of many entries for variables which are never used in that part of the SCG/MFG. Defs are flowed to callers lazily, only if:

i. the def has values relevant for the caller, i.e. There is a non-zero intersection of the ContextGraphs in the defs ValueMap with the caller's Call-Site-Basic-Block.

AND ii. there is a use of the defs variable in a caller method or in a peer method reached through a caller, and the def would actually flow to the use. This is done by first tracking all uses of a variable. Each use is checked to see if it is in the caller method or ancestor or descendant of the caller/ancestor, and if the def method's call-site is a flow-predecessor of the use method's callSite in the common ancestor method in the SCG. Note that on the first fixed-point iteration when uses of a variable in the caller/peer methods are not known, it is possible that a def will not flow to callers so the use will get Unknown values, but this will get corrected in the $2^{nd}$ and later fixed-point iterations.

Further, according to the embodiment to optimize performance and memory, restrictions on the number of defs flowing downwards through the SCG from a caller method to its callee method bodies (1111). This is done by a lazy pull-on-use algorithm. This is much more optimal than the traditional "push" algorithm which always flows all defs from caller to callee in the SCG. Defs are stored across fixed-point iterations only at Call-Site-Basic-Blocks (1112). When a method body contains a use of a variable, the algorithm first checks the BasicBlock containing the use, the existence of a Def is checked (1113), if a Def is not found in that BasicBlock's reachingDefs Map, then the Start BasicBlock for the method containing the use is checked (1114), if no Def is found there then the Call-Site-Basic-Blocks for each caller of the use method is checked (1115), and from there upwards in the SCG using a topological traversal till a Def is found or the SCG Root is reached on all paths (1116). The upwards traversal is stopped on a path if no Def of the variable exists in any ancestor method of the current method. This lazy pull-on-use algorithm is also provided with the ContextGraph representing the calling contexts for which the use needs values, and the upwards traversal only happens for those calling contexts. The reaching values for a variable from the reaching Defs are computed (1117).

Restricting Values of Variables at Conditional Jumps

According to an embodiment, there is provided a method for restricting (specializing) values of variables at conditional jumps wherein the problems to satisfy the requirements and the solutions are as described herein.

Problem:

The values of a variable that flow to a use are restricted by conditional jumps on the path to the use. E.g.

```
p = methodReturningNullAndNonNull( );
if ( p != null )
    p.foo( ); // Null does not flow here, so no NullPointerException
```

Solution:

FIG. 12 illustrates a method to for restricting values of variables at conditional jumps according to a preferred embodiment by inserting a SpecialAssert node in the MFG at the beginning of a BasicBlock that is the target of a conditional jump (1201) wherein the SpecialAssert node obtains the input values of the variable(s) restricted by the conditional expression (1202) and executes the conditional jump expression for each value (1203). All values for which the expression evaluates to true are added to the output values (1204). Further, a Def is created at the SpecialAssert node containing the output values (1205) wherein the end result is that the use of the variable in the path after the SpecialAssert will get only the restricted values (1206).

Determination of Path Sensitivity

According to an embodiment, there is provided a method for determining path sensitivity wherein the problems to satisfy the requirements and the solutions are as described herein.

Problem:

A key problem in propagating accurate values of variables is to remove values from infeasible paths in the SCG/MFG which cannot be traversed at run-time. This often happens when the values of two variables are related because of conditional checks or assignments on the same path. E.g.

```
p = methodReturningNullAndNonNull( );
b = false;
if ( p != null )
    b = true;
if ( b )
    p.foo( ); // Null does not flow here, so no NullPointerException
```

The general problem statement for path- and relationship-sensitivity is:

If p=function(q) where function is either an algebraic function wherein for relationship sensitivity, the degenerate case is p=q or function is a mapping function for path sensitivity, where value of p is obtained from a Def of p on the same path as Def of q wherein "same path" implies having the same preconditions, THEN a restriction on p's values implies a restriction on q's values, further a restriction on q's values implies a restriction p's values wherein the since algebraic and/or mapping function is bi-directional.

Figure 13:
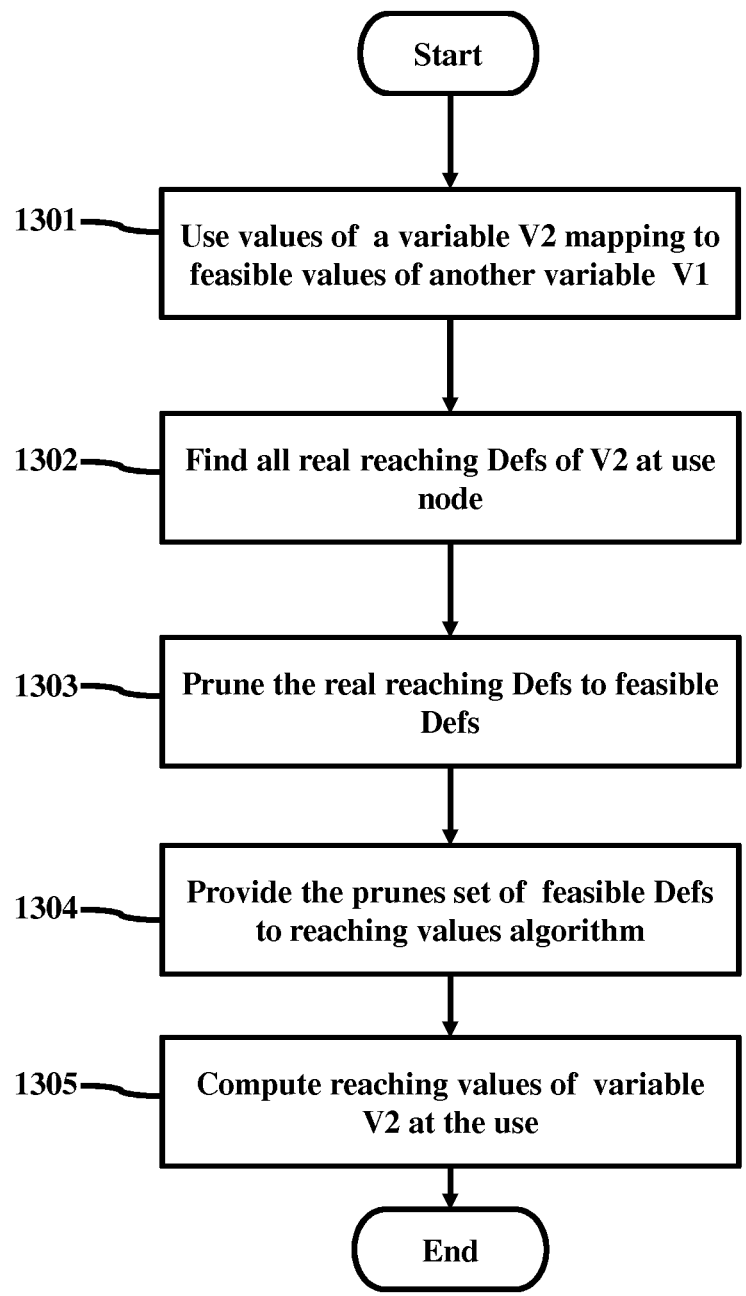
FIG. 13 illustrates a method to determine path sensitivity according to an embodiment herein, and is a subflow detailing the step 713 in FIG. 7B.
Figure 14:
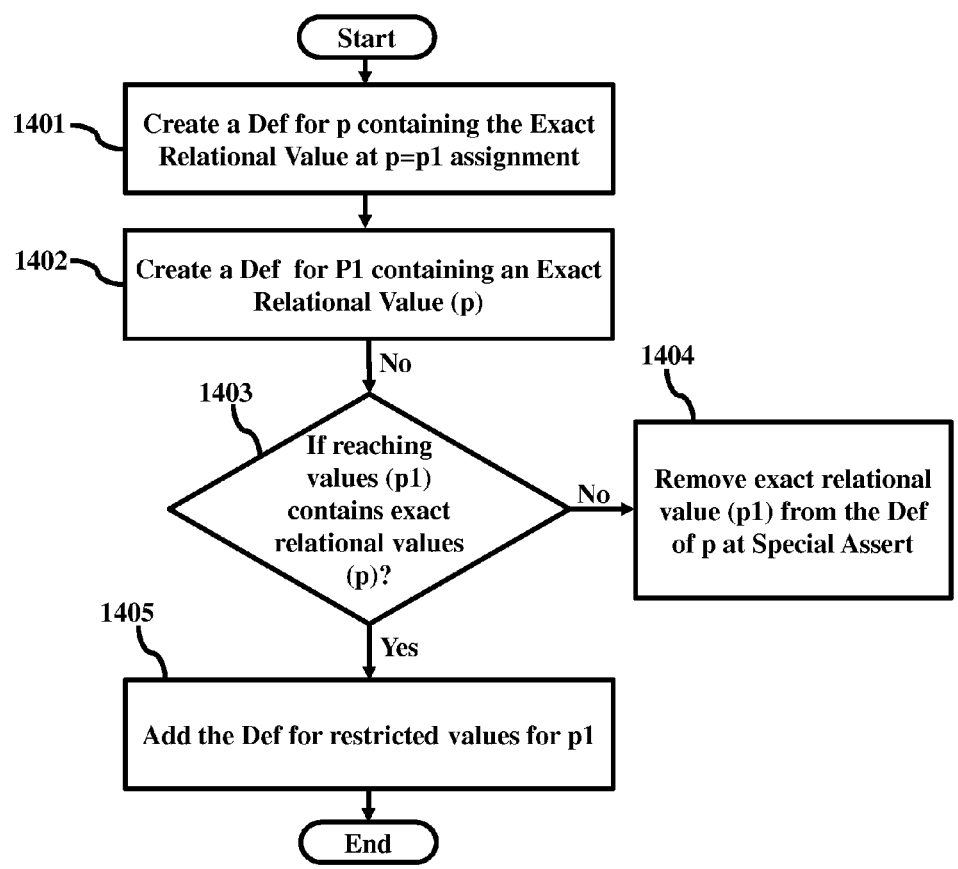
FIG. 14 illustrates a method to determine relationship sensitivity according to an embodiment herein, and is a subflow detailing the step 714 in FIG. 7B.

Solution:

FIG. 13 illustrates a method to determine path sensitivity according to a preferred embodiment, an algorithm for pruning reaching values of a variable v2 using mapping function based on feasible paths is described herein.

According to the embodiment only values of v2 which map to feasible values of some other variable v1 are used (1301) wherein the v1 values have been previously restricted at a conditional jump. Further the described method to use v2 facilitates higher accuracy for the intra-procedural case and slight inaccuracy for the inter-procedural cases, wherein the error facilitate to keep some infeasible values.

According to the embodiment to propogate accurate values of variable all real reachingDefs of v2 at useNode are found (1302) and the real reacingDefs are pruned to feasibleDefs as described by the algorithm described below (1303). Further, the pruned set of feasibleDefs is provided to the reaching values algorithm which combines the values of real defs at the roots of the artificial Defs graph (1304) wherein the reachingValues of v2 at use is computed (1305).

```
Set getFeasibleDefs(v2, useNode, allReachingRealDefs) {
    if ( allReachingRealDefs.size( ) == 1 )
        return allReachingRealDefs;
``` specialAsserts=list of SpecialAsserts dominating useNode, where each SpecialAssert is at head of branch after conditional jump. Each branch head has a mappedDefs Map [variable, Def] containing the def of each variable which is def'ed in the branch headed by the SpecialAssert (including the variable which is restricted by the SpecialAssert).

```
candidateDefs = allReachingRealDefs.copy( );
for each ( SpecialAssert sp (which restricts v1) in specialAsserts ) {
    if ( sp.inputDefs == sp.outputDefs )
        continue;
``` feasibleBBs=all BBs containing defs of output values of variables v1 whose values are restricted by sp infeasibleBBs=all BBs containing defs which have an input value of v1 and do not have any output values from sp, remove any infeasibleBBs which are also in feasibleBBs.

```
feasibleDefs = empty set;
// A def d2 of v2 is a feasible reaching def at useNode if and only if:
// 1. d2 flows to some feasibleBB containing a feasible def d1 of v1
// 2. OR Some def d1 from a feasibleBB flows to d2.basicBlock
// AND d1 is not killed on some path from d2.basicBlock to useNode
// Collect defs of v2 which must reach use.
for each ( bb in feasibleBBs ) {
    find reachingRealDefs at bb by traversing artificial def graph for v2
    if ( reachingRealDefs is empty )
        reachingRealDefs = getMappedDef(bb, v2);
    reachingRealDefs.retainAll(candidateDefs);
    feasibleDefs.addAll(reachingRealDefs);
}
if ( feasibleDefs.size( ) < candidateDefs.size( ) ) {
    // There was some feasibleBB for wherein the a def of v2 may not exist,
    // so one or more of the remaining reaching defs could reach use.
    // In the next fixed pt iteration there can exist more accuracy.
    // OR There was some feasibleBB whose Def of v2 does not reach use,
    // so one or more of the remaining reaching defs could reach use.
    // Now try to remove defs at infeasibleBBs which definitely cannot
    // reach use on any feasible path.
    for each ( Def d2 of v2 in candidateDefs - feasibleDefs ) {
        // Get Defs d1 of v1 which are mapped to d2, from
        d2.BB.branchHead
        mappedDefs = getMappedDefs(d2.basicBlock, v1);
            If ( mappedDefs contains any Def d1 whose basicBlock is
                     in feasibleBBs )
                feasibleDefs.add(d2);
        }
    }
    // For next SpecialAssert higher in dominator tree, start with
    // candidateDefs which dont contain infeasible defs, so that
    // a Def is eventually considered feasible only if it is feasible
    // for all dominating SpecialAsserts.
    candidateDefs = feasibleDefs;
}
return candidateDefs; // contains final set of feasible defs
}
// Get Defs of variable which are mapped to feasibleBB
Set getMappedDefs(feasibleBB, variable) {
    branchNode = BasicBlock at branch point dominating feasibleBB
    mappedDefs = branchNode.branchHeadDefsMap.get(branchHead);
    feasibleDef = mappedDefs.get(variable);
    if ( feasibleDef != null ) {
        reachingRealDefs = real defs at root of def graph of feasibleDef
        return reachingRealDefs;
    }
    else {
        return empty set;
    }
}
```

Relationship Sensitivity

According to an embodiment, there is provided a method for determining relationship sensitivity wherein the problems to satisfy the requirements and the solutions are as described herein.

Problem:

The relationship sensitivity problem as described herein is when two variables are related by an algebraic function. If the values of one variable at use are restricted, that implies a restriction on the values of the other variable too.

```
Case 1:
    p = p1;
    if ( p1 != null )
        p.foo( ); // No NPE
Case 2:
    p = p1;
    if ( p != null )
        p1.foo( ); // No NPE
Case 3:
    p = p1; // Node N
    p1 = ...something...
    if ( p1 != null )
        p.foo( ); // NPE
Case 4:
    p = p1; // Node N
    p1 = ...something...
    if ( p != null )
        p1.foo( ); // NPE
```

Solution:

FIG. 14 illustrates a method to determine relationship sensitivity according to a preferred embodiment, a special ExactRelationalValue(p1) which gives the variable p1 to which p is related is created at p=p1 (1401) wherein p1 may be of variable type which includes but not limited to a local var or ptr.field or array[index].

Further, at p=p1, a Def for p1 is created which contains an ExactRelationalValue(p) with p as the target (1402) wherein the relationship is rendered bi-directional.

Then whenever p or p1 is restricted at a SpecialAssert, and there is an ExactRelationalValue for p or p1 (1403), then add a Def for the other variable which is the target of ExactRelationalValue too with the same restricted values (1405). Then at a use the values of p or p1 as usual, ignoring the ExactRelationalValues which are only needed at SpecialAsserts are picked (1404).

For Case 3, Since ExactRelationalValue is bidirectional, so at the p1 !=null SpecialAssert, there is no ExactRelationalValue for p1 since it has been overwritten by the "p1= . . . something . . . " Def. wherein a Def for p!=null may not be added so the use at p.foo( ) will get the null from Def at node N and report NPE.

For Case 4: At the SpecialAssert for "p !=null", there exists ExactRelationalValue(p1) but before adding a Def for non-null values of p1, it is checked if reachingValues(p1) contains the ExactRelationalValue(p). If so we can add the Def for non-null values for p1 too. Note that if p1's reachingValues does not have the ExactRelationalValue(p), the ExactRelationalValue(p1) from the Def of p at SpecialAssert is removed, since this is a bi-directional relationship so if one direction is broken then the other direction is invalid too.

Further the behavior of ExactRelationalValue includes:
i. it is only used at SpecialAsserts to restrict the value of the related var, and ignored everywhere else.
ii. it is an add-on value in the ValueMap for p/p1, i.e. the ValueMap contains all the actual values as usual.
iii. it does not cross assignments and is not transitive for now. So p=p1; p2=p; will NOT cause p2 to have RelationalValue with p1.
iv. At unions, if result ValueMap has >1 ExactRelationalValues and their contexts intersect, then remove them all. (For a particular calling ctx, a var can have only 1 ExactRelationalValue).
v. If only 1 of the ValueMaps being unioned has an ExactRelationalValue for a particular context then again ExactRelationalValue is removed. (We dont allow ExactRelationalValue on only 1 path).
vi. ExactRelationalValue does flow across methods as usual.

Detection of Deadlock

According to an embodiment, there is provided a method for detection of deadlock wherein the problems to satisfy the requirements and the solutions are as described herein.

Problem:

When code is executed concurrently by multiple threads, access to data that is shared across multiple threads needs to be protected by locks to ensure that there is no inconsistency of data. However, acquiring too many locks can lead to deadlocks where two threads have each acquired one lock and are waiting for the other thread's lock, leading to a lock-wait cycle. Deadlocks are very difficult to detect by testing because they may happen only on specific code paths and under specific timing conditions. Hence a simulation algorithm that can detect deadlocks without running the program is necessary.

Figure 15:
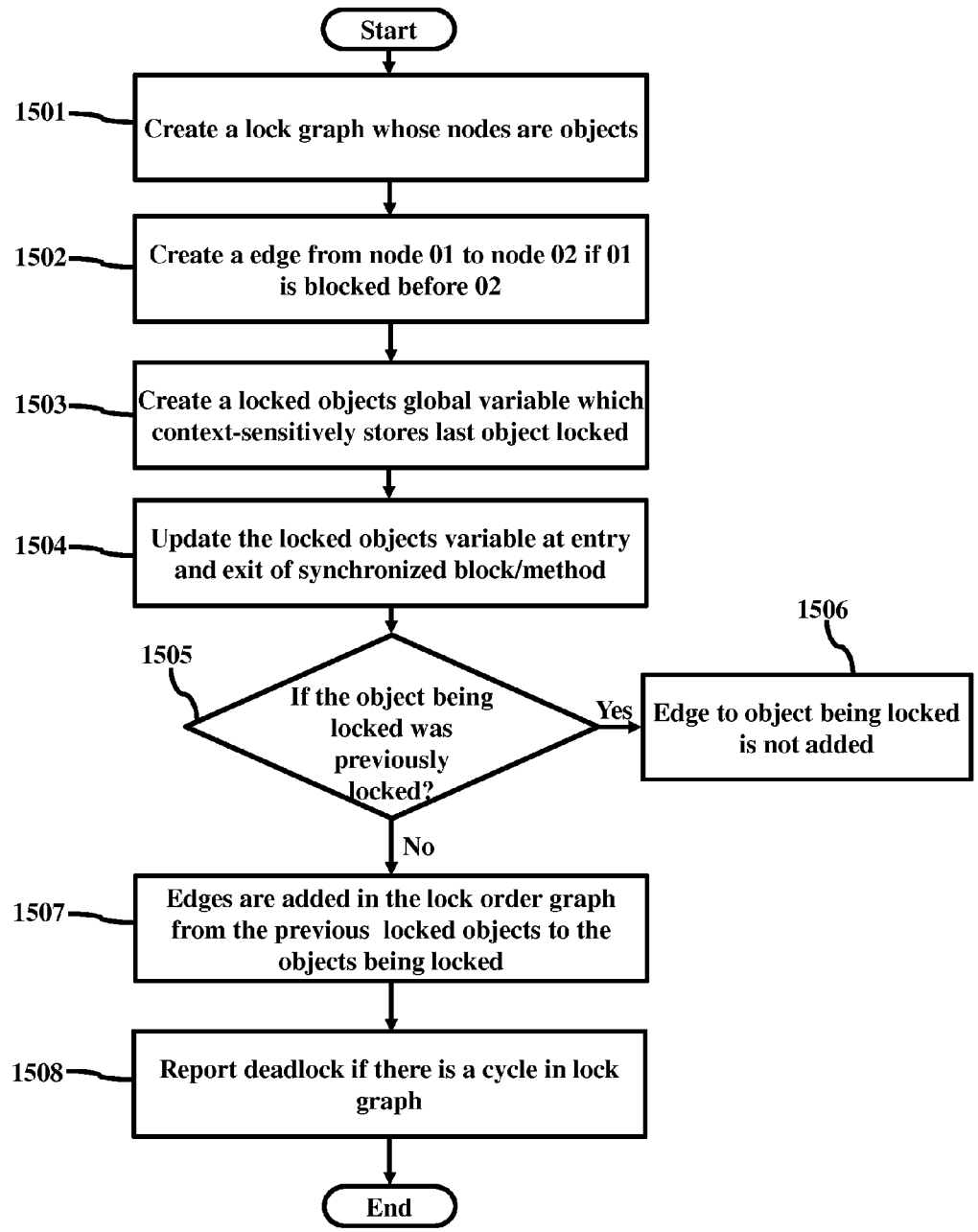
FIG. 15 illustrates a method to detect a deadlock according to an embodiment herein, and is a subflow detailing the step 716 in FIG. 7B.
Figure 16:
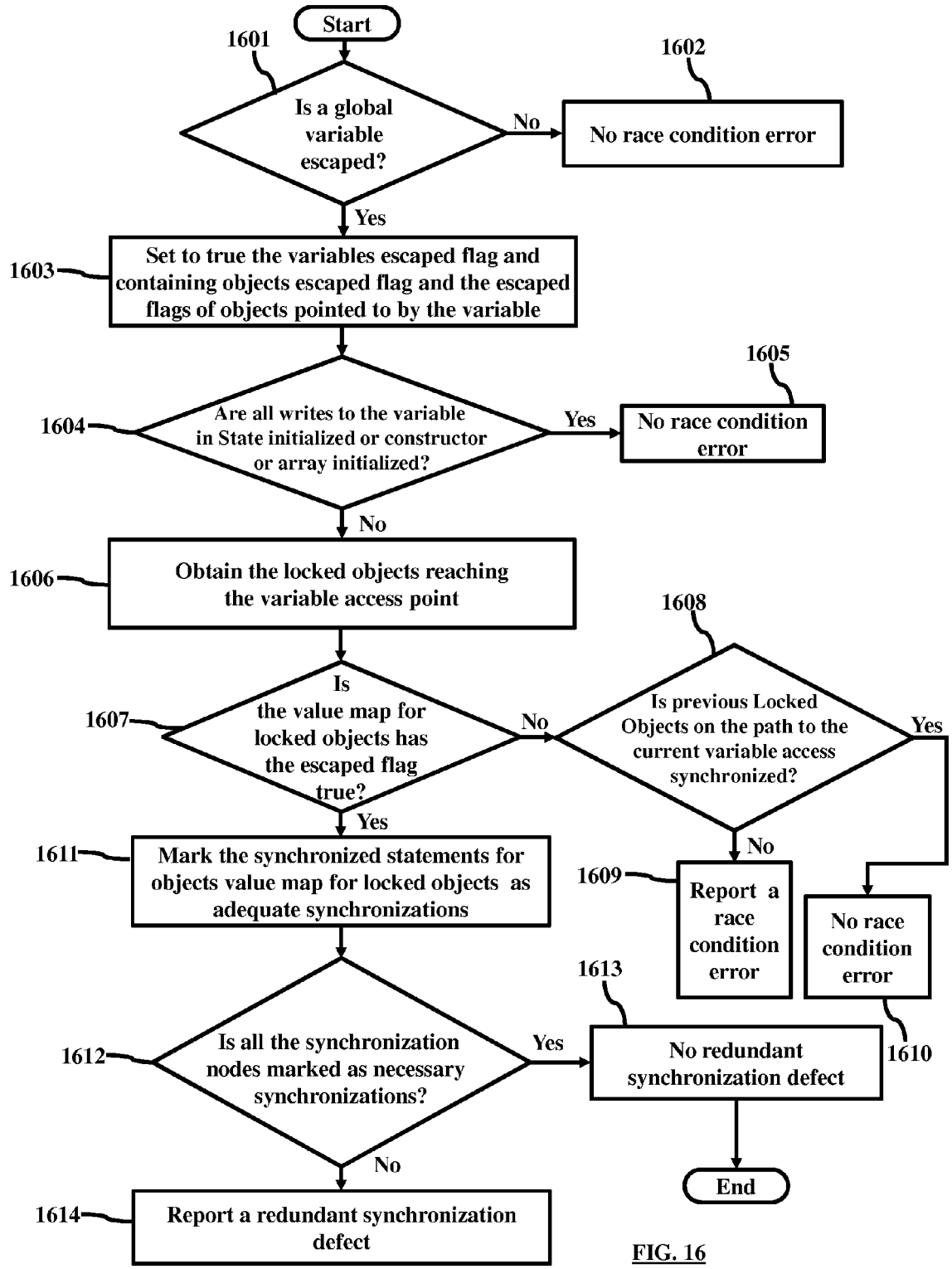
FIG. 16 illustrates a method to detect race condition and redundant synchronization according to an embodiment herein, and is a subflow detailing the step 718 in FIG. 7B.

Solution:

FIG. 15 illustrates a method to detect a deadlock according to a preferred embodiment, a lock graph is created whose nodes are the object instances (1501), identified by the object allocation site node, wherein the nodes are locked. A lock is acquired at the "synchronized" statement in Java or the Start BasicBlock of a synchronized method. An edge is created from node O1 to node O2 if there is a path in the SCG/MFG on which O1 is locked before O2 (1502) wherein a cycle in this lock graph indicates a potential deadlock.

Further according to the embodiment, the context-sensitivity in deadlock detection is supported wherein a method may be called by multiple callers which have acquired locks on different objects. Further, according to the embodiment a lockedObjects global variable which stores the last object which was locked on a path is created (1503). The values of the lockedObjects global variable flow through the SCG and MFG in a context- and flow-sensitive manner. The lockedObjects variable is updated at every entrance and exit node of a synchronized method or synchronized block (1504) wherein the monitor-enter and monitor-exit instructions in the bytecode.

At every synchronized node where a lock is acquired, it is checked if an object being locked (O2) was already previously locked (1505), edges are added in the lock order graph from the previous reaching values of lockedObjects, previously locked objects O1, to the current objects being locked (O2) (1507). Further, for the case of a thread re-acquiring a lock it already held on all paths, e.g., a no-op in Java, then the edge to O2 is not added (1506). The edge is added only for pairs of objects in the ValueMaps for lockedObjects and current objects which have overlapping ContextGraphs wherein non-zero intersection of ContextGraphs is non-zero, to maintain context-sensitivity. There is a distinguished Root node of the lock graph, from which there are edges to objects which are locked when there is no previous lock.

Further according to the embodiment, there is provided a method to prevent spurious cycles in the lock graph by detecting cases where a lock is re-acquired and reporting the deadlock (1508) wherein the check verifies if O2 was previously locked on all paths is done by doing a backwards topological traversal in the lock graph starting from O1 (object from lockedObjects) and verifying if the Root node of the lock graph is reached without reaching the node for O2.

Detection of Race Condition and Redundant Synchronization

According to an embodiment, there is provided a method for detection of race condition and redundant synchronization wherein the problems to satisfy the requirements and the solutions are as described herein.

Problem:

A race condition or data race occurs when accesses to shared state by concurrent threads are not adequately protected by locks, which can lead to data corruption especially for multi-step operations which are not done atomically. A redundant synchronization is one which does not protect any accesses to shared state, and hence can be removed, otherwise it may cause performance degradation.

Solution:

FIG. 16 illustrates a method to detect race condition and redundant synchronization according to a preferred embodiment wherein the number of steps described herein are two wherein the first step it is determined if a global variable has escaped which is the ability for the global variable to be read and/or written by multiple threads (1601). Next, if a variable has escaped, the existences of adequate locks which protect the variable access are checked and it is ensured that only one thread can access the variable at a time. If there are not adequate locks then a race condition bug is reported.

Figure 17:
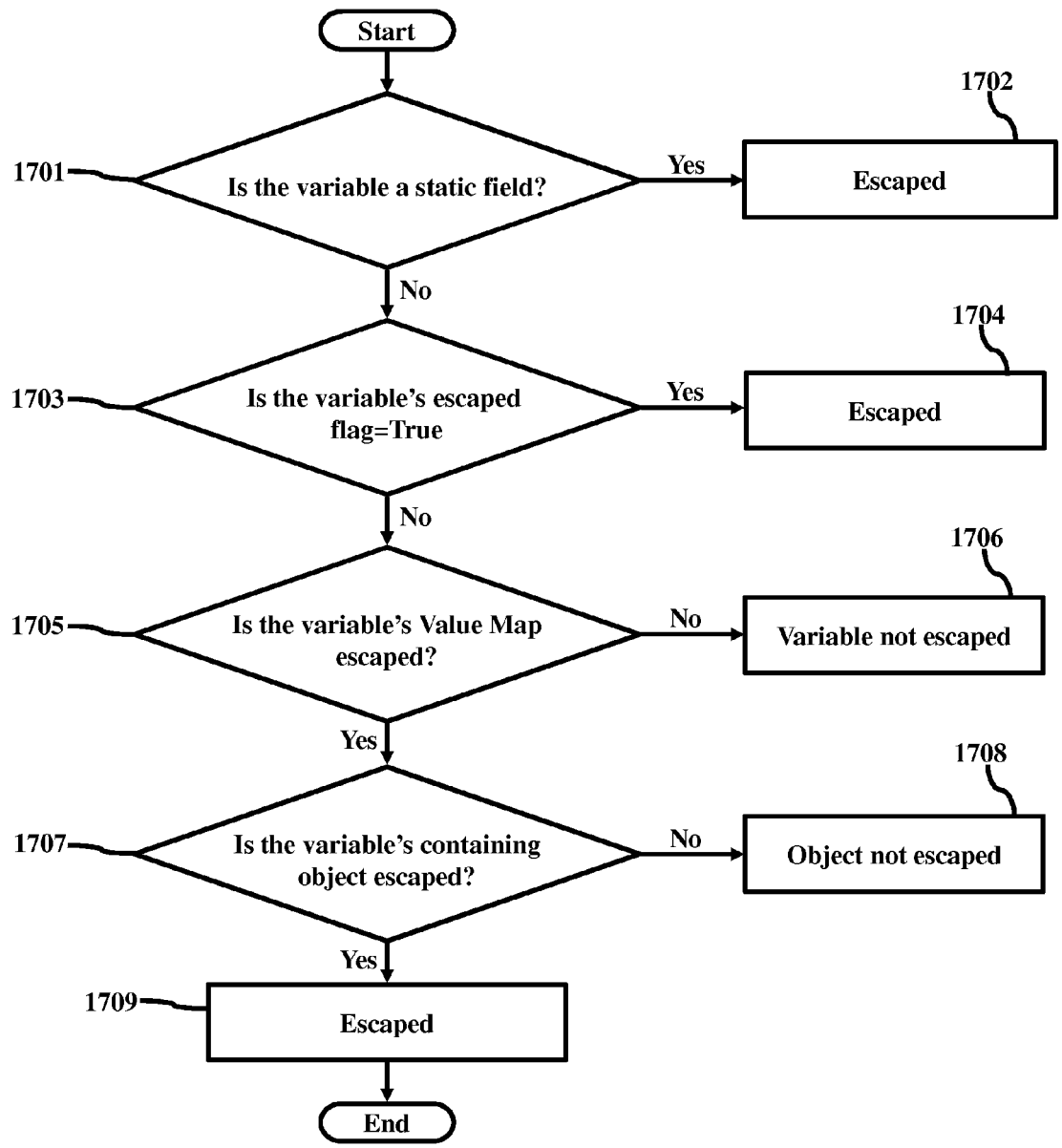
FIG. 17 illustrates the conditions for the variable or object to be designated as escaped according to an embodiment herein.

According to the embodiment there is provided a method for accurate context-sensitive and flow-sensitive escape analysis. A global variable which includes but is not limited to object field or array element is considered to have escaped if its parent object has escaped to multiple threads and the variable is actually read or written by multiple threads. FIG. 17 illustrates the conditions for the variable or object to be designated as escaped. If the variable is a static field (1701) in programs written in languages including but not limited to Java, are considered to always escape (1702). If the variable's escaped flag is set to true (1703) then the variable is designated as escaped (1704).

Further, according to the embodiment, there is provided a ValueMap containing the values of a variable with an escaped flag which indicates whether the values in the ValueMap have been obtained from an escaped variable. There is also an escaped flag for each object instance which indicates if the object has escaped. The conditions wherein the escaped flags are set on ValueMaps include but are not limited to:

i. For a static field access, the resulting ValueMap's escaped flag is set to true ii. For a non-static field access, the result ValueMap is escaped if the pointer's ValueMap had escaped wherein the object whose field is being used has escaped, or the field had previously been assigned to an escaped ValueMap.

iii. For an assignment, the escaped flag from the RHS ValueMap is set in the LHS Defs ValueMap.

iv. The ValueMap.escaped flag propagates through ValueMap union operations: the unioned ValueMap escapes if either or both of the input ValueMaps had escaped.

Further, escaped flags on the variable's ValueMap is checked (1705) and the variable is designated as escaped if the flag is true (1706).

Further, the objects contained by the variables are checked (1707) and are designated as escaped (1709) wherein the object is pointed to by static variables and escapes if the static variable is actually accessed. In general an object escapes if there is a path in the object pointer graph from a static variable to the object AND that path has actually been traversed by multiple threads. If the mentioned conditions for the escape of the object are not true then the object is designated as not escaped (1708).

If a variable read/write is not considered to have escaped, race condition error is not reported (1602). However, if the read/write is considered to have escaped, the variable's escaped flag and the containing object's escaped flag are both set to true, and if the variable's type is an object type (non-primitive type), then the escaped flags of all objects pointed to by the variable are set to true(1603).

Further, according to the embodiment the second step wherein adequate synchronization of an escaped variable read/write is checked as follows:

i. If all writes to a static field are in the static initializer or all writes to a non-static field are in the constructor only (1604), then the access to those fields cannot cause a race condition because the static initializer and constructor are implicitly synchronized and no race condition is reported (1605). Similarly, there are special methods such as Servlet init methods which are definitely called before the object becomes available to multiple threads, and therefore writes to a static field in this method cannot cause a race condition.

ii. If all writes to an array element are in an array initializer or new array creation expression, then again a race condition is not possible.

iii. The set of locked objects reaching the variable access point is obtained (1606) by getting the reaching values of the LockedObjects global variable. If the ValueMap for LockedObjects has the escaped flag as true (1607), then it is assumed that there is adequate synchronization protecting the access, and the synchronized statements for the objects in the ValueMap of LockedObjects are marked as being necessary synchronizations (1611). The check for escaped flag is needed because a synchronization on an un-escaped object does not prevent concurrent threads from accessing the variable since each thread may have locked a different private/un-escaped object.

iv. If the LockedObjects ValueMap had not escaped, the check previous objects that are checked for synchronization on the path to the current variable access (1608) wherein the LockedObjects only contains the last object to be synchronized on the path, are reported to hava a reace condition error (1609), else a no race condition error (1610) is reported.

v. Finally if no synchronization of an escaped object has been found, then a race condition error is reported.

At the end of the simulation, all synchronization nodes are checked to see if they have been marked as necessary synchronizations(1612), there are no redundant synchronization defects (1613), else a redundant synchronization defect is reported (1614). The redundant synchronizations is detected by using the method as described herein.

The algorithm also allows user input in the form of annotations and rules which indicate classes that are not thread safe hence their methods must always be called with adequate synchronization.

Ordering Rule

According to an embodiment, there is provided a method for ordering rule algorithms wherein the problems to satisfy the requirements and the solutions are as described herein.

Problem:

Often programmers need to follow sequential ordering rules on events, such as event A must precede and/or follow or not follow event B. It is important to be able to easily express such rules and check for violations of these rules which could lead to serious errors.

Solution:

According to a preferred embodiment, a feature of expressing ordering rules using simple ordering rule syntax is provided, comprising of a plurality of event specifications and an ordering requirement between the events. Some of the ordering requirements are listed:

i. follow(event1, event2) (and optionally event3): event2 must follow event1 ii. precede(event1, event2) (and optionally event3): event1 must precede event2 iii. order(event1, event2) (and optionally event3): event1 and event2 must happen in same order iv. notOrder(event1, event2) (and optionally event3): event2 must not follow event1

Further according to the embodiment events may be specified in terms of method calls on specific bound object instances which can be used in addition to just method calls on any instance wherein an event is a set of method calls, some examples of the specifications of the events include:

i. a regular expression of the form ClassName.methodName(paramTypes . . . )

ii. a bound variable can be associated with the callee ("this") object (ClassName variable.methodName( . . . ) or with a parameter object (ClassName.methodName (ParamType variable, . . . )), or with the return value of the call (variable=ClassName.methodName( . . . )).

iii. An event can be specified as applying to one of multiple method calls by "event1∥event2" which simply unions all methods from the event1 and event2 regular expressions into the event's method calls set.

iv. An event can be specified as applying only to a specific return value of a method e.g. "connection.is Closed( )==true"

Figure 18:
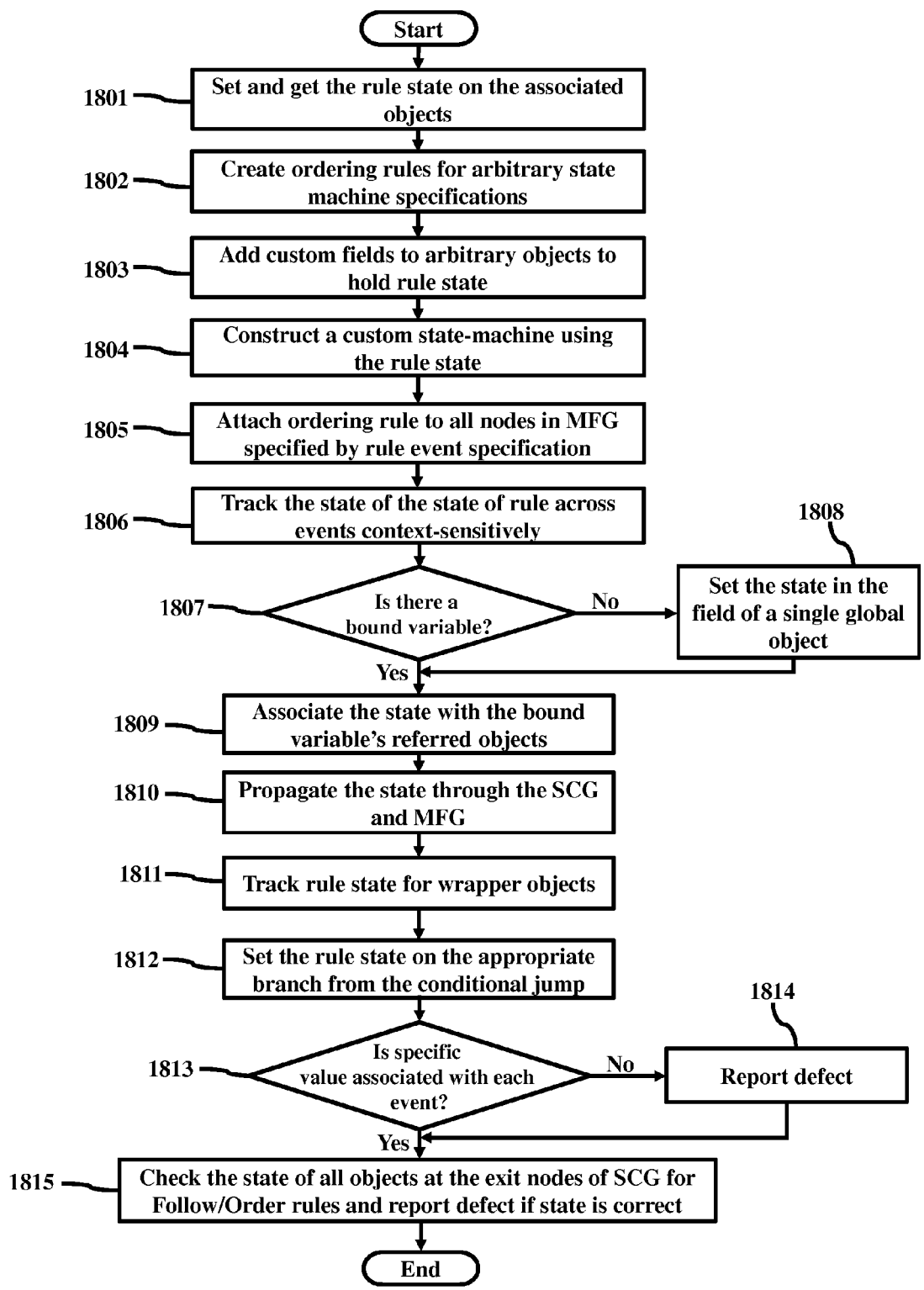
FIG. 18 illustrates a method for ordering rule algorithms according to an embodiment herein, and is a subflow detailing the step 720 in FIG. 7B.

FIG. 18 illustrates a method for ordering rule algorithms according to a preferred embodiment where the rule state on the associated objects is set and accessed (1801) wherein inter-procedural context- and flow-sensitive processing of ordering rules are supported. Ordering rules for arbitrary state machine specifications are created (1802) and custom fields to arbitrary objects to hold rule state are added (1803). A custom state machine using the rule state is constructed (1804). After the event specifications for a rule are parsed, the rule is then attached to all the method call nodes in the MFG corresponding to the event specification (1805). A simple state machine is used to track the state of the rule across events context sensitively (1806) wherein the state is one of Initial which indicated that no events have occurred, e.g., State_Method1, State_Method2, State_Method3 which indicated the event which has occurred. The ordering rule specification requires that the state of the rule have a specific value at each event, otherwise an error is reported.

Further, according to the embodiment, the state is associated with the objects referenced by the bound variable specified in the rule, by creating an artificial "RuleState" field in the object and setting the values of that field. The existence of the bound variable is checked (1807), if there is no bound variable then the state is set in the field of a single global object (1808). If the bound variable exists, the state is associated with the bound variable's referred objects (1809). The rule state thus propagates through the SCG and MFG in a context- and flow-sensitive manner (1810).

At method call events, the following rule state checks are done:

If the method call corresponds to event iii of the rule, then:
If semantics==EXACT, report bug if state !=STATE_METHOD2
If semantics==FOLLOW, no bug (event1+2 must be followed by 3 wherein 3 without 2 is accepted).
If semantics==PRECEDE, report bug if state !=STATE_METHOD2
If semantics==NOT_EXACT, report bug if state==STATE_METHOD2
In all cases set state=STATE_METHOD3 only if state==2.
If the method call corresponds to event2 of the rule, then:
If semantics==EXACT, report bug if state !=STATE_METHOD1
If semantics==FOLLOW, no bug (event1 must be followed by 2, wherein 2 without 1 is accepted).

If semantics==PRECEDE, report bug if state !=STATE_METHOD1
If semantics==NOT_EXACT: if (event3==null) report bug if state==STATE_METHOD1
   else no bug (ok to see event2 without 1)
In all cases set state=STATE_METHOD2 only if state==1.

According to an embodiment the rule state for wrapper objects are tracked (1811). This is especially critical for resource leakage rules where one input/output stream can wrap other streams, but they all access a single underlying resource, so closing one stream effectively closes all the streams. This is done by setting the ruleState field's values to point to the wrapped object (1812), then during rule event processing the wrapped object's ruleState field is get/set. This also allows multiple levels of wrapping.

Also, the embodiments herein provide for specifying an event as occurring only when a method call has a specific return value (1813), e.g. "connection.is Closed( )==true". This is done by changing the conditional expression to "connection.RuleState==State_MethodN", then the RuleState gets set on the appropriate branch from the conditional jump correctly. If no specific value is associated with each event a defect is reported (1814).

At the end of simulation, the state of all objects having state for all Follow/Order ordering rules is checked at the Exit node of the entire SCG which corresponds to the exit of all entry point methods (1815), to check for cases where the Event2 or Event3 has not occurred on some path from Event1/Event2.

Finally, for complex ordering rules which cannot be expressed using the simple ordering rule syntax above, a set of APIs are provided to allow the rules to explicitly set and get the rule state on the associated objects. This allows the creation of ordering rules for arbitrary state machine specifications. User-written rule scripts can add custom fields to arbitrary objects. These fields hold rule state. The field values can be read and written so that the rule can construct a custom state machine. See the rule attachment and execution framework below.

Chunking Algorithm

According to an embodiment, there is provided a chunking algorithm wherein the problems to satisfy the requirements and the solutions are as described herein.

Problem:

For large programs, it is possible that the memory and computation time requirements for simulating the whole program exceed the memory/time available. In such cases, it is necessary to split the program into chunks and simulate the chunks separately, then combine results as much as possible.

Figure 19A:
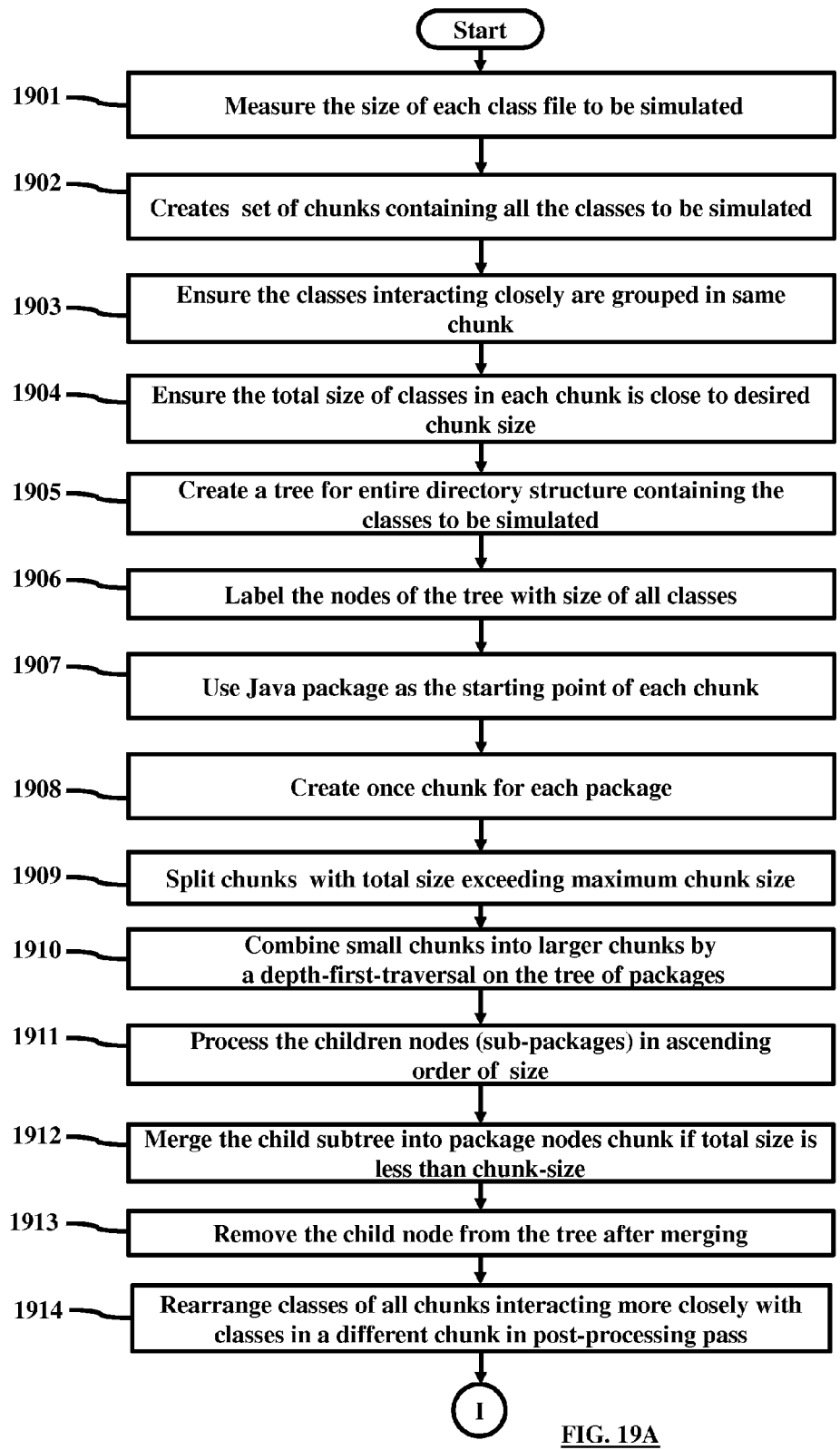
FIGS. 19A and 19B are continuing flow charts illustrating a method to perform chunking of programs according to an embodiment herein.
Figure 19B:
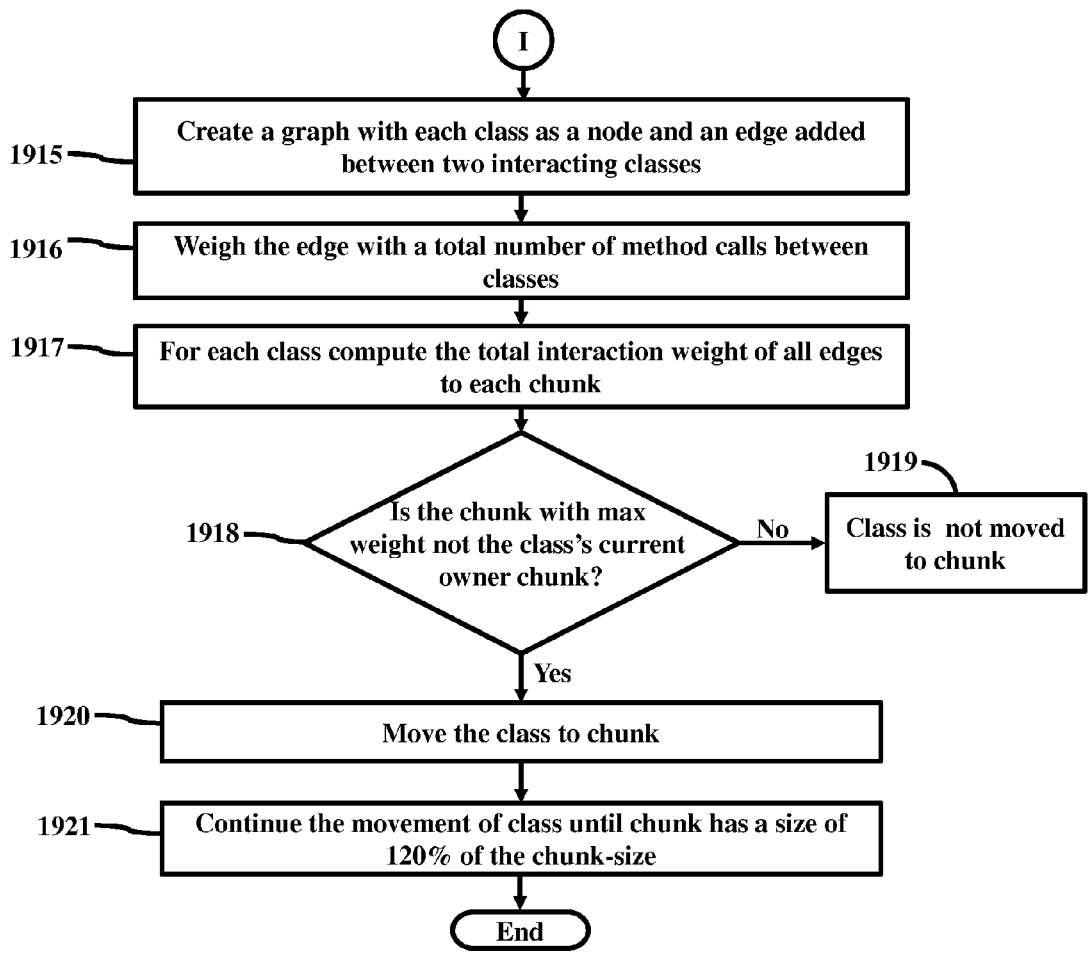

Solution:

According to a preferred embodiment, a chunking algorithm is used to conduct a "divide-and-conquer" strategy for large programs. The user can specify a chunk size in bytes for the maximum size of each chunk to be simulated. FIGS. 19A and 19B are continuing flow charts illustrating a method to perform chunking of programs wherein the chunking algorithm measures the size of each class file to be simulated (1901), and then creates a set of chunks which contain all the classes to be simulated (1902), where the total size of all class files in each chunk is less than the maximum.

Further, the algorithm ensures that classes which interact closely with each other are grouped together in the same chunk (1903). This allows accurate inter-procedural simulation for the classes. In addition, the total size of classes in each chunk should be as close as possible to the desired chunk-size (1904).

A tree is created for the entire directory structure containing the classes to be simulated (1905). Nodes of the tree are Java packages, which are labeled with the size of all classes they contain including classes in sub-packages (1906). A Java package is used as the starting point for each chunk (1907), since a Java package typically contains closely related classes. An initial pass is done to create one chunk for each package (1908). Java packages which directly contain classes having total size which exceeds the maximum chunk size are split into (package-size/chunk-size+1) chunks (1909).

Then a depth-first-traversal is done on this tree of packages to combine chunks that are too small into larger chunks whose size is closer to the required chunk-size (1910). While visiting each package node P, children nodes (which represent sub-packages) are processed in ascending order of their size (1911). Each child subtree is attempted to be merged into P's chunk, if the total size of P's chunk and the child node is less than the chunk-size (1912). Once a child node is merge into its parent's chunk the child node is removed from the tree (1913). After attempting to merge all child nodes, any remaining child nodes which could not be merged are further explored deeper in the depth-first traversal.

A post-processing pass over all the chunks re-arranges classes which interact more closely with classes in a different chunk than the chunk they are initially assigned to (1914). For this a graph where each class is a node and an edge is added between two classes which interact together is created (1915). A class X interacts with a class Y if a method in Y may be called from code of the method bodies in X, or a method in X may be called from code of the method bodies in Y. The edge is weighted with the total number of such method calls between plurality of classes e.g., from X to Y or Y to X (1916). Then for each class in this graph, the total interaction weight of all edges to each chunk's classes is computed (1917), and if the chunk with which the class has the largest interaction weight is not the class's current owner chunk (1918), then the class is moved to the chunk (1920) else the class is not moved to the chunk (1919). This movement of classes is done till the chunk C has size of 120% of the chunk-size (1921), at which point the movement is stopped to prevent C from becoming too large and swallowing up too many other chunks.

Modeling Value, Valueset and Unknown Value

According to an embodiment, there is provided a method for modeling Value, ValueSet and Unknown value wherein the problems to satisfy the requirements and the solutions are as described herein.

Problem:

While a run-time execution of a program always operates on concrete values (primitive values and pointer address values), a simulation of the program must deal with unknown input values as well as multiple possible values of a variable at a given point in the program. The possible values of a variable can be very large in number, e.g. in a loop which can iterate for a very large number of iterations and creates one new value in every iteration by incrementing a counter.

Solution:

According to a preferred embodiment, a value of a variable during simulation can be of one of the following kinds:
i. PrimitiveValue: this represents a known primitive typed value such as a boolean, integer, floating point value, it stores the actual concrete value.
ii. RangeValue: this represents a range of numeric primitive values, it has an upper and lower bound.
iii. UnknownPrimitiveValue: this represents an unknown primitive value.
iv. ObjectValue: this represents an object instance. There is one ObjectValue for each object allocation site (Java "new" operator, array initializer, and first usage point of an unknown object). Object values representing Strings further contain the String value which they represent, if known. Object values also contain the type of the object as available at the allocation site.

v. NullPointerValue: this represents a null pointer value.

vi. ExactRelationalValue: this represents a bi-directional relationship between two variables, as described in the algorithm for relationship sensitivity.

Figure 20:
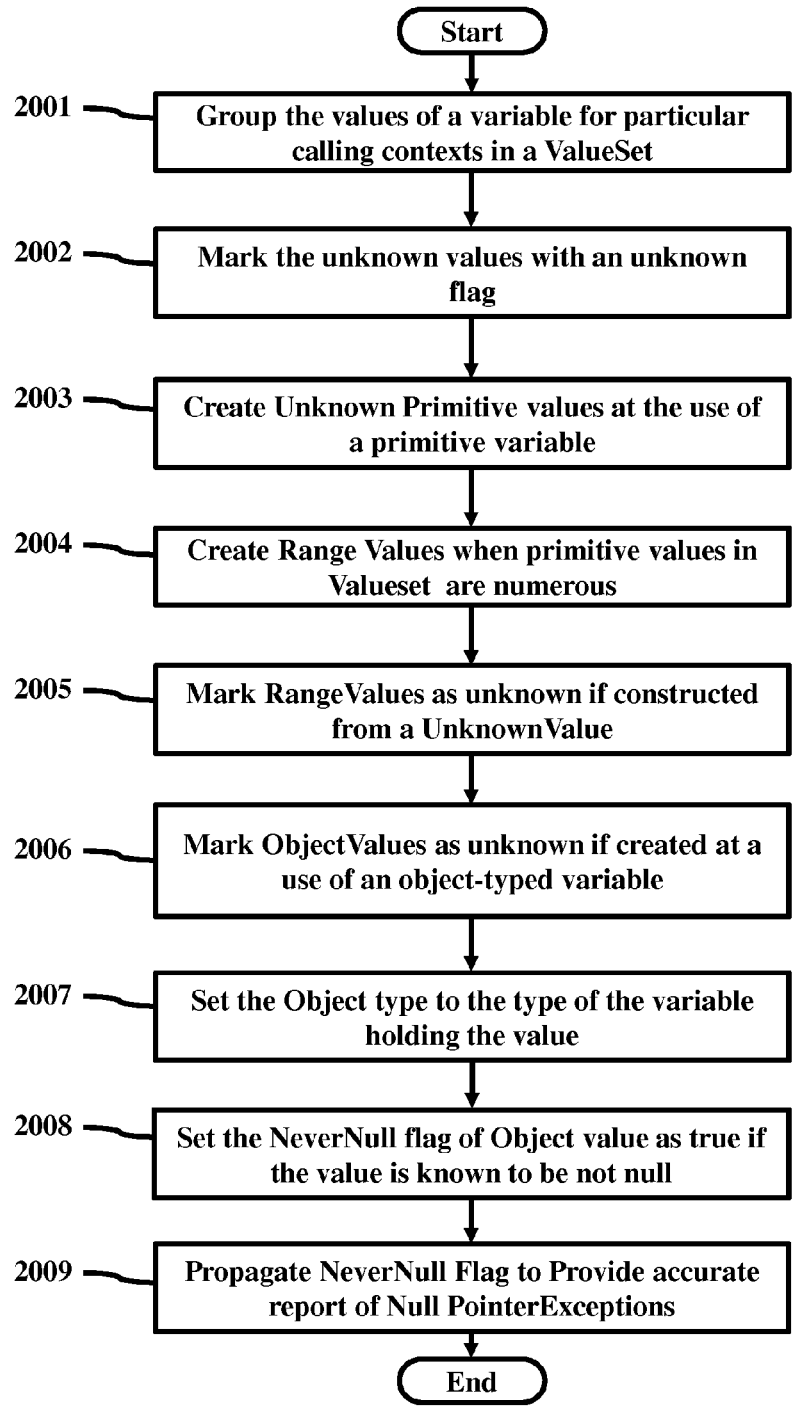
FIG. 20 illustrates a method to model method Value, ValueSet and Unknown value according to an embodiment herein, and is a subflow detailing the step 722 in FIG. 7B.

FIG. 20 illustrates a method to model method Value, ValueSet and Unknown value wherein the values can be grouped together in a ValueSet which is a set of values that a variable can have for a particular set of calling contexts (ContextGraph) (2001).

Further, the unknown values are marked with an unknown flag (2002). UnknownPrimitiveValues are created at the use of a variable of primitive type (2003), if there was no def for that variable on one or more calling context paths reaching the use point.

RangeValues may also be created when there are too many primitive values in a ValueSet (2004), in that case the RangeValue's upper and lower bounds are the largest and smallest values in the ValueSet. RangeValues may be marked unknown if they were constructed from a UnknownValue (2005), e.g., for a conditional expression such as a loop bound that restricted a loop iterator variable's unknown value to be within a range.

ObjectValues may be marked unknown if they were created at a use of an object-typed variable (2006), if there was no def for that variable on one or more calling context paths reaching the use point. The type of the ObjectValue is set to the type of the variable which holds the value (2007). Unknown ObjectValues also contain a "NeverNull" flag which is true if the value is known to not be null (2008),e.g. for a prior check for null. The NeverNull flag is also flow- and context-sensitively propagated through the SCG and MFG in order to provide accurate reporting of NullPointerExceptions (2009).

Precise Modeling of Object Types and Handling Multiple Callee Methods at Virtual Method According to an embodiment, there is provided a method for precise modeling of object types and handling multiple callee methods at virtual method calls wherein the problems to satisfy the requirements and the solutions are as described herein.

Problem:

While objects created at concrete allocation sites (Java "new" and array initializer) have a concrete type, unknown ObjectValues types are not known exactly at their allocation site. Further the type may be different at different places in the program since the object may get cast to different concrete types. It is critical to model types precisely, because at method call sites to non-static (virtual) methods, there may be potentially a very large number of concrete method bodies which could be called (e.g. the Object.toString( ) call may call the toString( )method body which is typically present in most classes in the program). Simulating all those methods can cause an explosion of the call graph complexity and hence the memory and compute time requirements of the simulation, apart from causing the result values to become inaccurate because of simulating code which is never executed at runtime.

Figure 21:
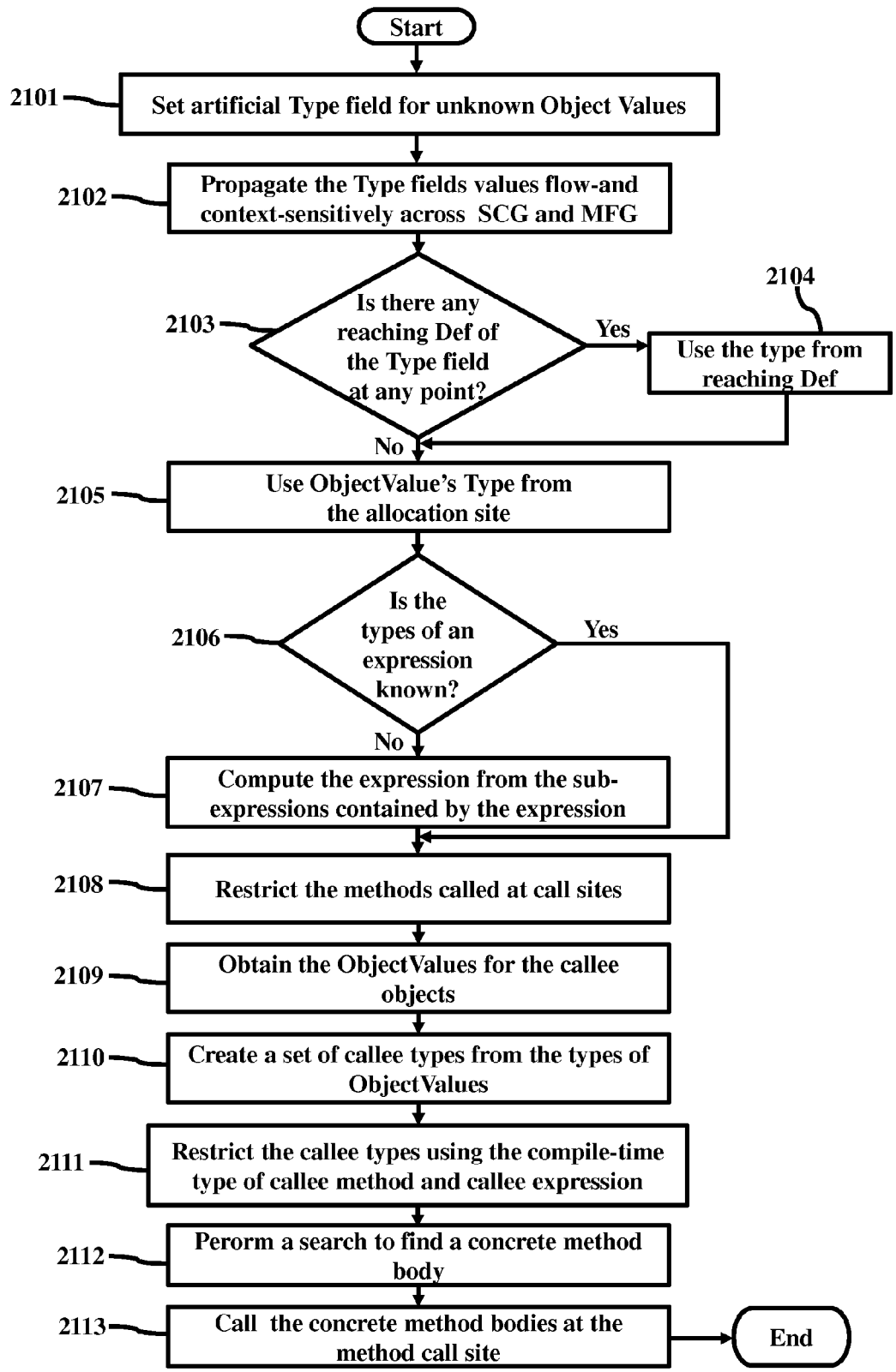
FIG. 21 illustrates a method for precise modeling of object types and handling multiple callee methods at virtual method calls according to an embodiment herein, and is a subflow detailing the step 724 in FIG. 7B.

Solution:

FIG. 21 illustrates a method for precise modeling of object types and handling multiple callee methods at virtual method calls according to a preferred embodiment. To accurately model types, the embodiments herein associate with every object instance an artificial Type field (2101). This field is set for unknown ObjectValues whose type is specialized at a Java cast expression or a Java instance of expression. The Type field is also set for unknown ObjectValues pointed-to by the "this" variable in a non-static method bodies, to the class which contains the method body. The Type field's values are propagated flow- and context-sensitively across the SCG and MFG (2102), thus ensuring that the unknown ObjectValue has the most accurate type at any given point in the program, which may be different at different points. The existence of reaching Def of the Type field at any point where an unknown ObjectValue's type is checked (2103), the type from reaching Def is used (2104), else the ObjectValue's type from its allocation site is used (2105) which is the type of the variable whose use caused the unknown ObjectValue to be created.

Types are also associated with every expression in the program. If the type of an expression is known for certain types of expressions (2106), e.g., A literal value expression for primitives/Strings has primitive/String type, a local variable or field access expression has the type of the variable/ field, a method call expression has the return type of the method, the types of remaining expressions are computed from the sub-expressions contained by the expression (2107).

Further, according to the embodiment, accurate type information to restrict the methods which are called at call sites are used (2108). At method call sites to non-static methods, all ObjectValues for the callee object are obtained (2109). A Set of callee types is created from the types of the ObjectValues (2110) wherein either the value of the Type field or the type set in the ObjectValue at its allocation site. The callee types are further restricted using the compile-time type of the callee method (as specified in the bytecode's invokevirtual instruction) and the compile-time type of the callee expression (2111). Then for each concrete subclass of each callee type, a search is made in the class inheritance chain from the concrete subclass upwards to find a concrete method body (2112). All such concrete method bodies are then called at the method call site (2113). This algorithm ensures that all type information available to the simulation is used to minimize set of methods which are invoked during simulation to be as close as possible to the methods which can actually be called at runtime.

Array Modeling as Associative Arrays

According to an embodiment, there is provided a method for array modeling as associative arrays wherein the problems to satisfy the requirements and the solutions are as described herein.

Problem:

An array can hold a large number of element values, and the length of the array is often not known for arrays which were not created at array initializer expressions. So it is often not possible to separately store the value of each array element, and the number of elements may be too large. A compact yet reasonably accurate representation of array element values is needed.

Figure 22:
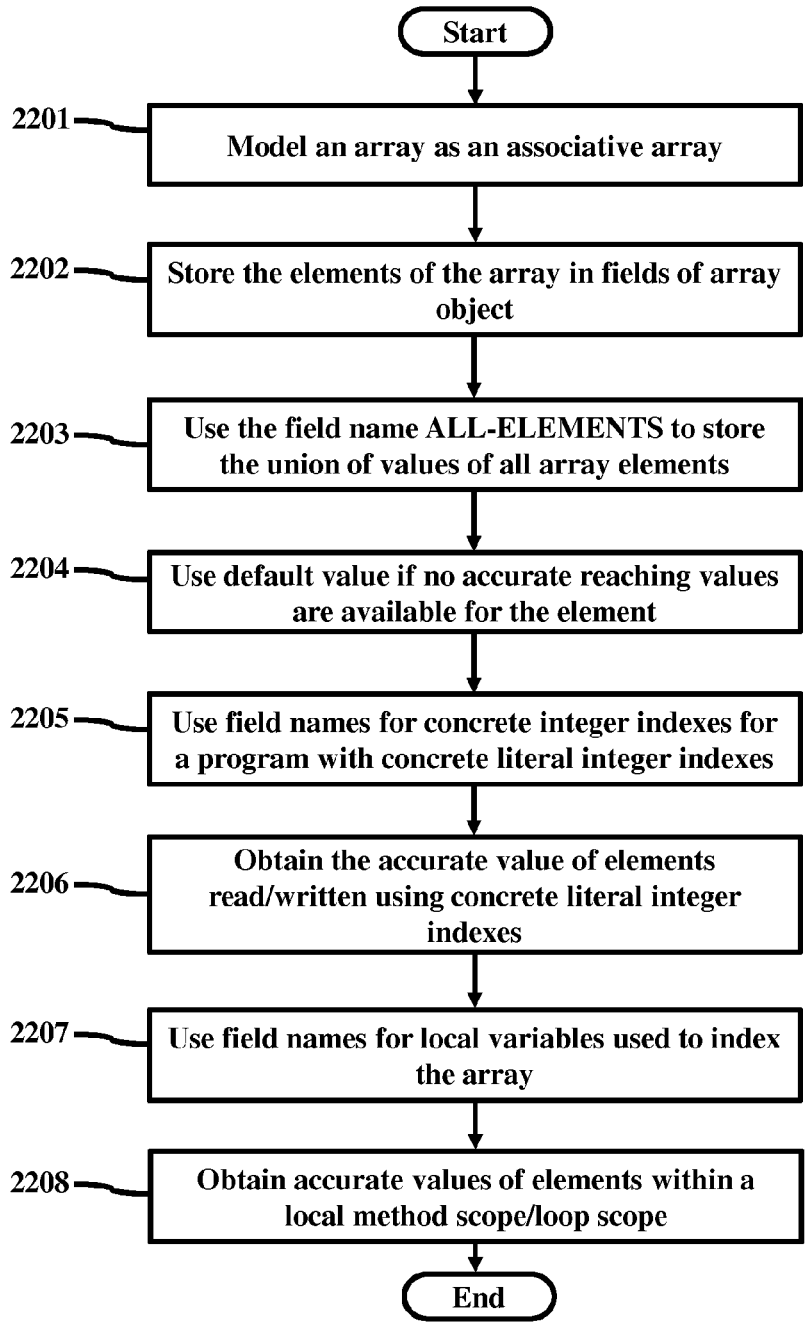
FIG. 22 illustrates array modeling as associative arrays according to an embodiment herein, and is a subflow detailing the step 726 in FIG. 7C.

Solution:

FIG. 22 illustrates array modeling as associative arrays according to a preferred embodiment, an array as an associative array is modeled (2201), where the array index can include but not limited to integral number, String name. Elements of arrays are thus stored effectively like fields of array objects (2202). A distinguished field name ALL_ELEMENTS is used to store the union of values of all array elements (2203), and the default value is used which is used if no other more accurate reaching values are available for an element (2204). Field names for concrete integer indexes, e.g., '0', '1', are used when the program has concrete literal integer indexes, e.g., array[0]= . . . , (2205). This allows accurate values of elements to be obtained in the common case when the array is a small array whose elements are read/written using concrete literal integer indexes (2206). Field names for local variables are used to index the array, e.g., Loop iterator variables array[i]= . . . , are used (2207). This allows accurate values of elements to be obtained in the common case within a local method scope or loop scope (2208).

Modeling Collection Using Generics

According to an embodiment, there is provided a method for modeling collection using generics wherein the problems to satisfy the requirements and the solutions are as described herein.

Problem:

Java programs often use the java.util.Collection APIs to store Lists, Sets, and

Maps of objects. Simulation needs to accurately track values of objects that are stored into and then read from these Collections.

Solution:

According to a preferred embodiment, Collections to allow tracing values written to/read from a collection is modeled.

Figure 23:
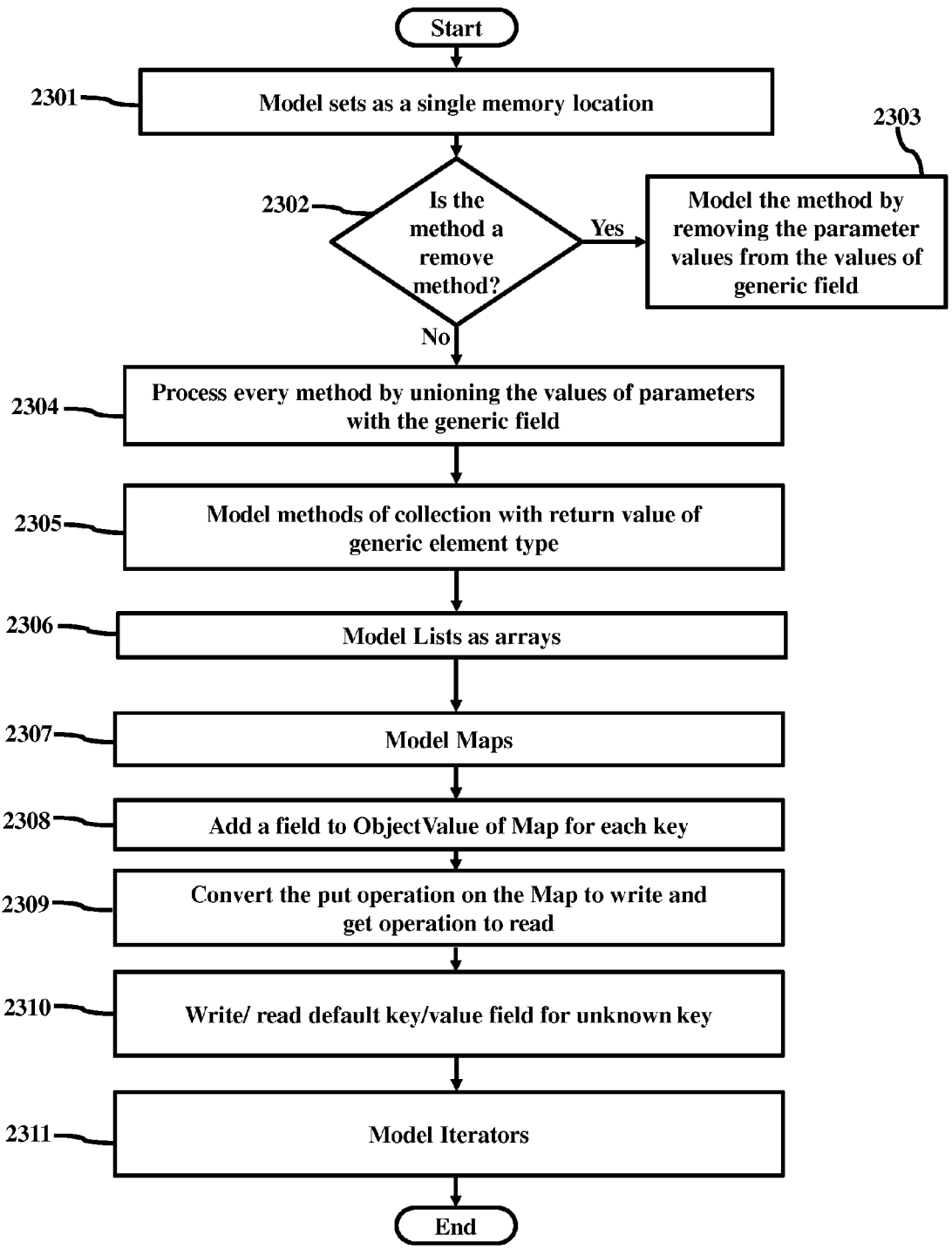
FIG. 23 illustrates a method to model collection using generics according to an embodiment herein, and is a subflow detailing the step 728 in FIG. 7C.

FIG. 23 illustrates a method to model collection using generics according to a preferred embodiment. Sets and other unordered Collections which have a single kind of element type are modeled as a single memory location (2301) wherein a field is added to the ObjectValue for the Collection, the name of the field is the name of the generic element type (usually "E"). If the method is a remove method of the Collection (2302) then the methods are modeled by removing the parameter values from the values of the field E (2303), every other method of the Collection that takes a parameter of generic element type E, e.g., Collection.add(E o), is processed by unioning the values of the parameter with the values of the generic field E of that Collection object (2304). Every method of the Collection whose return value is of the generic element type E, e.g. E List.get(int i), is modeled by getting the values of the field E of that Collection object (2305).

Further, according to an embodiment lists are modeled similar to arrays (2306) as described herein. This allows accurately reading/writing values of specific element indexes of the List, for the List.get/set/add APIs.

Further according to an embodiment, maps are modeled as objects with fields (2307). For each key value a field is added to the ObjectValue for the Map (2308). The Map.put(key, value) operation is converted to a write: "Map.keyField=value;" and the Map.get(key) operation is converted to a read of "Map.keyField" (2309). If the value of the key is unknown, then a default key/value field whose name is the generic type name for the key/value (usually "K" and "V") is written/read (2310). Further, the iterators are modeled (2311).

The Collection modeling also supports Iterators and other objects which are created from Collections and can read/write the Collection's elements. This is done by assigning the Iterator's field E to the Collection's field E or K or V field, depending on the specific generic type names used in the Collection method, e.g., Iterator<E> iterator( ); used to create the Iterator.

Further according to the embodiment the parameters/return values of collection methods required to be mapped to appropriate fields of the ObjectValue for the collection may identified by the generic type names, without creating a custom implementation for each method of each collection class.

Inter-Procedural Exception Handling

According to an embodiment, there is provided a method for inter-procedural exception handling wherein the problems to satisfy the requirements and the solutions are as described herein.

Problem:

Java exceptions can be thrown from method bodies and caught by enclosing "catch"/"finally" blocks in the same method body or in caller method bodies. There may be multiple enclosing catch blocks for different types of exceptions. "Finally" blocks catch and then re-throw the exception. The flow of data values along such exception paths needs to be accurately simulated, because these exception paths are often not tested and errors are often found on exceptional code paths.

Solution:

According to a preferred embodiment there is provided accurate simulation of exceptional paths. In the MFG, a "throw" statement marks the end of a BasicBlock, and that BasicBlock does not have any successor BasicBlocks in the MFG for the method. The first BasicBlock of "catch" and "finally" blocks are successors of the last BasicBlock of the "try" block.

A throw statement contains a ExceptionMap [exception type, enclosing catch BasicBlock in same method] which specifies the catch block (if any) which catches an exception of the exception type. Method call expressions (and object creation "new" expressions) also contain a similar ExceptionMap. The ExceptionMap entries are ordered in the same order as enclosing catch blocks, to ensure that the correct catch block is found.

Figure 24:
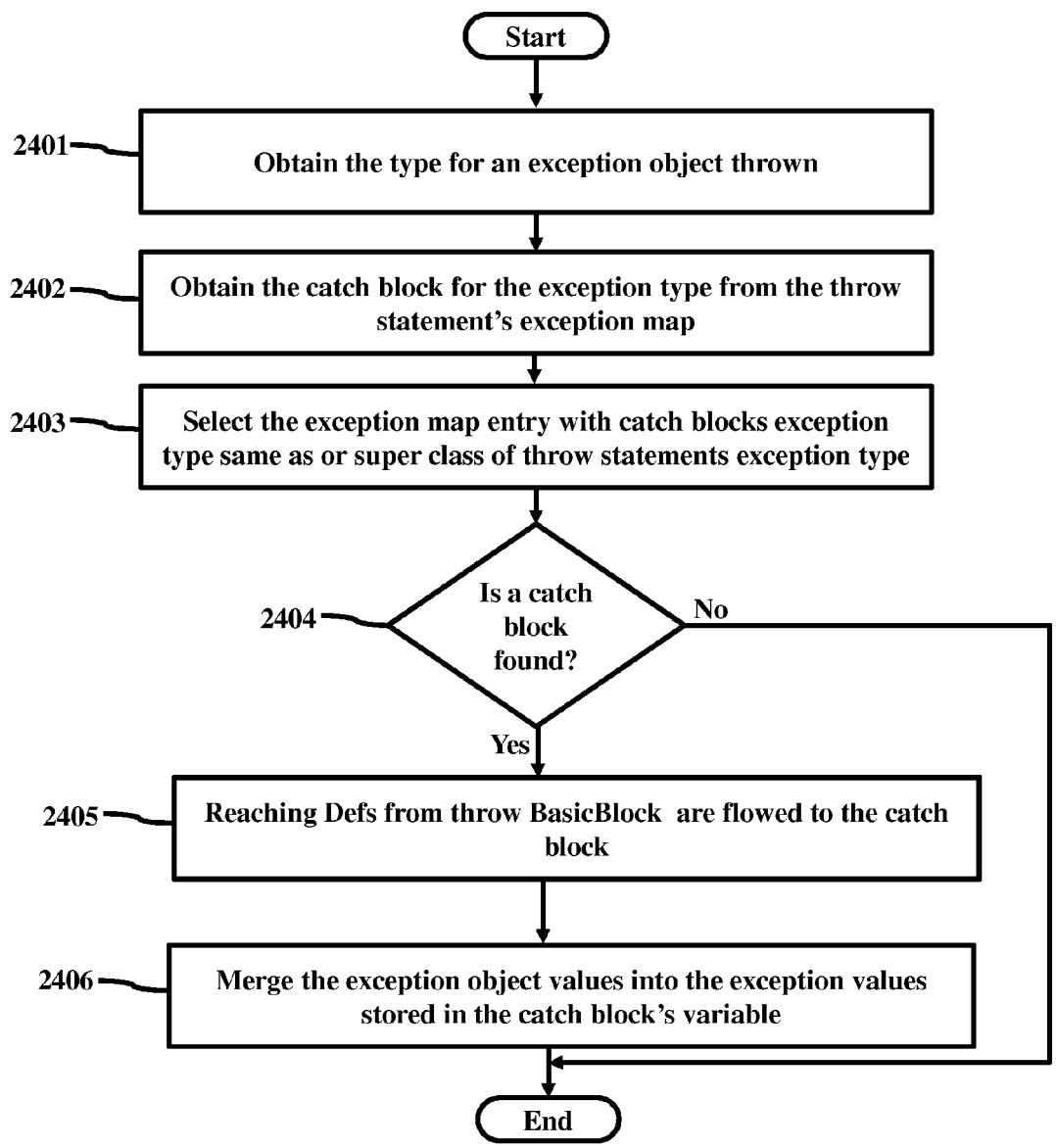
FIG. 24 illustrates intra-procedural exception handling according to an embodiment herein, and is a subflow detailing the step 730 in FIG. 7C.

FIG. 24 illustrates intra-procedural exception handling according to a preferred embodiment, when simulation reaches a throw statement, the types of the exception object being thrown are obtained (2401), and for each type the catch block for the exception type is obtained from the ExceptionMap wherein there exists at least one ExceptionMap (2402). The ExceptionMap entries are looked at in order and the first entry whose catch block's exception type is the same as or super-class of the throw statement's exception type is selected (2403). The existence of a catch block is checked (2404), if the catch block is found then ReachingDefs from the throw BasicBlock are flowed to the catch block (2405), and the exception object values are merged into the exception values stored in the catch block (2406).

Figure 25:
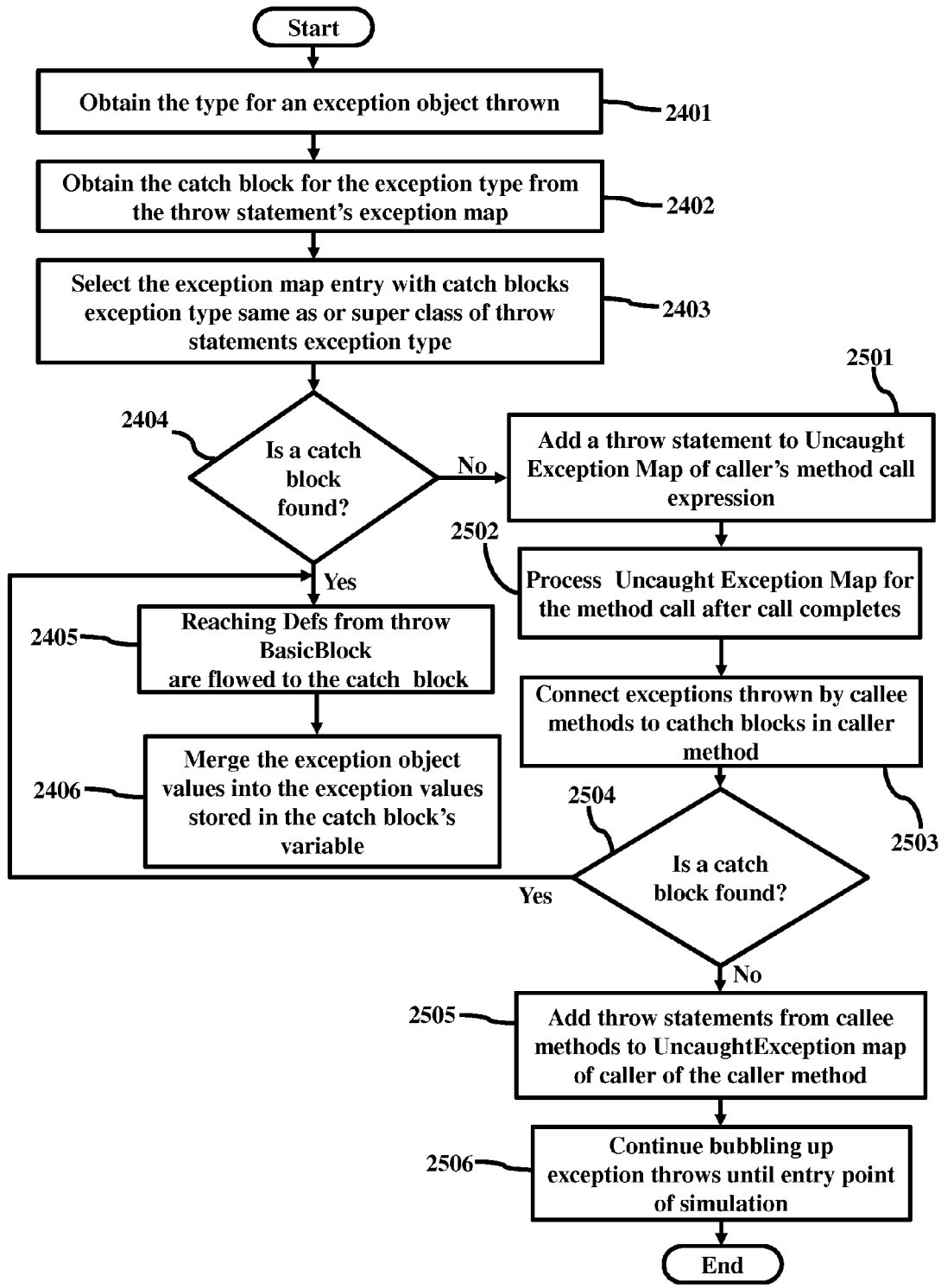
FIG. 25 illustrates the inter-procedural exception handling according to an embodiment herein, and is a subflow detailing the step 730 in FIG. 7C.

FIG. 25 illustrates the inter-procedural exception handling according to preferred embodiment wherein while processing an exception throw, if no catch block is found in the current method, then the throw statement is added to an UncaughtExceptionMap of each caller method call expression of the current method, along with the ReachingDefs of global variables from the throw BasicBlock (2502). After a method call has been processed wherein all callee method bodies have been simulated, the UncaughtExceptionMap for the call is processed (2502), and all exceptions thrown by callee methods are connected to catch blocks in the caller method, using the ExceptionMap stored in at method call expression (2503). Further, if existence of the catch block is checked (2504), if the catch block is found then ReachingDefs from the throw BasicBlock are flowed to the catch block (2405), and the exception object values are merged into the exception values stored in the catch block (2406). If the catch block is not found, the throw statement from callee method is added to the UncaughtExceptionMap of each caller of the caller method along with ReachingDefs from the caller method and callee method (2505). Thus exception throws bubble up the call graph until they are either caught at a catch or finally block or an entry point method is reached which implies that the exception is an uncaught exception for the code being simulated (2506).

The problem-solution explained here can be easily applied to Inter-procedural exception handling in other languages than Java. Problem-solution in other languages may include handling exception handlers instead of "try", "catch" and "finally" blocks.

Inlining Method Body

According to an embodiment, there is provided a method for method body inlining wherein the problems to satisfy the requirements and the solutions are as described herein.

Problem:

For accuracy and performance, it is often preferable to inline callee method bodies into the caller method at the call site.

Solution:

According to a preferred embodiment, JavaBean get/set methods are inlined into a read/write of the corresponding field. Method call sites are selected for inlining if the method call wherein it is a non-recursive call, further the method was specified by the user as required to be inlined or if (#callee methods<maxCalleeMethod) AND (#instructions*#callers<maxInlineSize) for each callee method (2601)

Figure 26:
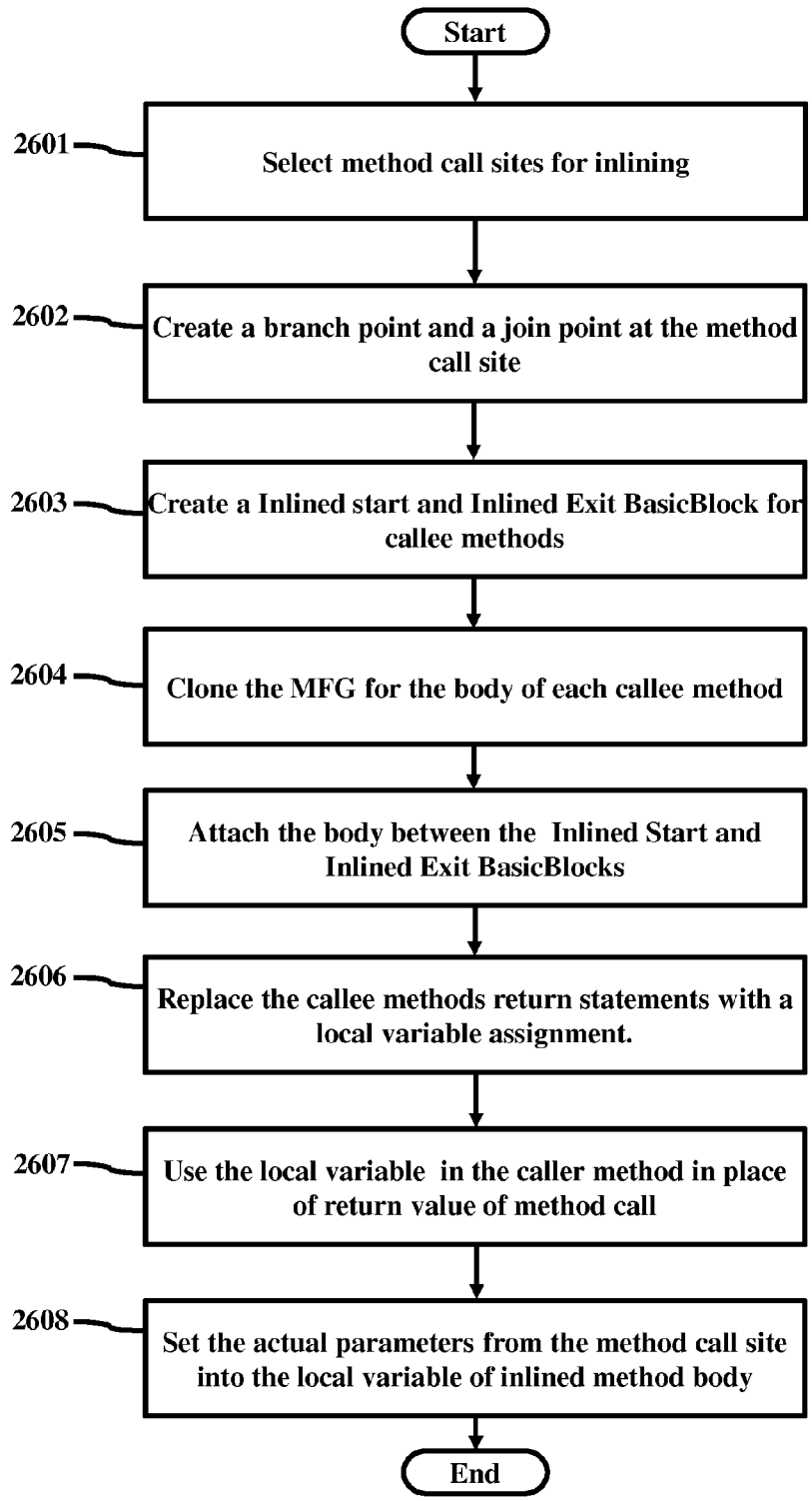
FIG. 26 illustrates a method for method body inlining according to an embodiment herein, and is a subflow detailing the step 732 in FIG. 7C.

FIG. 26 illustrates a method for method body inlining according to the embodiment, wherein the steps involved include:

i. Creation of a branch point at the method call site, and a successor BasicBlock is created for each of the callee methods (2602). This successor BasicBlock will be the special InlinedStart method after which the body of the callee method will appear. The join point corresponding to the branch point is also created and a predecessor BasicBlock is created for each callee method, which will be the special InlinedExit BasicBlock marking the end of the inlined callee method body (2603).

ii. The MFG for the body of each callee method is cloned (2604) and is attached between the InlinedStart and InlinedExit BasicBlocks (2605). This is a complex and tricky process which ensures consistency of all data structures in the caller method at the end of inlining.

iii. If the callee method has return statements, they are replaced by an assignment to a special "Result_Method-Name" local variable (2606), wherein the local variable is then used in the caller method in place of the return value of the method call (2607).

iv. During simulation, while processing the InlinedStart BasicBlock, the actual parameter values from the method call site which includes "this" parameter for the callee object, are set into local variables for the formal parameters of the inlined method body (2608).

Methods that can be modeled as a simple null check on their parameter value are inlined into a "param==null" expression.

Compute Expressions

According to an embodiment, there is provided a method for computing expressions wherein the problems to satisfy the requirements and the solutions are as described herein.

Problem:

Each expression in the program performs operations on operand values in accordance with the semantics defined by the programming language. Computing the result values accurately in a context- and flow-sensitive manner is critical to accurate simulation.

Solution:

The simulation engine effectively behaves like a Virtual Machine, performing arithmetic, logical and pointer computations on values. The main differences are that for each expression, it performs the computations for many operand values which are available in the context-sensitive ValueMap for the operand wherein at run-time there is always exactly 1 value for each operand on which the computation is performed, and the simulation engine has to deal with unknown values. Further, at run-time the operand value is always concretely known.

Figure 27:
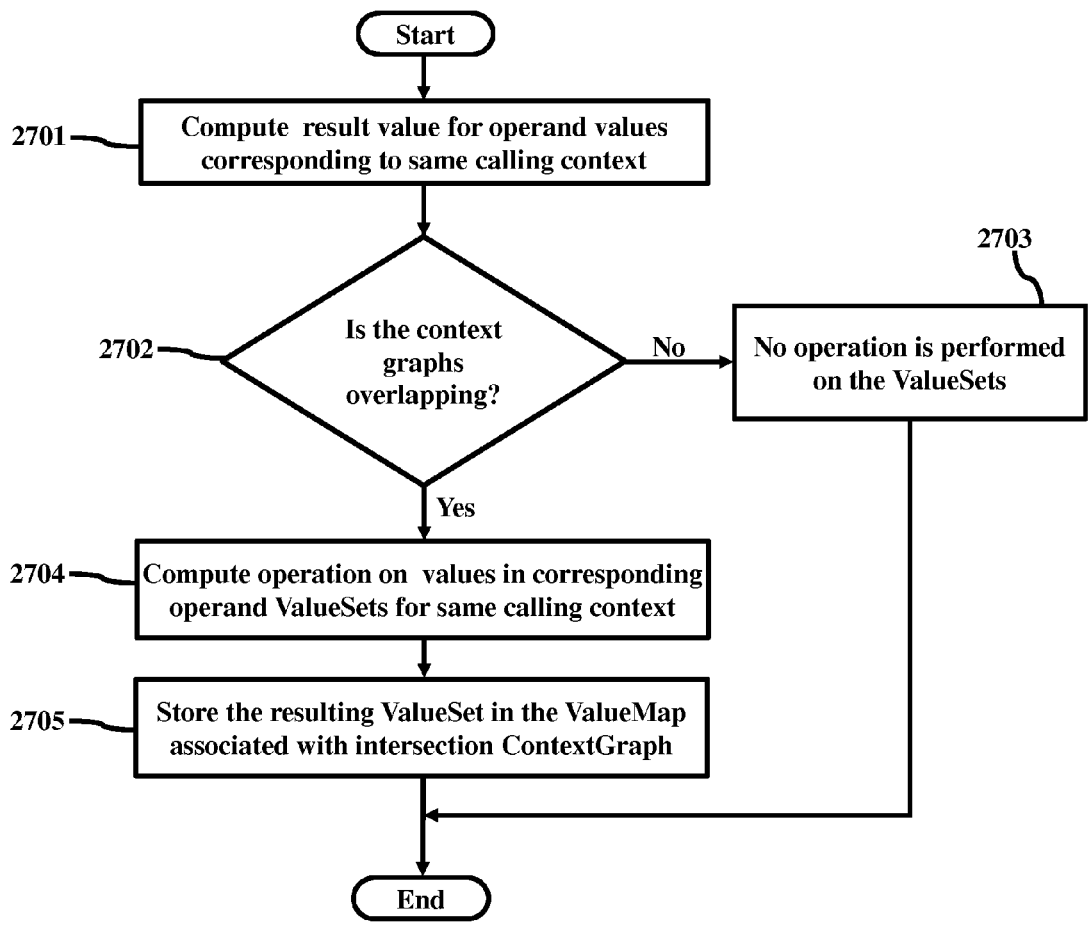
FIG. 27 illustrates a method to compute expression according to an embodiment herein, and is a subflow detailing the step 734 in FIG. 7C.

FIG. 27 illustrates a method to compute expression according to a preferred embodiment wherein context- and flow-sensitive computation of operations is described wherein the result value for operand values corresponding to same calling context is computed (2701). The context graphs is checked for overlapping (2702), if the context graphs do not overlap, no operations are performed on the ValueSets (2703). If the context graphs overlap, the operation on values in corresponding operand ValueSets for same calling context is computed (2704) and the resulting ValueSet is stored in the ValueMap associated with intersection ContextGraph (2705).

For unary operations, there is one operand, each result value is computed by applying the unary operator to each operand value. The ValueMap for the result has the same ContextGraph entries as the ValueMap for the operand.

For binary operations, there are two operands which each have a ValueMap. The operation is performed only for pairs of values corresponding to the same calling context. For each pair of entries in the ValueMaps of the two operands, if the ContextGraphs for that pair of entries overlaps (has a non-zero intersection) then the operation is performed on the corresponding ValueSets, and the resulting ValueSet is stored in the result ValueMap associated with the intersection ContextGraph. Note that an array[index] operation is also a binary operation, and a pointer.field=RHSvalue; is also a binary operation for which the operand values are the pointer value and the RHSvalue.

For ternary operations, e.g. array[index]=RHSvalue; there are 3 operands with 3 ValueMaps, so a similar intersection of ContextGraphs is done across all 3 operands to ensure context-sensitivity.

Figure 28:
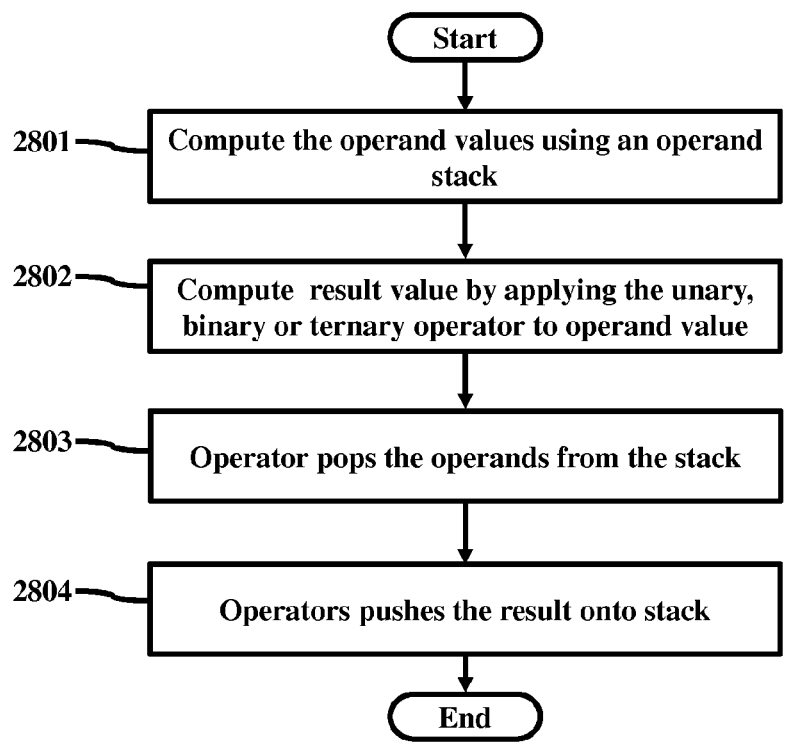
FIG. 28 illustrates the special handling for unknown values of operands for each type of operator according to an embodiment herein.

FIG. 28 illustrates the special handling for unknown values of operands for each type of operator according to a preferred embodiment, in general the resulting value will also be an unknown value. Expression values are computed using an operand stack (2801). Compute the result value by applying the unary, binary or ternary operator to operand value (2802) wherein each operator pops its operands from the stack (2803) and pushes the result back onto the stack (2804). This is similar to the Java Virtual Machine's usage of the operand stack. This optimizes memory usage because intermediate values are held only as long as they are needed and then their memory can be reclaimed.

Check Redundancy and Detect Dead Code

According to an embodiment, there is provided a method for redundant check and dead code detection wherein the problems to satisfy the requirements and the solutions are as described herein.

Problem:

Some condition checks in a program are redundant wherein the check will always be true or always false at runtime. This typically indicates a flaw in the logic of the program. A common scenario is when a check for nullness follows a prior de-reference of a pointer: if the pointer was actually null at run time the de-reference would throw a NullPointerException so the null check is too late.

Some code paths in a program are dead wherein they are never executed at run-time. This typically happens for code following a check that is redundant, so the code on the opposite path will never be executed. It is important to avoid simulating dead code and avoid propagating values originating in dead code to other parts of the program, to maintain high accuracy.

Solution:

FIG. 29 illustrates a method for redundant check and dead code detection according to a preferred embodiment wherein redundant checks are detected at the SpecialAssert nodes following each path leaving a conditional jump (2901). The SpecialAssert determines if the condition evaluates to true for each value of the variable being checked in the condition. If the output values satisfying the condition are empty (2902) then it means the path headed by that SpecialAssert node will never be reached at run-time hence is a dead path (2903). If the output values satisfying the condition are the same as the input values of the variable (2904), then it means that the opposite path will have an empty set of output values which implies that the opposite path will never be reached at run time hence is dead (2905). An error is reported at such redundant checks (2906).

In many scenarios there are defensive checks of parameter values at the top of a method body or a defensive check of return values from method calls, for cases where a program depends on potentially unknown values from external code. Such checks may be found to be redundant by the algorithm above, but are not reported as errors to avoid cluttering the error report with false alarms.

Dead code can also be identified when there is code after a method call to a method which always throws an exception on all paths. Such methods can be identified during construction of the method body, or specified by the user. Then the path following the method call is a dead path.

Once a path has been identified a dead path, all BasicBlocks in that path are marked as dead, and when the path reaches a join point having other predecessors, the join point BasicBlock is marked as dead if all predecessor BasicBlocks are dead.

Code in a dead BasicBlock is not simulated, and no ReachingDef values are propagated into or out of a dead BasicBlock.

Handling Loops

According to an embodiment, there is provided a method for handling For/while/do loops wherein the problems to satisfy the requirements and the solutions are as described herein.

Problem:

Loops cause a cycle in the MFG for a method body, so need special handling. Variables that are updated in the loop body in particular iterator variables which are incremented an have an unbounded set of values which can cause the fixed-point iterations to never converge.

Figure 30:
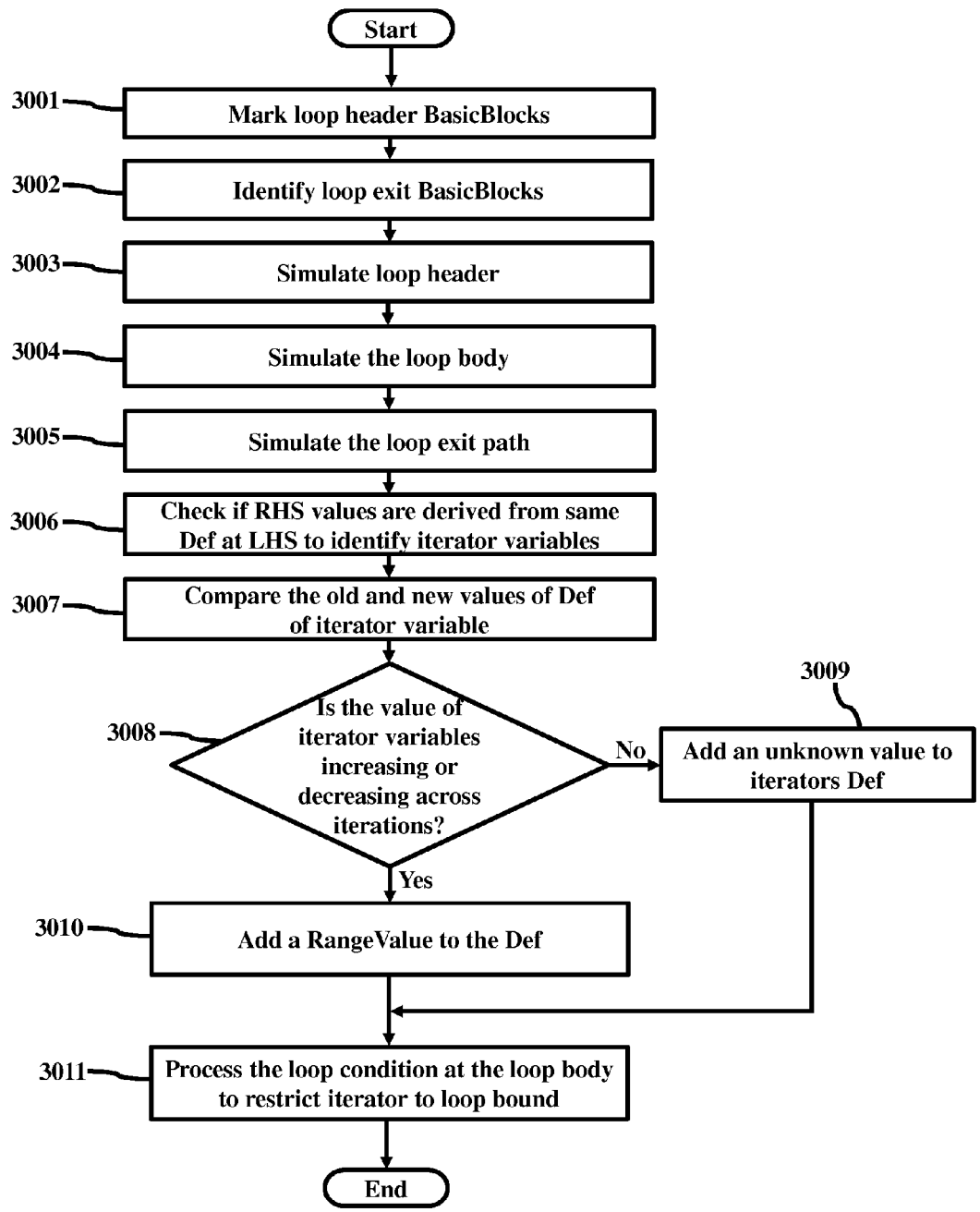
FIG. 30 illustrates a method to handle loops according to an embodiment herein, and is a subflow detailing the step 736 in FIG. 7C.

Solution:

FIG. 30 illustrates a method to handle loops according to a preferred embodiment, wherein the first step is to mark loop header BasicBlocks (3001). These are BasicBlocks which have incoming back-edges wherein edges whose destination node dominates their source node.

Further, the loop exit BasicBlocks is identified (3002). These are BasicBlocks in code immediately following a loop, to which control jumps on exiting the loop. Typically these are the successors of the loop condition expression on the false path.

Further, the steps during simulation include:

On reaching a loop header BasicBlock from code prior to the loop, and after all forward-edges have reached the loop header, simulation of the loop body begins. Simulation of the exit path (loop exit BasicBlock) is blocked till the loop body simulation completes.

i. On reaching the loop header BasicBlock from code within the loop, and after all back-edges have reached the loop header the header is simulated (3003), the body of the loop is simulated (3004) and the loop exit path is simulated (3005). This ensures that ReachingDefs from the loop body properly flow to the code after the loop.

ii. On assigning to a Def of a numeric typed variable in a loop body, a check is made to see if the RHS values are derived from the same Def, directly or indirectly wherein there may exist intervening Defs of the same variable (3006). If so, this is a "cyclic" Def of an iterator variable. The old and new values of the Def are compared to check if the values of the iterator variable are increasing or decreasing across iterations (3007).

iii. When entering the loop in the $3^{rd}$ fixed-point iteration wherein it takes 2 iterations for Defs to flow around the loop and iterator variables to be identified, all ReachingDefs stored at the loop header are processed. If a Def corresponds to an iterator variable(3008), then a Range Value is added to the Def which is [InitialValue . . . +Max Value] for increasing iterators and [−MinValue . . . InitialValue] for decreasing iterators (3010). Here InitialValue the value from outside the loop to which the iterator variable was intialized. MinValue and MaxValue are the minimum and maximum values of the numeric type (e.g. −128 and +127 for a byte type). If the values of the iterator are neither increasing nor decreasing, then an UnknownValue is added to the iterator's Def (3009).

iv. On processing the loop condition SpecialAssert at the top of the loop body, the MinValue or MaxValue values are restricted by the loop bound value, thus the iterator value flowing into the loop will be a RangeValue [InitialValue . . . LoopBound] for increasing iterators or [LoopBound . . . InitialValue] for decreasing iterators (3011).

Memo-Ization

According to an embodiment, there is provided a method for Memo-ization algorithm wherein the problems to satisfy the requirements and the solutions are as described herein.

Problem:

The fixed-point inter-procedural simulation algorithm iterates over the entire SCG till all ReachingDefs of a variable have reached all uses of the variable. After the first few iterations, most defs have reached their corresponding uses, so for most of the program there is no change in the simulation results. To improve performance it is important to avoid simulating code if the results will not change from the previous iteration.

Figure 31:
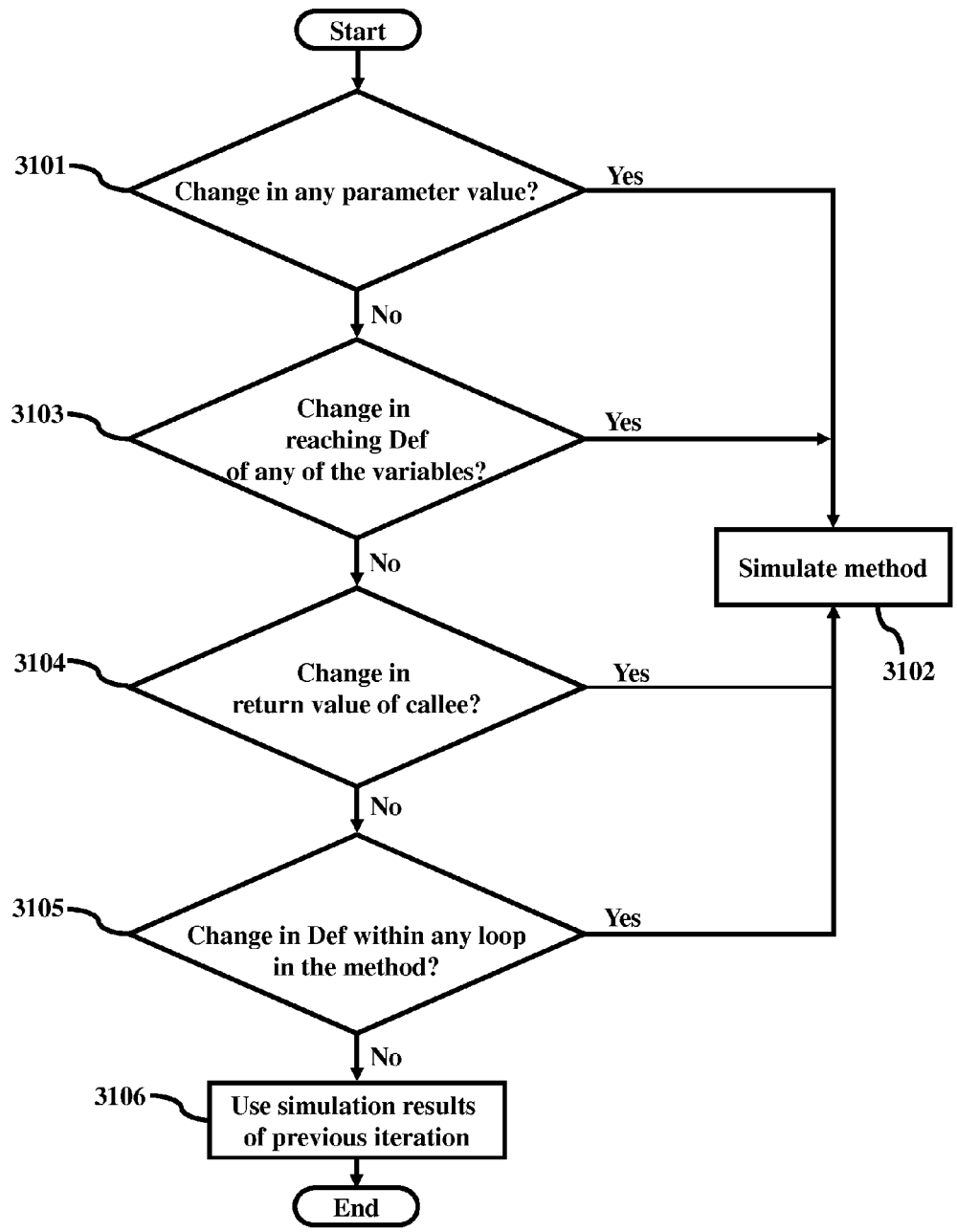
FIG. 31 illustrates a method for memo-izing according to an embodiment herein, and is a subflow detailing the step 738 in FIG. 7D.

Solution:

FIG. 31 illustrates a method for memo-ization according to a preferred embodiment, wherein a method body is treated as the unit of simulation. Before simulating a method body (3102) a check, wherein the check can include the conditions as mentioned herein, is done if any inputs to the simulation have changed from the previous iteration, if not then the method need not be simulated, and simulation results for the method from the previous iteration can be reused (3105).

A method needs simulation wherein a single or plurality of conditions as mentioned herein is satisfied, the conditions includes:

i. Any parameter value has changed (3101)

ii. Any reaching Def of any variable used in the method has changed in this iteration wherein the reaching Def of any variable has different values in this iteration compared to the previous iteration (3103). This includes defs flowing into the method from callers, down the call graph, as well as defs flowing into the method from callees, up the call graph. A Def is marked with the last fixed point iteration where its values were set, and whether its values changed in that iteration.

iii. A return value of a callee method changed from the previous iteration (3104).

iv. In the previous iteration, for some variable used inside a loop body in the method, there was a changed Def from within the loop body or from a callee method which was called from the loop body (3105). Then the loop needs to be simulated again to allow the changed Def to reach the use by flowing around the loop.

If none of the above conditions are true then the method does not need simulation in the current iteration, and simulation results (values stored in Defs, issues reported, etc) from the previous iteration can be reused.

Interning

According to an embodiment, there is provided a method for interning wherein the problems to satisfy the requirements and the solutions are as described herein.

Problem:

The key data structures which consume a lot of memory during simulation are the calling contexts and value sets. It is necessary to optimize performance and memory for these data structures.

Figure 32:
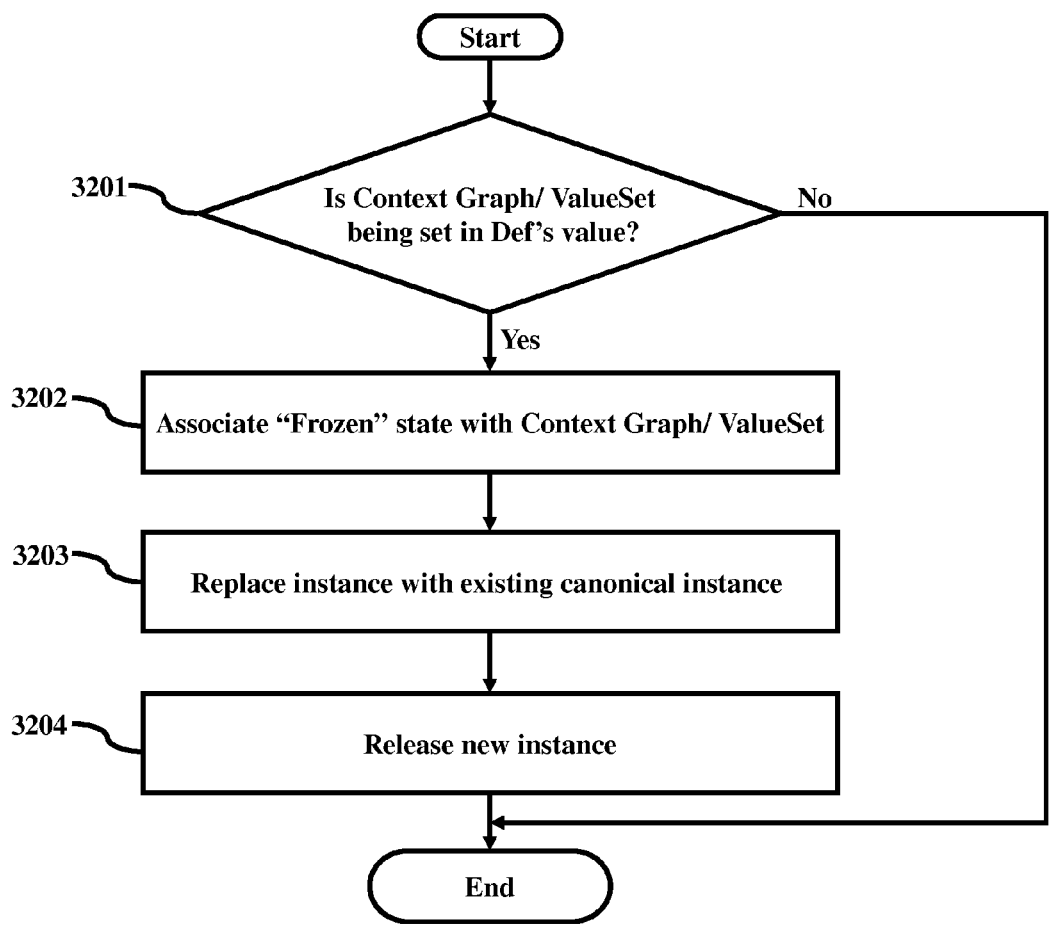
FIG. 32 illustrates a method for interning according to an embodiment herein, and is a subflow detailing the step 740 in FIG. 7D.
Figure 33:
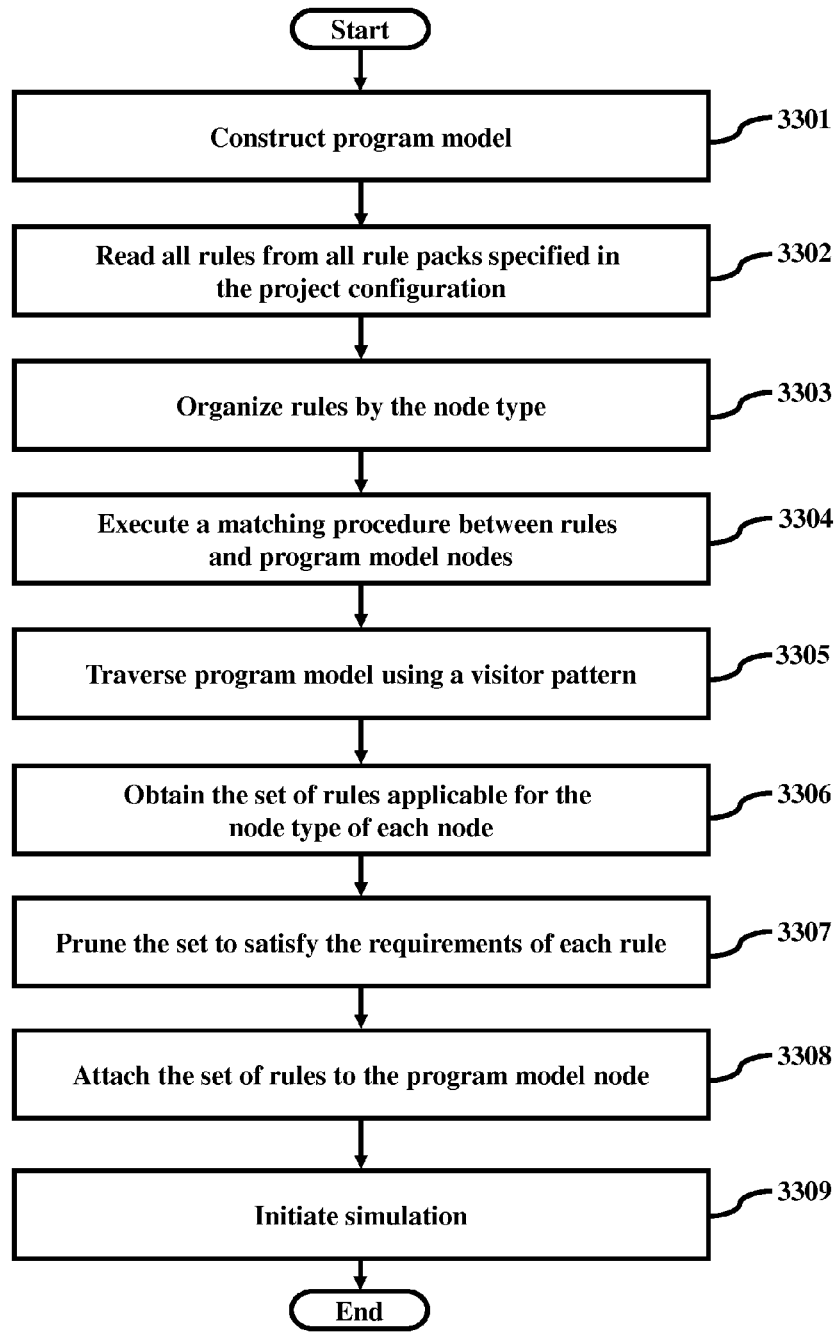
FIG. 33 illustrates a method for rule attachment and framework for execution according to an embodiment herein, and is a subflow detailing the step 742 in FIG. 7D.

Solution:

FIG. 32 illustrates a method for interning according to a preferred embodiment wherein there is provided a method to intern ContextGraphs and ValueSets by creating a canonical instance which represents unique content values wherein many different variables may have ValueMaps which have the exact same ContextGraphs and ValueSets. This can only be done when the ContextGraph/ValueSet will not change. If the ContextGraph/ValueSet instance is set in a Defs values (3201), a state is associated with a ContextGraph/ValueSet, which is set to "Frozen" (3202). Once frozen, the instance's contents will never change, so the instance can be replaced with the existing canonical instance which is equal in content to the newly frozen instance (3203), and the new instance can then be released to free memory (3204).

Further, Interning improves performance because two Frozen ContextGraphs/ValueSets can be compared for equality using pointer equality (Java "==" operator) which is very fast, rather than the time consuming content equality method e.g., Java "equals( )" method which needs to do a deep comparison of contents.

Rule Attachment and Execution Framework

According to an embodiment, there is provided a method for rule attachment and framework for execution wherein the problems to satisfy the requirements and the solutions are as described herein. Rule attachment and execution framework Problem:

Extensibility is a key requirement of simulation. The simulation engine needs to be provided with information about the desired behavior of the program being simulated, so that it can report any non-compliance with the desired behavior.

Solution:

According to a preferred embodiment, a framework for extensible simulation by attachment and execution of rules which can access data-flow information is provided.

Further, the desired behavior is expressed as rules. Rules are small pieces of code (scripts, annotations) written in Java or other scripting languages which may specify desired behavior, access the program model and data-flow information by reading values of variables, perform some logic to check a specific rule, optionally update the data-flow information by writing values of variables, and report issues if a violation is detected. Rules may be general purpose (apply to all programs being simulated) or specific to a particular application being simulated.

Each rule specifies information to allow the simulation engine to execute the rule at the appropriate points during simulation. The information allows the rule to be attached to a specific set of nodes in the program model, and when those nodes are being simulated, the rule code is invoked from the simulation engine. The following information is used to specify the set of nodes precisely:

i. The node type in the program model, e.g. method-call, binary-expression, + ii. Optionally the node name in the program model, e.g. method name regular-expression for method-call node type, operator name(s) for binary-expression node type.

iii. The ClassName and/or methodName comprising the node iv. The line number of the node in the source code FIG. 33 illustrates a method for rule attachment and framework for execution according to a preferred embodiment, the program model is constructed from source code/binary code (3301) and before simulation begins, all rules from all rule packs specified in the project configuration are read (3302), and the rules are organized by the node type they need to be attached to (3303). Then a matching procedure happens between rules and program model nodes (3304). The entire program model is traversed using a visitor pattern (3305). For each node, the set of rules applicable for that node type is obtained (3306). The set is pruned to satisfy the node name/Class/method name and line number requirement of each rule (3307). Then the set of rules is attached to the program model node (3308) and simulation is initiated (3309). During simulation, after a node in the program model has been processed, all the rules attached to the node are executed.

Further, according to the embodiment special handling is done for method-call nodes, whose node name can be for a super-class or super-interface method. These rules are also stored in the method body node in the SCG. During simulation of a method call node, all rules from all callee method bodies which are called at that call site are picked up and executes. This allows rules to be attached to abstract/interface types at the top of an inheritance hierarchy, and applied to low-level implementation classes.

Rules are provided with an execution environment which gives them access to key information about the simulation wherein the rules include:

i. the current node ii. the current method and class iii. simulation values of specified nodes in the model (see value rules below)

iv. APIs for reporting issues when the rule is violated v. APIs for reading and writing variable values (see value rules below)

Design Value Rules

According to an embodiment, there is provided a method to design value rules wherein the problems to satisfy the requirements and the solutions are as described herein.

Problem:

Rules need to read/write the values of variables in a program, and the values of expressions which are related (nearby) the node to which the rule is attached.

Figure 34:
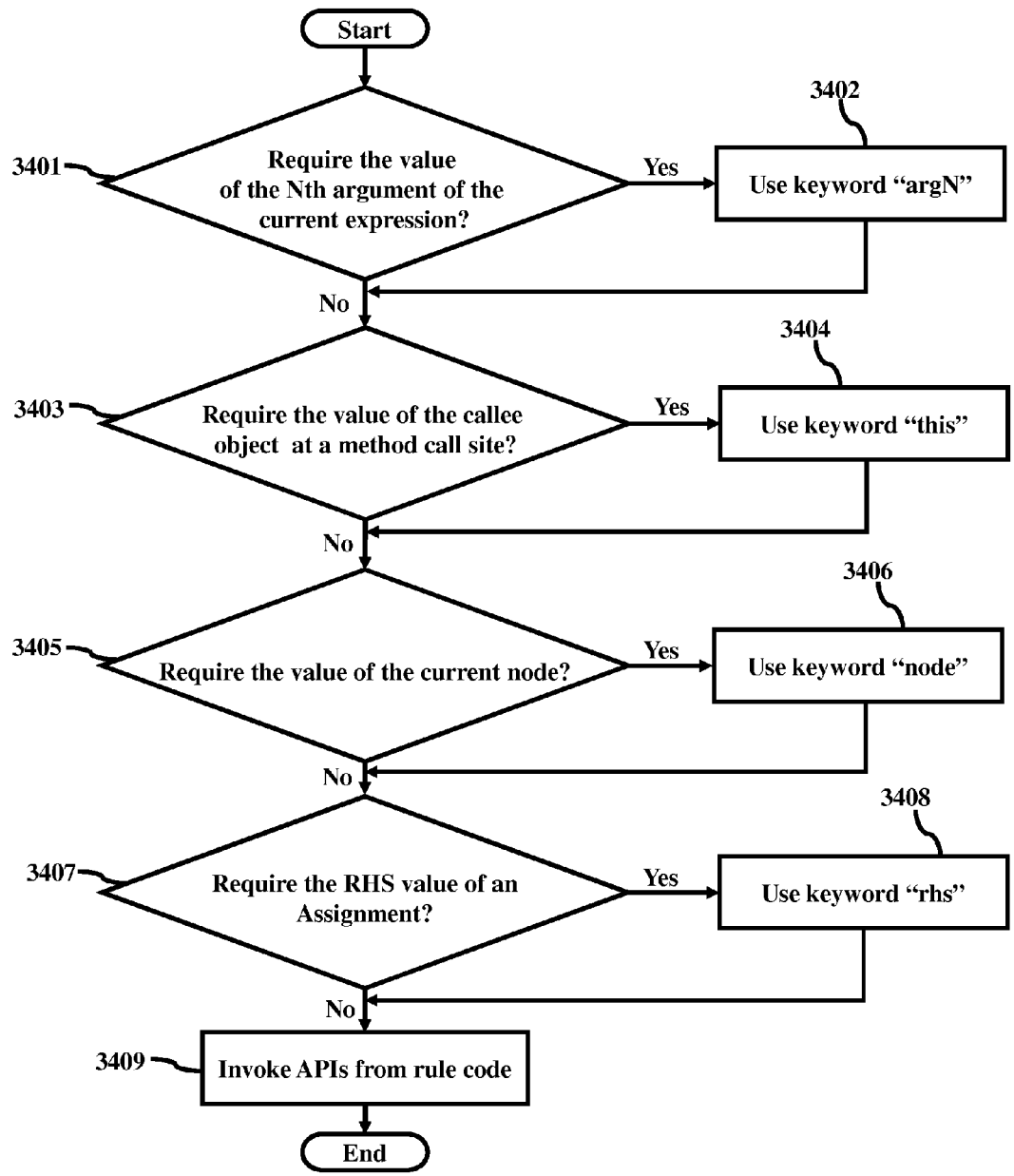
FIG. 34 illustrates a method to design value rules according to an embodiment herein, and is a subflow detailing the step 742 in FIG. 7D.

Solution:

FIG. 34 illustrates a method to design value rules according to a preferred embodiment, wherein rules can specify that they need certain values using the following keywords:

i. argN: If the current expression is a method call, the Nth argument of the call is indicated (3401) wherein if the current expression is a binary expression, the 1$^{St}$ or 2$^{nd}$ operand value is indicated. The keyword "argN" which specifies that the value of the Nth argument of the current expression is needed (3402) is used.
ii. this: if callee object at a method call site is needed (3403), the keyword "this" is used (3404)
iii. node: if the value of the current node which must be an expression is needed (3405), the keyword "node" is used (3406).
iv. rhs: if the RHS values of an assignment is required (3407), the keyword "rhs" is used for rules attached to assignment expressions (3408).

Further, rules may read and write the values of arbitrary local variables, object fields and array elements by using a set of APIs provided by the simulation engine, which can be invoked from the rule code (3409).

Flag Rule Design and Applications

According to an embodiment, there is provided a method for flag rule design and applications wherein the problems to satisfy the requirements and the solutions are as described herein.

Problem:

Some rules need to associate flags with values of variables, e.g. for security vulnerability detection rules which associate a "taint" flag with values obtained from untrusted sources.

Figure 35:
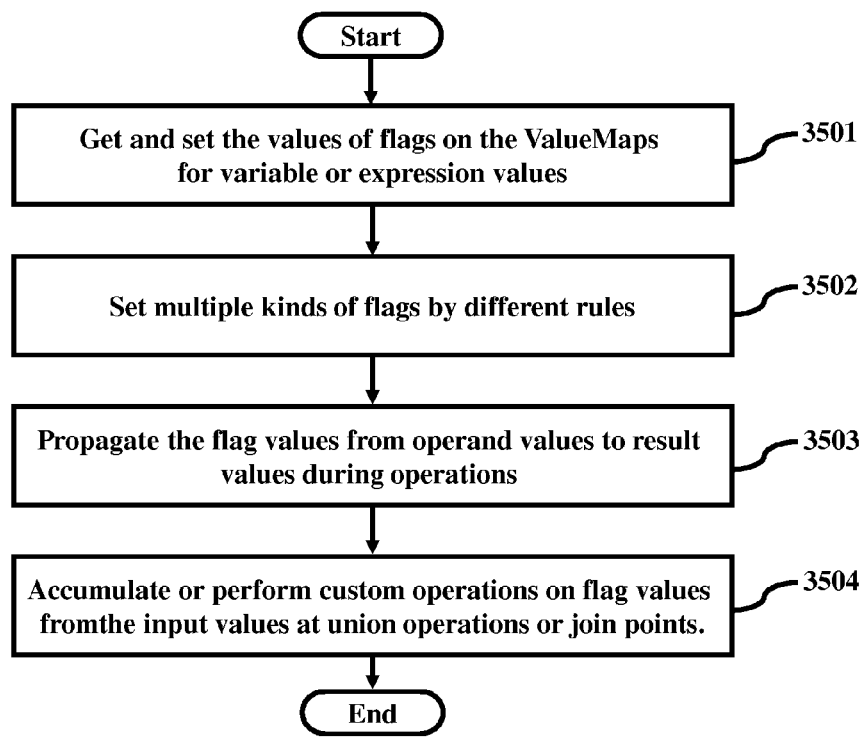
FIG. 35 illustrates a method for flag rule design and applications according to an embodiment herein, and is a subflow detailing the step 745 in FIG. 7D.

Solution:

FIG. 35 illustrates a method for flag rule design and applications according to a preferred embodiment, a framework for flag rules are provided. Rules are provided with APIs that allow them to get and set the values of flags on the ValueMaps for variable/expression values (3501). Each flag type is distinguished by a key String, so multiple different kinds of flags can be set by different rules (3502). During operations on values such as union and intersection, and during unary and binary operations the flag values are propagated from operand values to result values (3503). At union operations, flag values from the input values are accumulated by default (3504). So when a rule queries the flags of a variable/expression value, it gets all possible flag values that can flow to the rule's node. This default behavior is sufficient for security vulnerability rules.

Further, the embodiment allows the rules to alter the default accumulation behavior at meet points by performing custom operations, e.g., Internationalization (I18N) rules need to use "inverse taints" to detect when a String is obtained from a non-I18N source, so they can perform an "AND" operation at String concatenation operators.

Rule Generation

According to an embodiment, there is provided a method for rule generation wherein the problems to satisfy the requirements and the solutions are as described herein.

Problem:

A typical program may have hundreds or thousands of rules that apply to it. Writing all these rules manually is a very time-consuming task.

Figure 36:
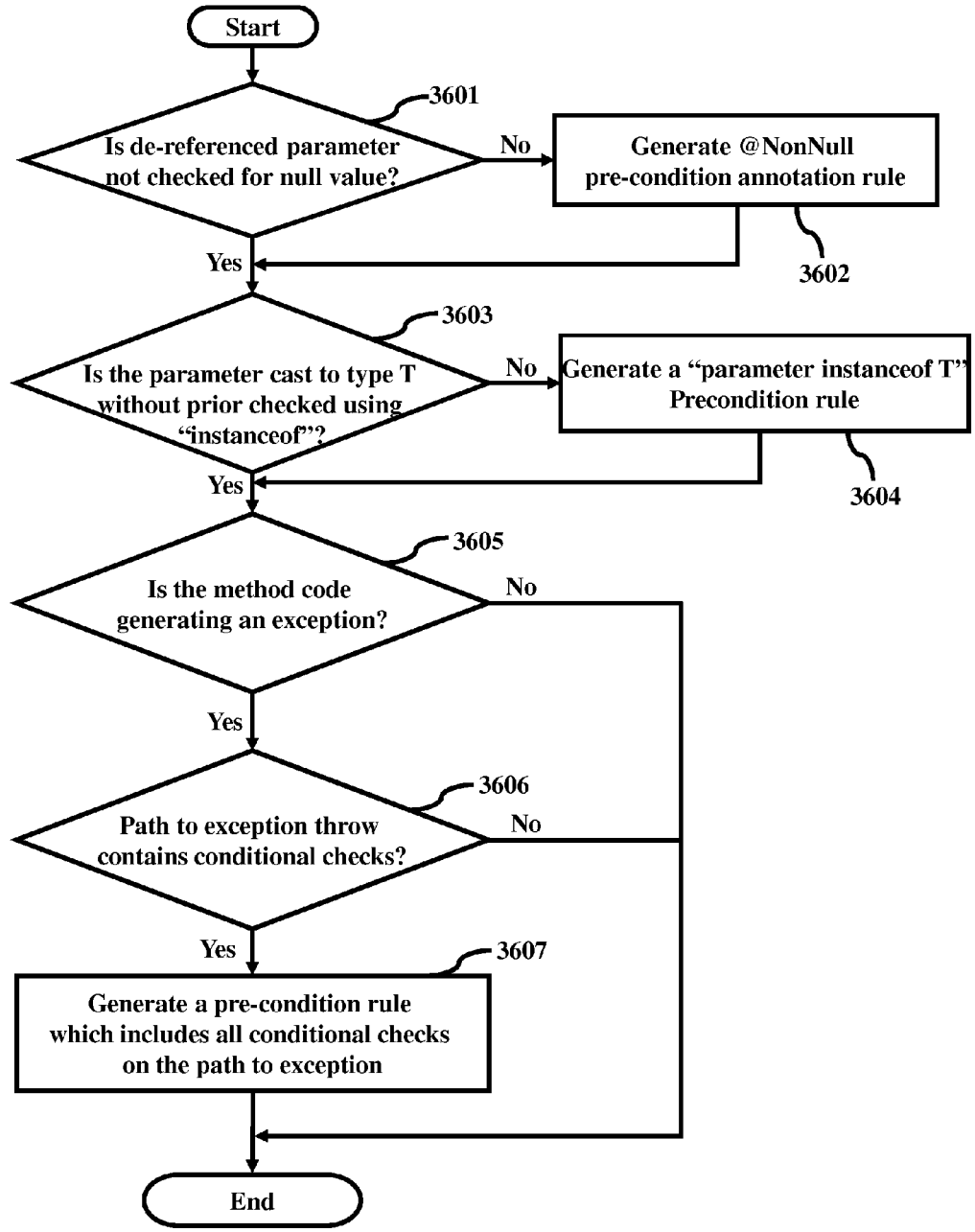
FIG. 36 illustrates a method for rule generation according to an embodiment herein, and is a subflow detailing the step 747 in FIG. 7D.

Solution:

FIG. 36 illustrates a method for rule generation according to a preferred embodiment, a framework for automatic generation of rules and annotations is provided wherein various kinds of rules may be automatically generated which includes:

a. Pre-condition and invariant rules: these are rules that apply to the values of variables, and impose constraints on the set of values which are acceptable. According to a preferred embodiment assumes that if a method throws one of a specified kind of exception or error (default: all exceptions and errors), and the conditions governing the throwing this exception involve method parameters, then some pre-condition or invariant for the method has been violated. The rule generation framework determines pre-conditions in the following ways:

i. If an object typed parameter variable is de-referenced in the method body without any prior check for null (3601), then the method assumes that the parameter value is never null, hence a @NonNull pre-condition annotation rule is generated for the parameter (3602).
ii. If an object-typed parameter variable is cast to a particular type T without any prior "instanceof" check for the type of the variable (3603), then an "parameter instanceof T" precondition rule is generated (3604).
iii. If the method code throws an exception (3605), and the path to the exception throw contains conditional checks on the values of parameters (3606), then a pre-condition rule which includes all those conditions is generated (3607).

E.g. for method-body code of the form:
if (param1<0) {if (param2==null) throw new RuntimeException( );}
the precondition rule would be "param1>0||param2 !=null". The algorithm handles complex AND/OR conditions correctly by doing an AND of multiple conditions and then a final boolean NOT of the entire pre-condition expression to indicate the values which do NOT throw an exception and are hence allowed values of the parameters. In order to determine the conditions which lie on the path to the exception throw, the algorithm finds SpecialAssert nodes which dominate the BasicBlock containing the throw, and uses the conditions from all those BasicBlocks.

The above pre-condition generation framework correctly handles inter-procedural cases where a parameter of one method for which the precondition is to be generated is passed to an internal method either as a parameter or by setting in an object field etc. The above pre-condition generation framework also handles conditions involving variables which are fields of parameter objects, e.g. "this.field1>0||param2.field2 !=null". This can in particular be useful for generating invariant rules about object state e.g. method M should not be called on an object in state S and pre-conditions which relate parameter values to object state. It also handles global variables such as static fields of classes.

b. Post-condition rules: These rules specify the possible return values from a method. These rules are generated by obtaining all return values from a method at the Exit BasicBlock and outputting those values in the post-condition rules. Primitive values are generated by outputting their literal values or range values using a simple [lowerBound.upperBound] syntax. Object values are generated by outputting their type and allocation site line number and null-ness, in a simple format.

c. Concurrency annotations: These annotations specify the thread safety level of a particular class. An annotation @NotThreadSafe is generated for a class whose field read or write causes a race condition error because the field access happens concurrently from multiple threads. The annotation @Immutable is generated for a class whose fields are all private and are only written in the constructor of the class.

Further, according to the embodiment, the ability to generate pre-conditions and post-conditions on interface level methods using the conditions from implementation class method is provided. This is essential for reusable frameworks which are accessed through interfaces, and have internal implementation classes which are hidden from users. The Java SE, ME and EE platform libraries are a major example of such frameworks. This is done by bubbling implementation method pre- and post-condition rules up the inheritance hierarchy to the super-class or super-interface which contains the abstract or interface method declaration which was implemented by the implementation method. If the same rule has been generated by two or more implementation classes, they are merged when they get bubbled up to the higher level interface/class.

The user can specify if an interface rule should be generated only if ALL implementation classes have the rule or if ANY implementation class has the rule. If the specification is ALL, then before generating a rule for an interface method, a check ensures that the rule exists in all concrete implementation methods. The user can also specify that rules should contain only class names for public interfaces, in which case rules are not generated for concrete implementation classes.

Ordering Rule Generation

According to an embodiment, there is provided a method for ordering rule generation algorithms wherein the problems to satisfy the requirements and the solutions are as described herein:

Problem:

Ordering rules also need to be automatically generated.

Solution:

Ordering between methods in a class can be inferred if one of the methods is an initialization method which initializes values of the object's private fields, and the other method(s) use those fields.

Figure 37:
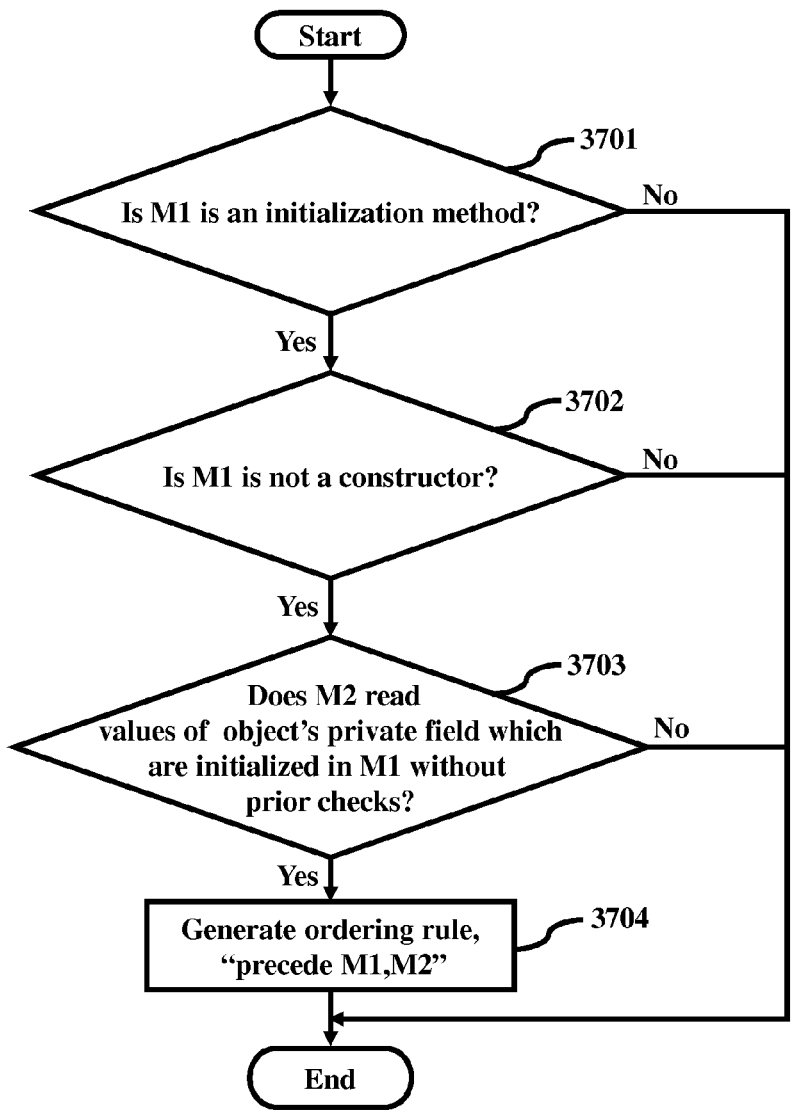
FIG. 37 illustrates a method for ordering rule generation according to an embodiment herein, and is a subflow detailing the step 748 in FIG. 7D.

FIG. 37 illustrates a method for ordering rule generation according to a preferred embodiment, the ordering constraints inferred for a method M1 which is the initialization method (3701) wherein M1 writes the values of private field(s) without first reading them, and M1 is not a constructor (3702). Further, another method M2 reads the values of the private fields without checking their value, e.g., without checking object-typed fields for null-ness, (3703). An ordering rule of the form "precede M1, M2" is generated which requires that clients call M1 before calling M2 (3704).

Further according to the embodiment, a method e.g. close( ) sets the state of a flag, e.g. closed=true, and there is no other method which resets the state of this flag. Another method e.g. read( ) first checks the flag, e.g.: if (closed) throw new Exception( ) wherein an ordering rule of the form "read( ) method cannot be called after close( )" is generated.

Bug Prioritization Policies and Path Generation

According to an embodiment, there is provided a method for bug prioritization policies and path generation wherein the problems to satisfy the requirements and the solutions are as described herein.

Problem:

All errors reported by the simulation engine are not equally important requiring priority information to be provided. Further, while reviewing an error, it is important to provide users with information about the source of the value which causes the error and the path along which the value reached the point where the error occurred.

Solution:

According to an embodiment, multiple prioritization policies can be configured for a project. Each policy provides a priority value and weight for each bug, based on the value of a field of the bug. The overall priority for a bug is the weighted average of the priority weights from each policy. Each priority policy has the following information:

```
                <priorityPolicy name="..." field="method OR rule
    OR description" weight="1" defaultPriority=".." file="..">
        <match fieldValue="..." priority=".."/>
        <match fieldValue="..." priority=".."/>
    </priorityPolicy>
```

FIG. 38 illustrates a method for bug prioritization policies and path generation according to a preferred embodiment. If field value of the match element matches the specified pattern (3801) then each match element specifies the priority to be assigned to a bug (3802). If no match happens then the defaultPriority is assigned (3803). The match pattern-priority tuples can also be specified in an external file.

Specific prioritization policies that are often very useful:
  i. Age based prioritization: Using the last modified time of a source file (which can be automatically extracted from a source repository), errors in files that have been modified recently are assigned a higher priority than errors in older files.
  ii. Dynamic (run-time) information based prioritization: this policy assigns a higher priority to an error if the value which caused the error is consistent with values that were seen at run-time by the dynamic analysis framework. In addition, higher priority is also assigned to errors detected in parts of the code which are heavily executed at runtime, and lower priority is assigned to parts of the code which are never or rarely executed at runtime.

Further, according to the embodiment, providing information about the source of error values is done by associating a source node with each value object (3804). The source node for an ObjectValue is its allocation site. The source node for a NullPointerValue is the literal expression where the null came from, or the default value of a field. The source node for other PrimitiveValues is the literal expression or default field value where they came from. This source node information is stored in each error record and displayed in the user interface (3805).

The path along which a value flowed from source to location of error (sink) cannot be stored in the bug record because there may be too many paths from source to sink which would take up too much memory. Instead the SCG is stored and the path is dynamically computed as needed and displayed as a sequence of clickable links in the user interface, which allows the user to trace the path from source to sink in the source code file (3806).

Flowing Data Values Across Multiple Simulations

According to an embodiment, there is provided a method for flowing data values across multiple simulations wherein the problems to satisfy the requirements and the solutions are as described herein.

Problem:

The values of parameters at simulation entry point methods and return values of method calls with unknown callee method bodies are not known, because of which unknown values are introduced into the simulation. Especially when a large project is split into chunks, it is important to propagate values across chunks. Also when a module depends on an external module which has been separately simulated previously, it is important to use data values from the external module.

Figure 39:
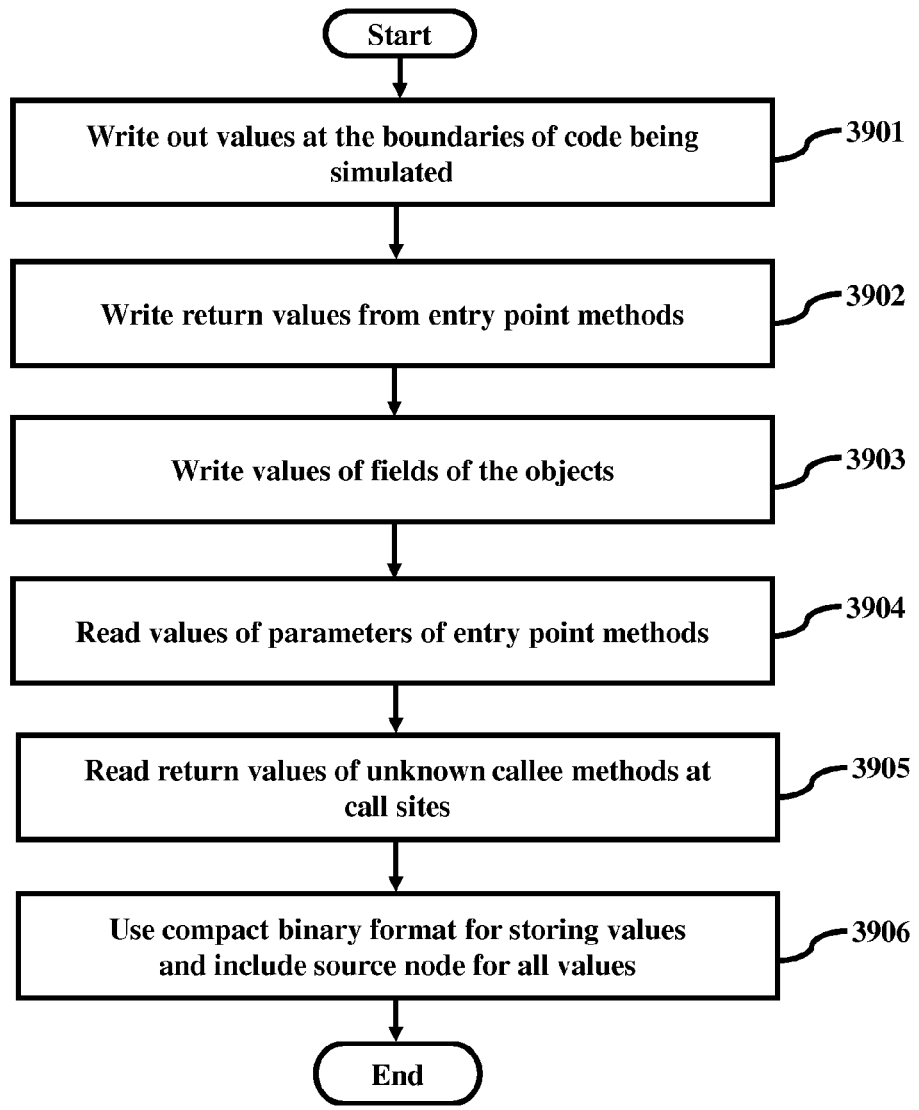
FIG. 39 illustrates a method for flowing data across multiple simulations according to an embodiment herein, and is a subflow detailing the step 751 in FIG. 7E.

Solution:

FIG. 39 illustrates a method for flowing data across multiple simulations according to a preferred embodiment. The simulation engine can be configured to write out values at the boundaries of the code being simulated at the end of simulation (3901). This includes argument values at method calls to unknown callee methods, and return values from entry point methods (3902). Further, for object typed arguments/return values, the values of fields of the objects can also be written out. This information is written to a state file (3903).

The simulation engine can also be configured to read in values of parameters of entry point methods (3904) and return values of unknown callee methods at call sites (3905), from the external state file. If such values are available, then instead of creating unknown values at those points, the external values are used.

The format for storing state is a binary format which compactly stores essential information about each kind of value. The source node is stored for all values (3906). PrimitiveValues store the actual primitive literal value. RangeValues store the lower and upper bound and whether it is unknown. ObjectValues store the type and null-ness flag.

Using Method Summaries

According to an embodiment, there is provided a method for using method summaries wherein the problems to satisfy the requirements and the solutions are as described herein.

Problem:

When simulating a large program which requires too much memory or compute time and has been split into chunks, it is important to model the behavior of methods in a chunk which are used from other chunks, to provide accurate results for a given set of inputs.

Solution:

According to a preferred embodiment, a method summary is created for each method which may be called from a different chunk. The summary only provides a "slice" of the method code which computes the result values as a function of the input parameters. Thus other internal details of the method are removed. This allows the method to be simulated very quickly and with low memory requirements, but provides accurate results for use by the calling module.

Figure 40:
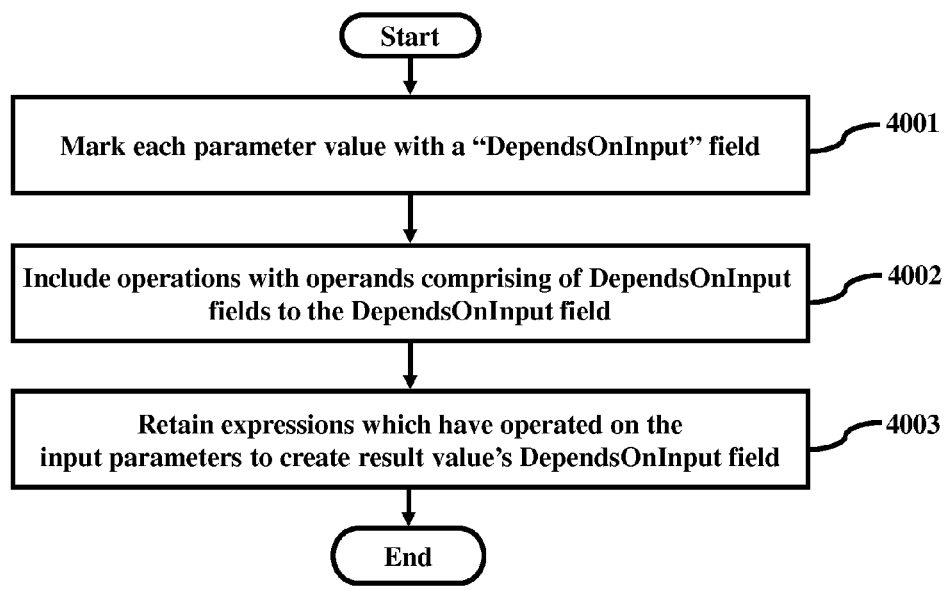
FIG. 40 illustrates a method to use method summary according to an embodiment herein, and is a subflow detailing the step 753 in FIG. 7E.

FIG. 40 illustrates a method to use method summary according to a preferred embodiment. The method summary is created by including all expressions and computations which are on the path from every parameter use to every return statement where values are returned, and which use a parameter value directly or indirectly (4001). Each parameter value is marked with a "DependsOnInput" field, which contains a list of expressions which use the parameter value. Any operation whose operand has the DependsOnInput field adds itself to the DependsOnInput field and includes it in the output values (4002). Then at a return statement, the DependsOnInput field of the values being returned has all the expressions which have operated on the input parameters to create the result. Only those expressions are then retained, and the other nodes in the program model are deleted to produce the method summary (4003).

Project Configuration with Inheritance from Master Projects

According to an embodiment, there is provided a method for configuring project with inheritance from master projects wherein the problems to satisfy the requirements and the solutions are as described herein.

Problem:

Often the configuration for a simulation project is similar to many other projects, especially if a separate project is created for each module of a large application. Duplicating common information is time consuming and error prone and difficult to maintain.

Figure 41:
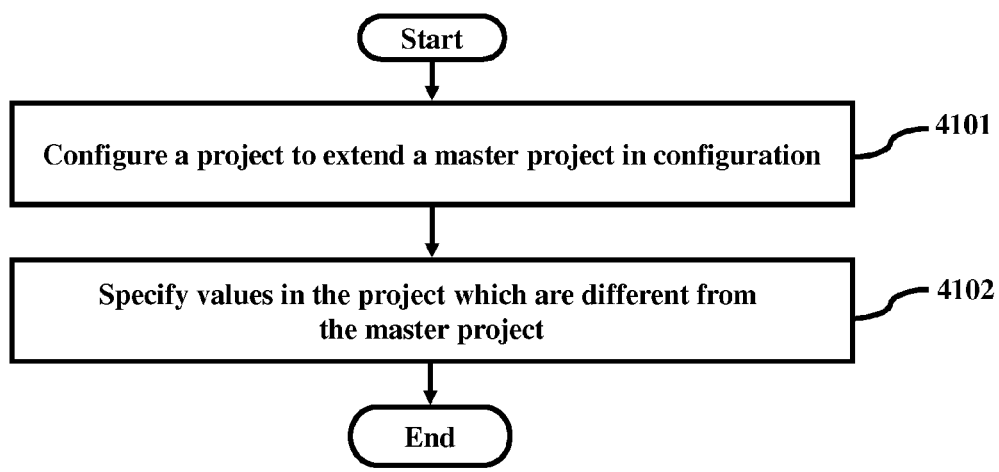
FIG. 41 illustrates a method to configure projects with inheritance from master projects according to an embodiment herein.

Solution:

FIG. 41 illustrates a method to configure projects with inheritance from master projects according to a preferred embodiment, wherein project P1 can be configured to extend another project P2 by specifying 'extends="PT"' in the configuration for P1 wherein P2 is called the master project (4101). This causes P1 to obtain default values for all its configuration from the master project wherein P1 can specify only those values which are different from the master project (4102).

Handling Multiple Code Versions

According to an embodiment, there is provided a method for handling multiple code versions wherein the problems to satisfy the requirements and the solutions are as described herein.

Problem:

When simulation of a codebase is done on an ongoing basis e.g., every night/week, on a codebase that is being continuously being changed, it is necessary to co-relate error reports across runs. This allows known errors or false alarms which were seen in previous simulations of slightly older codebases to be filtered out of the new error reports from new simulations on the latest codebase, so the users have to review only the new issues.

Figure 42:
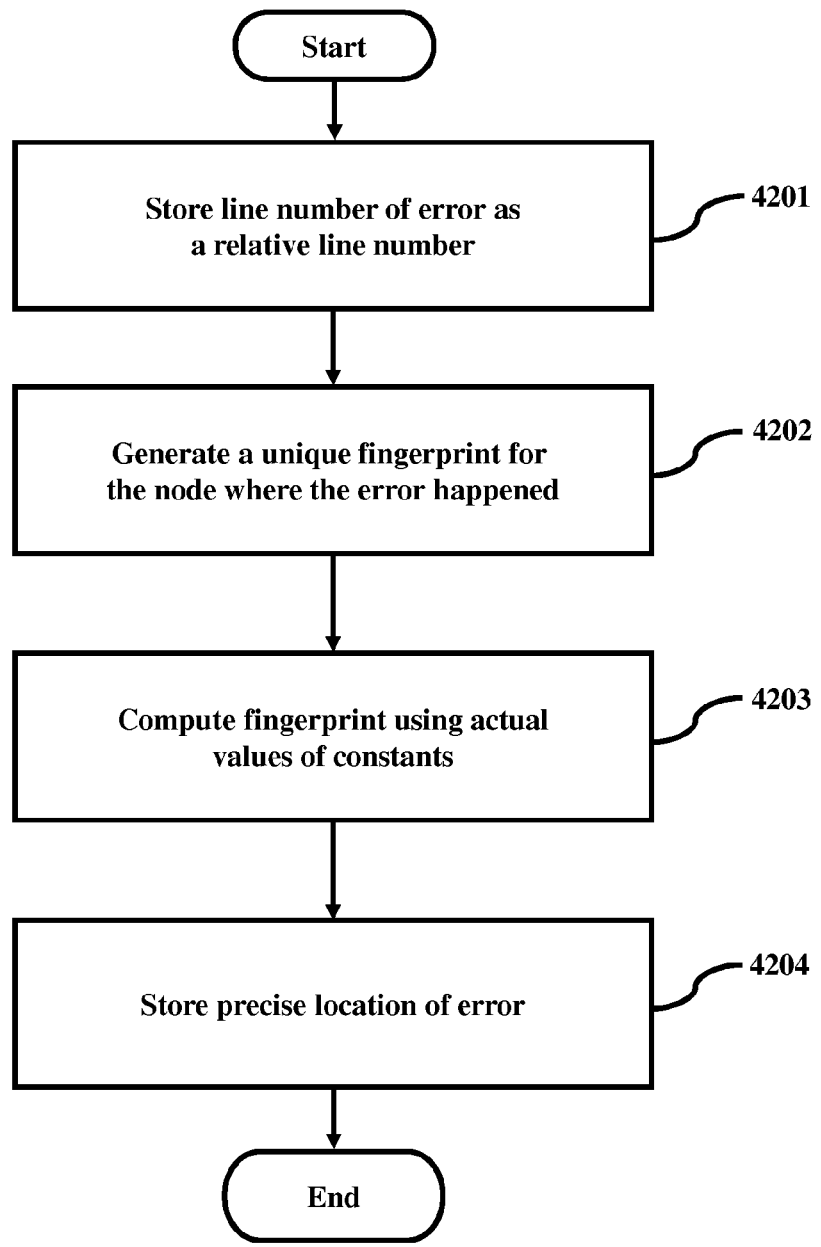
FIG. 42 illustrates a method for handling multiple code versions according to an embodiment herein.

Solution:

FIG. 42 illustrates a method for handling multiple code versions according to a preferred embodiment wherein the method provides the ability to match errors across codebases that have changed in limited ways. Each error has a source code line number of the location where the error occurred. This line number is stored relative to the start of the method containing that location, as a relative line number (4201). This allows code changes in other parts of the source file preceding the method without affecting the matching of the error, because the relative line number does not change.

In addition, each method has a unique "smart fingerprint" generated by running a signature method such as a CRC on its contents (4202). The contents of the method are all the bytecodes in the method, except for instructions which reference the constant pool. For these instructions, the actual value of the constant is used. One problem is that the literal method bytecodes of a method often change because of unrelated changes in the class due to changes to constant pool indices referenced by the instructions of the method. To solve this problem, the fingerprint is computed using the actual values of the constants in the constant pool, instead of just using the constant pool index (4203). This allows a method fingerprint to be the same even if other parts of the class change or even if relative line numbers within a method change, as long as the bytecode sequence remains equivalent.

The "smart fingerprint" can also be customized by a user to map certain names to other names. For example, if it is known that package x.y.z in version 1 of the code has been renamed to a.b.c in version 2, (but there has been no other change) then references to "a.b.c" in version 2 are treated as equivalent to "x.y.z" in order to maintain the same fingerprints between version 1 and 2 for methods which reference this name. Similarly, if a particular method has moved from one class to another, then this name remapping feature is used to keep the fingerprint stable.

The precise location of an error is stored in terms of the actual code construct or expression whose value caused the error (4204) (because a rule checked the value and determined that it was in error). E.g. the location of a NullPointerException issue is the pointer variable (having a potentially null value) at the location where the variable is de-referenced. The error record then includes the smart fingerprint of all prior code on flow paths from the beginning of the method till that location, computed by processing the bytecodes for the prior code in program flow order. This allows the error to be precisely matched across versions of the code because changes in unrelated code will not affect the fingerprint of that error location.

Using a Combination of Run-Time Dynamic Analysis, Testing and Simulation

According to an embodiment, there is provided a method for using a combination of run-time dynamic analysis, testing and simulation wherein the problems to satisfy the requirements and the solutions are as described herein.

Problem:

While simulation detects many kinds of errors missed by run-time testing, simulation is also limited by the accuracy of values of variables. Often there are too many unknown values of variables which degrade the simulation results. Approximations used to compact large sets of values also reduce accuracy. Many kinds of rules cannot be automatically inferred using simulation alone.

Figure 43A:
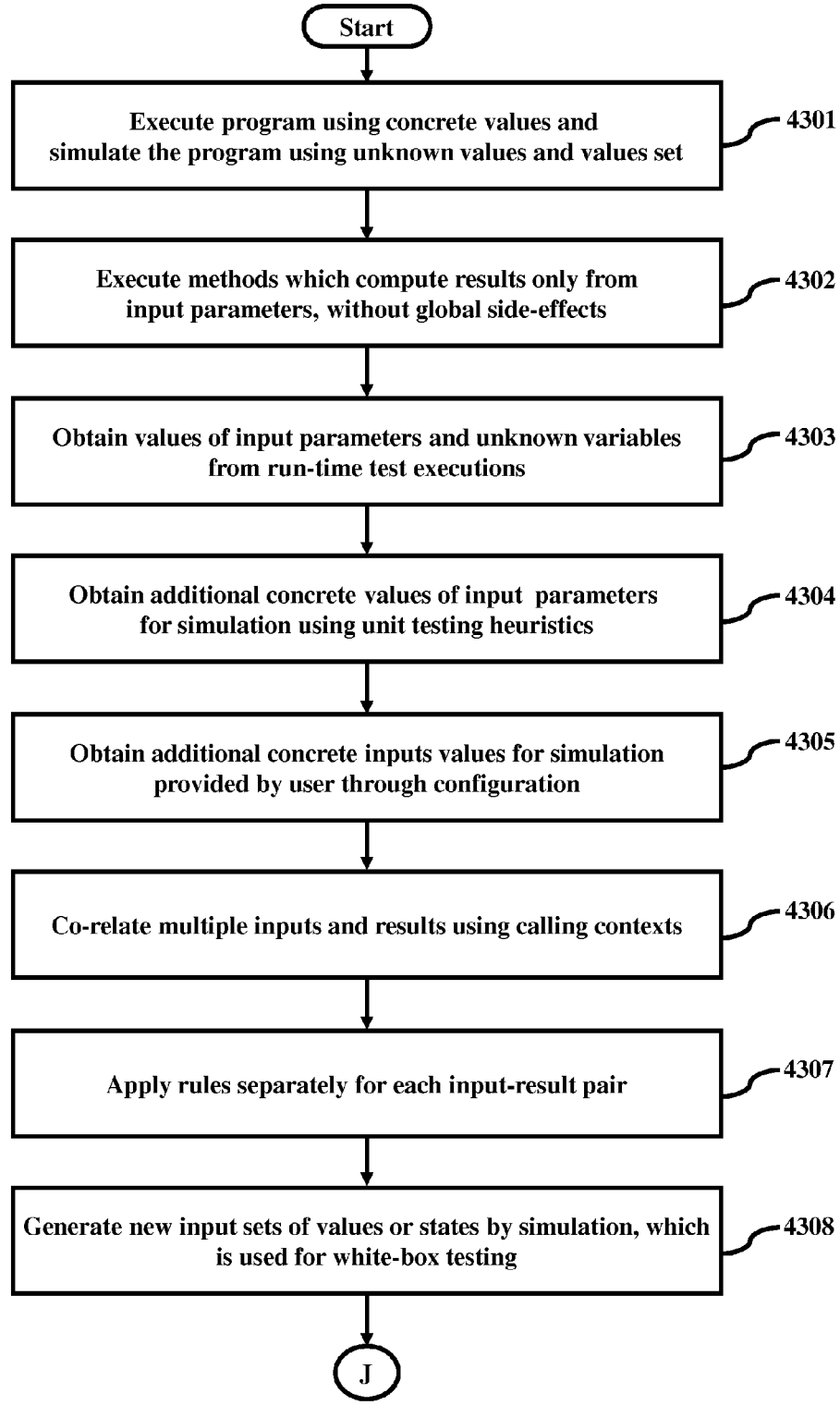
FIGS. 43A and 43B are continuing flow charts illustrating a method for a method for using a combination of run-time dynamic analysis, testing and simulation according to an embodiment herein, and is a subflow detailing the step 755 in FIG. 7E.
Figure 43B:
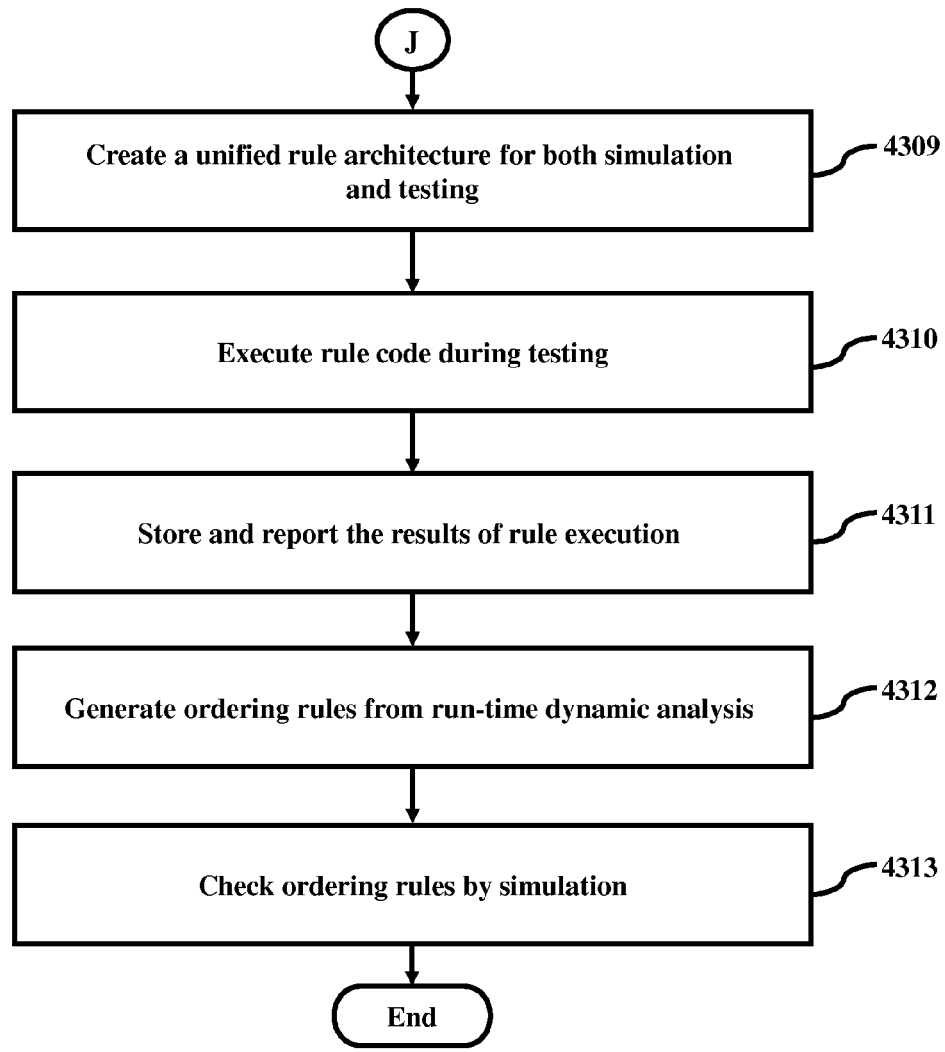

Solution:

FIGS. 43A and 43B are continuing flow charts illustrating a method for using a combination of run-time dynamic analysis, testing and simulation according to a preferred embodiment. A major set of new innovations is based on the idea of combining simulation with run-time testing and dynamic analysis. The following are specific innovations:

i. A unified simulation and run-time interpretation Virtual Machine which flexibly does both actual execution of the program using concrete values, and simulation of the program using unknown values and value sets (4301). The simulator can essentially be thought of as an interpreter which performs computations with multiple (potentially unknown) values of variables (a normal interpreter has only 1 concrete value of a variable) and executes multiple paths through the program (a normal interpreter executes only 1 path through the program).

ii. In particular, methods which have no side effects (i.e. only compute results based in input parameter and do not update any global state) are actually executed (interpreted) instead of being simulated (4302). If there are multiple sets of input values of the method, the method body is executed once for each set of inputs, to obtain a set of result values.

iii. Values of input parameters and other unknown variable values are obtained by capturing the values of those variables during run-time testing using existing test suites (since all software projects have a suite of tests) (4303). These values are then provided to the simulation engine to get more accuracy and complement the values that are derived during simulation.

iv. Additional concrete values of input parameters for simulation are obtained using heuristics used for unit testing, such as using boundary values (4304).

v. Obtain additional concrete values for inputs for simulation are provided by the user through configuration (4305).

vi. A difficult problem is how to simulate unit testing or functional testing for different sets of concrete input values. For each set of inputs there is a different result which is a function of the inputs. All the input sets are simulated together. This requires co-relating each input-set-result pair. The simulation engine provides for co-relating inputs and results by associating a specific calling context with each input set, intermediate values and result, using context-sensitive simulation (4306). Then rules are applied separately for each input-result pair corresponding to the same calling context (4307).

vii. Simulation generates new sets of values/states which can then be used as inputs for run-time white-box testing (4308). E.g. simulation can determine that a method is called with a certain set of input values, and output those values. Then the test suite harness reads in those values and actually calls the method for each input value to test if the method behaves correctly.

viii. A unified rule architecture is created which allows rules for both simulation and dynamic analysis to be specified in a consistent way, and then those same rules can be checked during simulation as well as during dynamic run-time analysis (4309). In particular, the rule architecture described in this document allows rule script code to be injected into the run-time execution of the program. When execution reaches the specific nodes in the program to which a rule is attached, the rule code is executed (4310) and the results (e.g. if a violation was detected) are stored and later reported (4311).

ix. Rule inference and generation is done more accurately and exhaustively using a combination of information from simulation and dynamic run-time analysis. In particular, an invariant rule for variable values and relationships between variables can be made more accurate and reliable if the same invariant happens to be generated by dynamic analysis as well as simulation. Ordering rules can be generated during dynamic analysis by statistically determining that two or more methods almost always execute in a certain order at run-time (4312), then this rule can be checked by simulation to detect if there are paths (which were not executed at run-time) on which the ordering rule can be violated (4313).

Externally Annotating JSR 305 in XML Format

According to an embodiment, there is provided a method for externally annotating JSR 305 in XML format wherein the problems to satisfy the requirements and the solutions are as described herein.

Problem:

JSR 305 is a Java standard which specifies annotations for defect detection which can be applied to program constructs including classes, methods, fields, parameters and local variables. However, it is a tedious and error-prone process to annotate large existing code-bases with these annotations.

Figure 44:
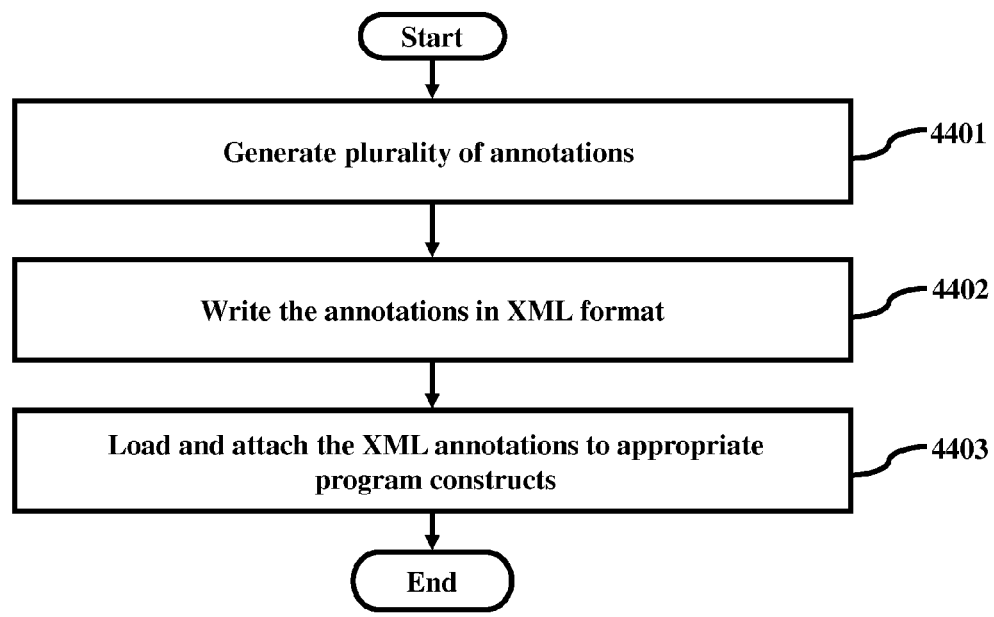
FIG. 44 illustrates a method to annotate JSR 305 externally in XML format according to an embodiment herein, and is a subflow detailing the step 743 and 749 in FIG. 7D.

Solution:

FIG. 44 illustrates a method to annotate JSR 305 externally in XML format according to a preferred embodiment, wherein the automatic rule generation algorithms described above generate several kinds of annotations including @Nullable and @NonNull automatically by simulating the code inside a method body (4401). These annotations are then written out either to an external rule file in XML format which associates annotations with corresponding program points (4402), or the source code is directly back-annotated with these assertions. Then during simulation, in addition to annotations obtained from the source code/binary code, these annotations from the XML file are loaded and attached to the appropriate program constructs (4403).

Incremental Simulation

According to an embodiment, there is provided a method for incremental simulation wherein the problems to satisfy the requirements and the solutions are as described herein.

Figure 45:
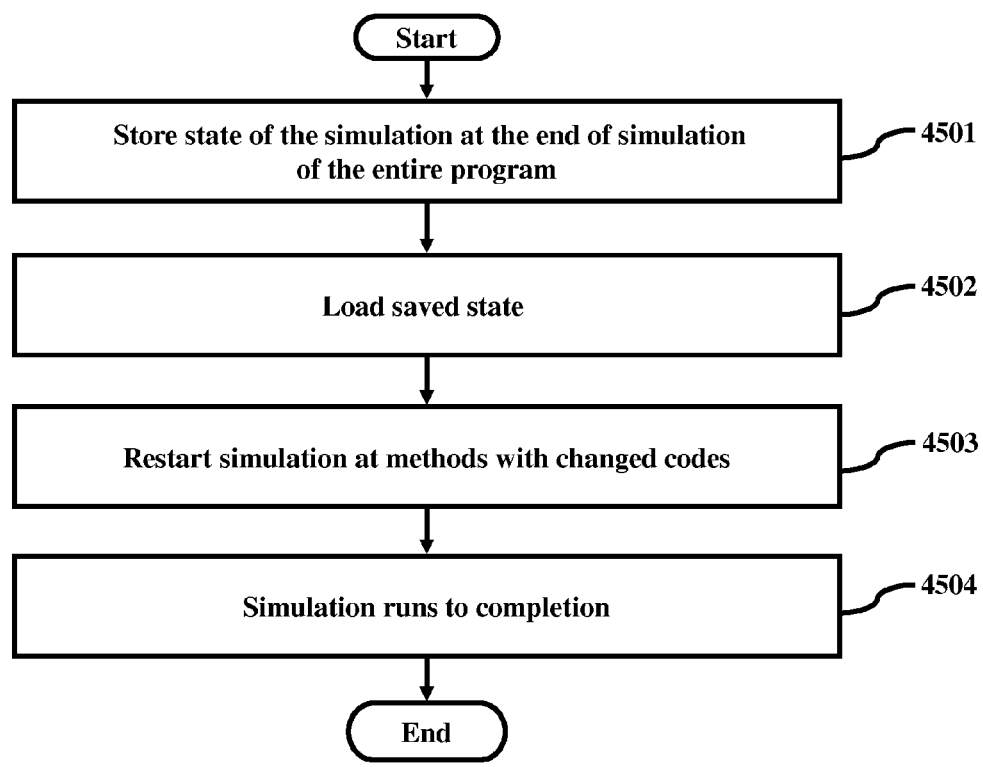
FIG. 45 illustrates the incremental simulation according to an embodiment herein, and is a subflow detailing the step 757 in FIG. 7E.

Problem:

For a large project, a complete simulation takes too much time (several hours) and requires a large amount of memory (several Gigabytes) which is only available on server computers. However, individual developers would like to run a quick simulation to check for errors in code that they have recently modified, before they commit the code changes to the code repository.
Solution:

FIG. 45 illustrates the incremental simulation according to a preferred embodiment which is fast and uses less memory. The state of the simulation at the end of simulation of the entire program is stored in a file in a compact external format (4501). For incremental simulation this saved state is loaded (4502) and the simulation is restarted at the methods whose code has changed (4503). The simulation then runs to completion as usual (4504), which can be very fast because only code paths which use values that were modified in the changed code need to be simulated, and the fixed-point of the iterative data-flow analysis algorithm is reached very quickly.

Presentation Techniques for Simulation Results

Figure 46:
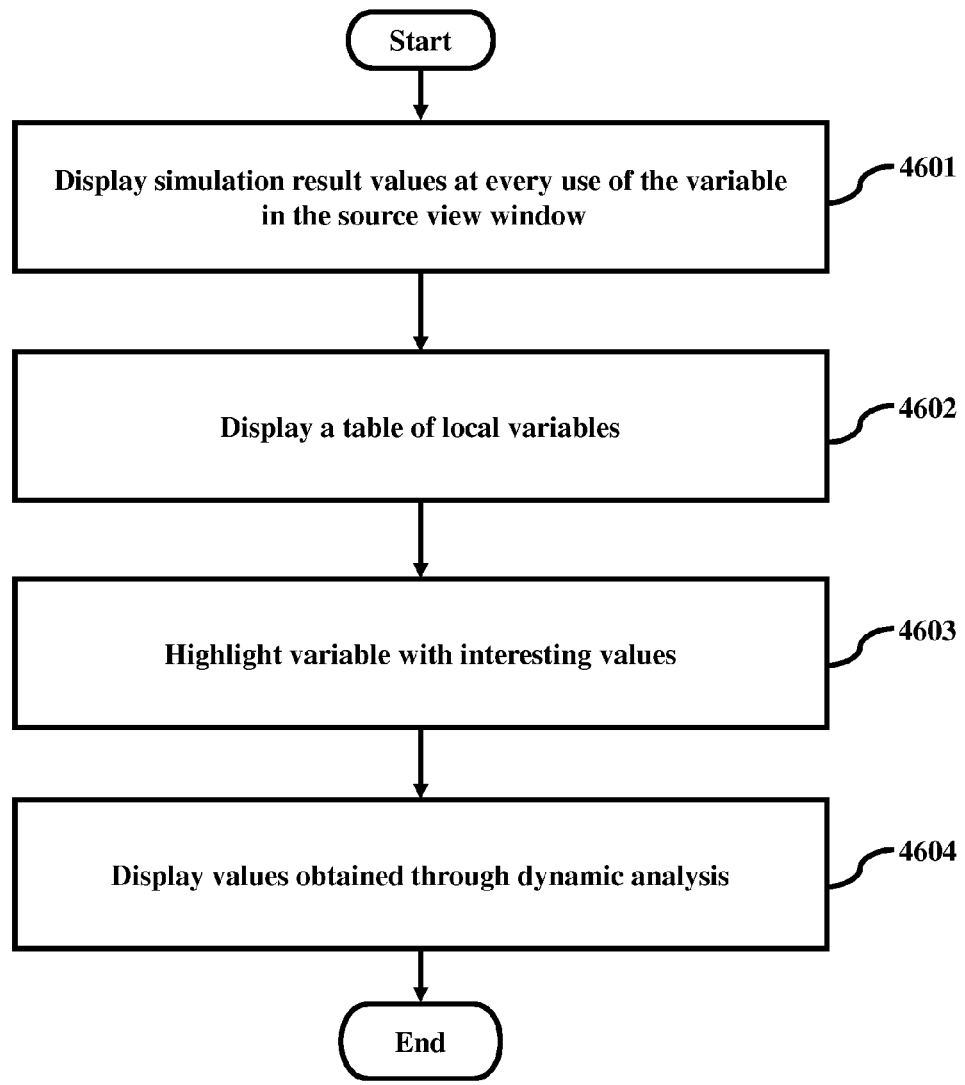
FIG. 46 illustrates a method to present simulation results according to an embodiment herein.

According to an embodiment, there is provided a method to present simulation results wherein the problems to satisfy the requirements and the solutions are as described herein.
Problem:

Presentation of simulation results to users in an intuitive way is necessary to improve developer productivity.
Solution:

FIG. 46 illustrates a method to present simulation results according to a preferred embodiment wherein the method allows simulation results to be displayed intuitively by showing all possible values of a variable (including local variables and object fields, array elements) which are computed during simulation, at all places where the variable is used (4601). The specific display technique that is easy to use is a pop-up on mouse-over (also called a tool-tip), when the user moves the mouse over a variable name in the Integrated Development Environment (IDE) source view window. In addition, a table of local variable values can be displayed with the ability to explore fields of object-typed variables (4602).

For primitive typed variable the set of values would include concrete primitive values and ranges. For object typed variables the set of values would include null, and known/unknown object instances with their type, allocation site node, and null-ness. Variables with particularly interesting values, e.g. Null, are highlighted using a specific color, e.g. red (4603).

The above information on variable values from simulation can be made more complete and accurate by including values obtained through dynamic analysis (4604).

The key advantage of displaying all possible values is that the user can quickly identify when a variable has unexpected values, understand where those values are coming from, and decide how to handle them correctly so that the program behaves reliably for all possible input values.

Automatically Fix Error Detected by Simulation

Figure 47:
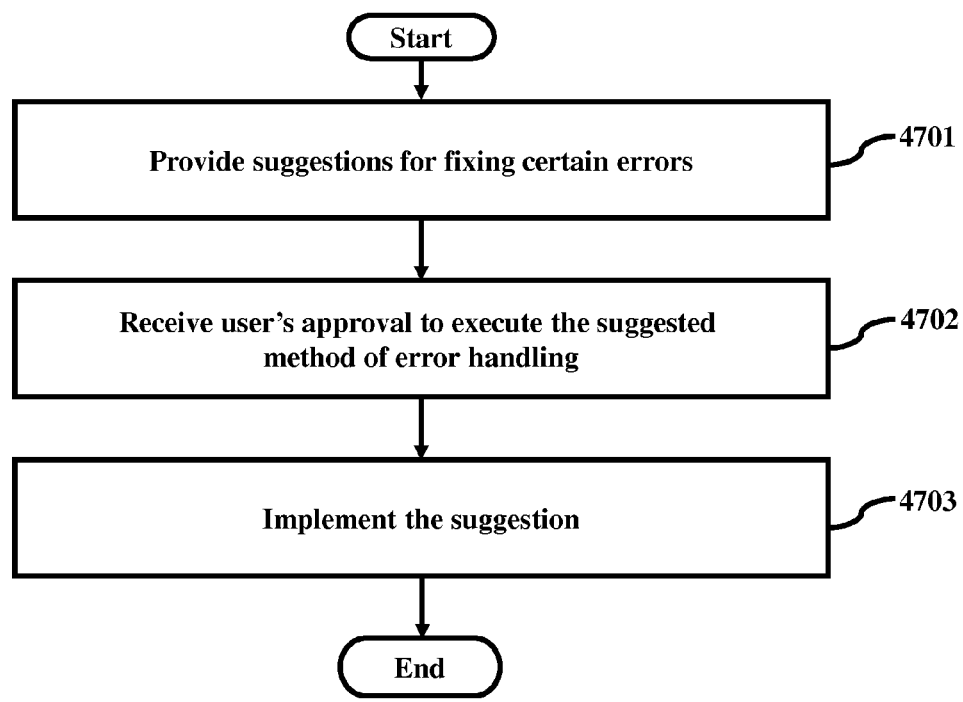
FIG. 47 illustrates a method to fix the errors detected by simulation automatically according to an embodiment herein.

According to an embodiment, there is provided a method to automatically fix error detected by simulation wherein the problems to satisfy the requirements and the solutions are as described herein.
Problem:

An easy way to fix errors identified during simulation is necessary to improve developer productivity.
Solution:

FIG. 47 illustrates a method to fix the errors detected by simulation automatically according to a preferred embodiment. Suggestions for fixing certain kinds of errors can be provided automatically (4701), and after obtaining the user's approval the code change (4702) can be implemented leveraging the refactoring features (4703) of current IDEs:

i. A NullPointerException can be avoided by introducing a null-check before the use of a potentially null pointer variable.

ii. A ClassCastException can be avoided by introducing an "instanceof" check before the use of the pointer variable.

iii. Security vulnerabilities: can be avoided by introducing a call to an input validation method which validates the values of Strings received from untrusted sources (e.g. from a network) before the String is used for security sensitive operations such as accessing files or querying databases or before inserting the String in a response message.

iv. Race conditions: Can be avoided by synchronizing on the object whose field read/write is not protected by adequate synchronization.

v. Pre-condition rule violations: for method call arguments can be avoided by checking the value of the argument before calling the method.

vi. Ordering rule violations: For Precede rules, a method call corresponding to the $1^{st}/2^{nd}$ missing z rule event can be inserted before the $2^{nd}/3^{rd}$ events. For Follow rules, a method call corresponding to the missing $2^{nd}/3^{rd}$ events can be added 0 after the $1^{St}/2^{nd}$ event. For Exact ordering rules a method call for the missing event needs to be added either before or after the existing event.

vii. Performance rules: Certain kinds of performance errors such as using new String("ABC") [in place of just "ABC"] can be automatically corrected using the equivalent but higher-performance idiom.

Applications of Simulation for Code Assessment, Maintenance, and Migration

Figure 48:
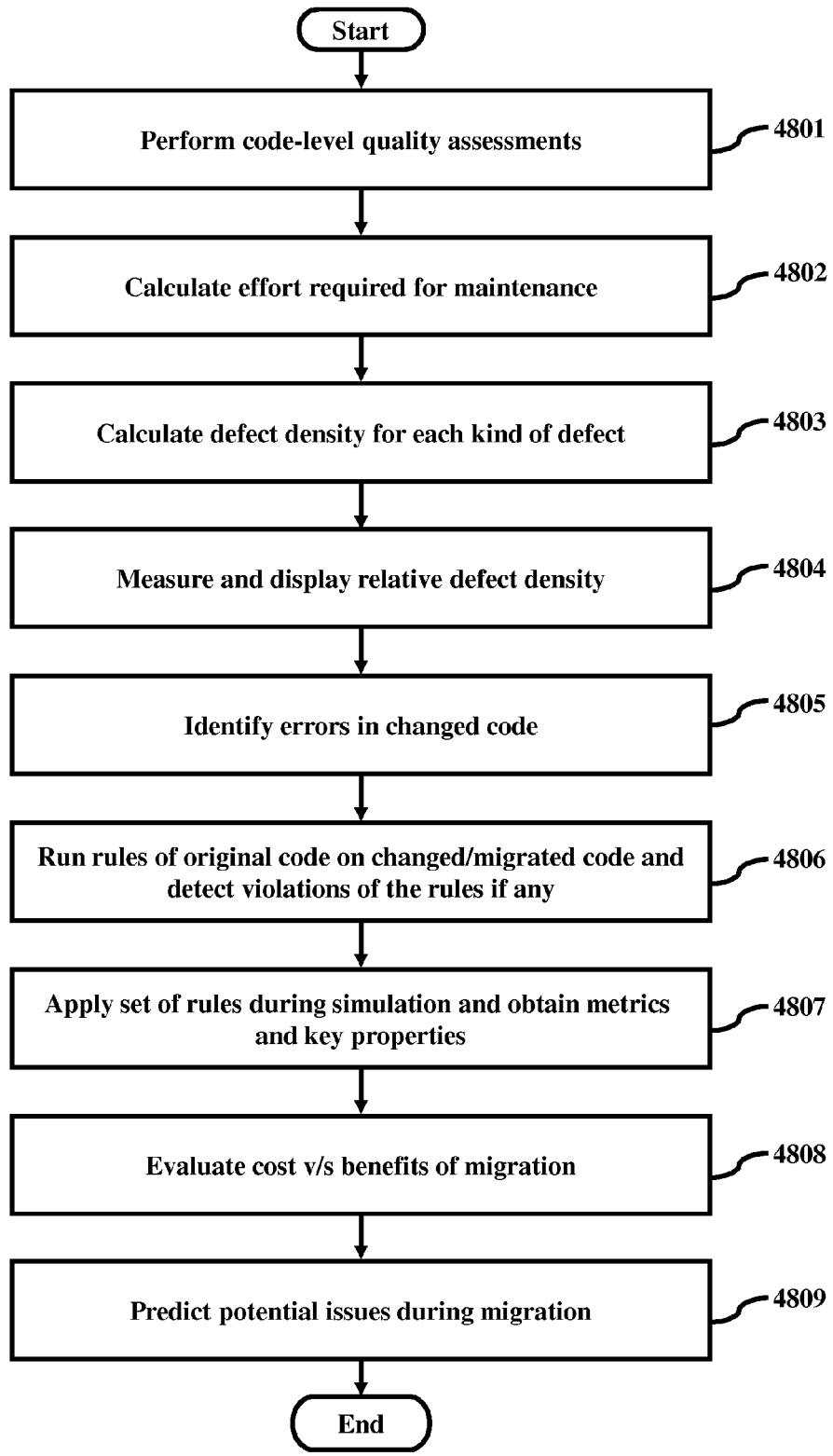
FIG. 48 illustrates the application of simulation for assisting code assessment, migration and maintenance activities according to an embodiment herein.

According to an embodiment, there is provided a method for applications of simulation for code assessment, maintenance, and migration wherein the problems to satisfy the requirements and the solutions are as described herein.
Problem:

Software maintenance involves making small changes to code to fix errors or add new features. Often maintenance is done by engineers who are not the original developers and do not know the design and rules for the code base being maintained, and thus introduce new errors into the code-base. In addition, application maintenance often requires migrating legacy applications to newer and more efficient architectures, however the maintenance team lacks metrics and insight into the properties of the legacy code which can be used to evaluate the cost v/s benefits of the migration and ensure that the application works correctly post-migration.
Solution:

FIG. 48 illustrates the application of simulation for assisting code assessment, migration and maintenance activities according to a preferred embodiment wherein the method allows the use of simulation for the activities in several ways:

i. Code-level quality assessments can be performed quickly using defects detected by software simulation (4801). A manual code-reviewer can typically review not more than about 1000 lines of code per day. In contrast, using software simulation, 20,000-100,000 lines of code can be reviewed quickly and efficiently by one person in a day. This is because software simulation directly points out defects in the code (which the code reviewer is looking for) and does not waste the person's time on the bulk of the code which is correct.

ii. The effort required for maintenance can be estimated accurately by obtaining metrics about the code base by simulation (4802), in particular the number and kinds of defects already existing in the code, and thus calculating a defect density (e.g. number of defects per 1000 lines of code) for each kind of defect (4803). A relative defect density measure which compares a new codebase against existing codebases is also useful to determine if the maintenance effort is more or less than previously done projects (4804).

iii. When code changes are made, change analysis is critical to avoid introducing new errors into code. This can be done by running a simulation on the original code and the changed code and identifying if any new errors were reported in the simulation of the changed code (4805).

iv. If the original code included a set of rules which were applied to that code by the original development team, then those rules can be run on the changed/migrated code after every change to detect if there were any regressions which violated the rules (4806).

v. Another technique is to generate rules at interface boundaries using the automatic rule generation feature on the changed/migrated codebase and differencing the new rules with the original rules. E.g. If a pre-condition rule for a method has become stronger in the changed codebase, it implies that a pre-existing client using the method may fail because it provided an input value which was acceptable to the original method but rejected by the newly changed method.

vi. A set of rules can be applied during simulation which collect metrics about the code as well as obtain key properties of the code such as dependencies on other modules and specific features and modes of execution used (4807). This can be used to evaluate the cost v/s benefits of migration in an accurate way (4808), and also predict potential issues which may arise during migration if the new target architecture does not support all the features or modes of execution required by the legacy application (4809).

Application of Simulation for Detecting Errors in a Service Oriented Architecture According to an embodiment, there is provided a method for applications of simulation for detecting errors in a Service Oriented Architecture wherein the problems to satisfy the requirements and the solutions are as described herein.

Problem:

Modern Service Oriented Architectures (SOA) consists of independent services which cooperate to implement a business process. Testing such collections of services independently as well as together in an assembly is difficult.

Figure 49:
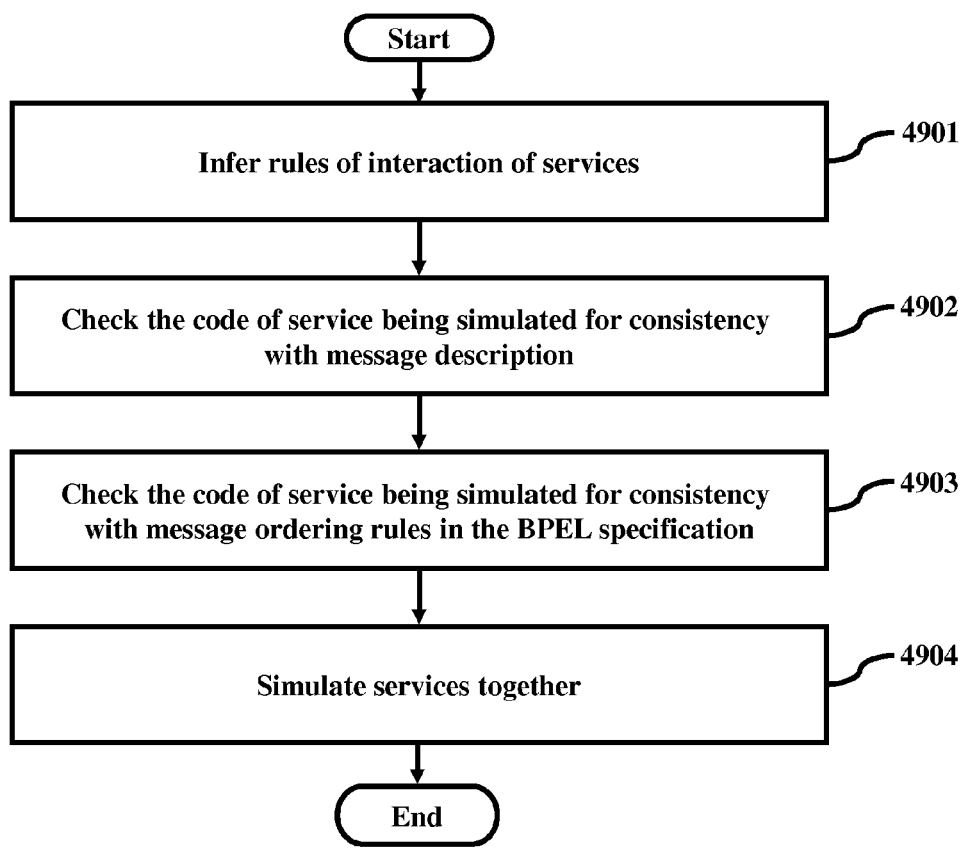
FIG. 49 illustrates a method for applications of simulation for detecting errors in a Service Oriented Architecture according to an embodiment herein.

Solution:

FIG. 49 illustrates a method according to a preferred embodiment, wherein a service which depends on other services can be simulated independent of the other services to detect errors in the service (it is often not possible to actually execute such a service hence testing it is difficult or impossible). The usual rules of programming can be applied to each service independently. In addition the rules of interaction of the service with other services that send messages to or receive messages from the service being simulated can be inferred from the service descriptions in the Web Services Description Language (WSDL) and the business process descriptions in the Business Process Execution Language (BPEL) (4901). Specifically, the structure and types of content values of messages exchanged with other services is specified in the WSDL description and can be used to check the code of the service being simulated for consistency with the message descriptions (4902). The ordering of messages exchanged between services as part of a business process is specified in the BPEL abstract process or executable process description and can be used to check the code of the service being simulated for consistency with the BPEL specification (4903).

Services can be simulated together with other services in the SOA using inter-procedural data-flow analysis described previously (4904). This allows errors due to the interactions of different services to be detected, e.g. if a service sends information to other services on specific code paths, which are not acceptable to the other services.

Application of Simulation for Detecting Errors in SQL Queries

According to an embodiment, there is provided a method for applications of simulation for detecting errors in SQL queries wherein the problems to satisfy the requirements and the solutions are as described herein.

Problem:

Many applications errors occur in the course of accessing a database. Typically, the code to access the database is in SQL, and this code is dynamically assembled at runtime by the application and then run against the database. Any errors in this code (either in terms of syntactic or semantic correctness or performance) are detected only at runtime.

Figure 50:
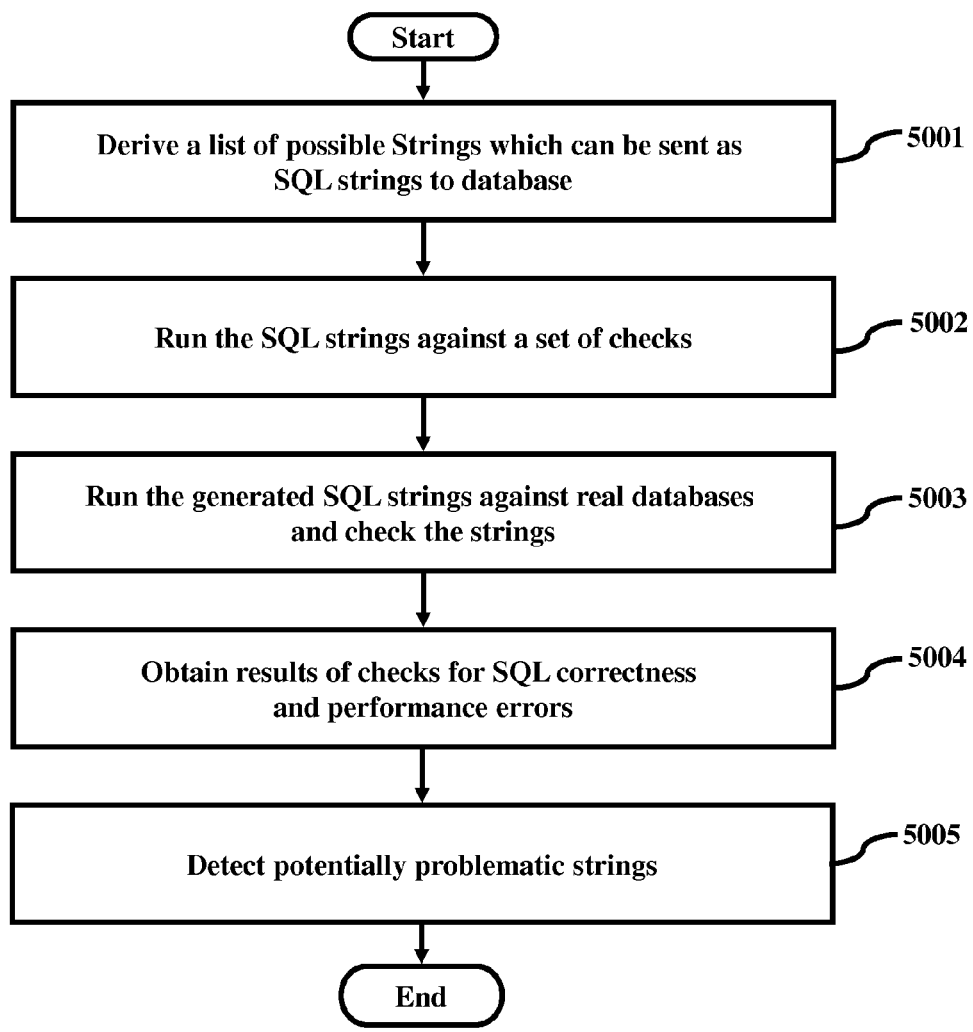
FIG. 50 illustrates a method for applications of simulation for detecting errors in SQL queries according to an embodiment herein, and is a subflow detailing the step 759 in FIG. 7E.

Solution:

FIG. 50 illustrates a method for applications of simulation for detecting errors in SQL queries according to a preferred embodiment. A list of all possible Strings which can be generated along various program paths and sent as SQL strings to the database by using the simulation approach (5001). Each possible SQL string is run against a set of "SQL wellness" checks against these strings thereby the incorrect or poorly performing queries can be identified before actually running the program (5002).

These SQL wellness checks include generic SQL checks as well as checks specific to the database being accessed wherein a running database is accessed and the database schema and indexes are extracted and written into a format which can be understood by the wellness rules. According to this embodiment, the user need not specify the structure of the application's database.

The SQL wellness checks include rules like the following:
i. checks for SQL syntactic correctness
ii. checks for correct types of SQL data entities and consistency in naming of tables, columns, number of parameters, etc.
iii. Many checks for performance, such as: a query causes full table scans because of lack of index on the appropriate column (e.g. in where clauses).

The SQL strings generated by running them against a real database, typically a replicated or dummy copy of the original database are checked (5003). The databases or tools associated with them have checks for SQL correctness and performance errors (5004), and these results are used to detect strings which may be potentially problematic at runtime (5005).

In many cases, it is not possible to know the value of a SQL string completely because the string may be assembled from multiple sources, including unknown data values available only at runtime. Embodiments herein provide to coerce the unknown data value to a don't care value such as "?". Since the SQL wellness checks are usually related to the structure of the SQL query and not the precise data values, the effect of inserting a don't care value has no effect on the result of the check, but it allows us to get the results even without completely knowing the actual query.

Further, similar wellness checks are applied to other popular query languages, including HQL (Hibernate Query Language) and EJBQL (Enterprise JavaBeans Query Language); only the precise syntax of the language is different.

Simulating Javascript Programs

According to an embodiment, there is provided a method for Simulating Javascript programs wherein the problems to satisfy the requirements and the solutions are as described herein.

Problem:

Javascript is a very popular programming language which is used in client-side web applications. It has some constructs which are different from Java and need special handling during simulation.

Solution:

The specific constructs of Javascript which need new algorithms are described below.

Global variables: these are variables which can be accessed by any function. These are mapped to static fields of the script class which is internally created by the simulator for each Javascript source file.

Constructor functions: these are functions which are called using the "new" operator which create Javascript objects. Since Javascript does not have the concept of a class, each such constructor function is represented internally during simulation as a class with a constructor, which delegates to the method of the same name in the script class.

Prototype based objects: Javascript has the concept of prototypes which allows objects to effectively inherit fields from another object. This is supported by adding 2 artificial fields: ConstructorFunction.prototype which is a static field holding the prototype object for a ConstructorFunction, and _proto_ which is a non-static instance field in every Javascript object which is initialize to the ConstructorFunction.prototype for that object. Then during simulation, if the value of object.field is Unknown for any field, the simulator attempts to get the value as object.proto.field, and if that is not available then object.proto.proto.field etc. Thus the prototype chain is followed as far as possible to allow objects to inherit fields from their prototypes.

Function pointers: Each Javascript function is represented by the simulator as a class of the same name (in addition to the function in the script class). Also, a global static variable of the same name as the function is added to the script class, and initialized to have the value of the function class. (ScriptClass.FunctionName=FunctionName.class;). Thus function pointers to which a function name is assigned (functionPtrVariable=FunctionName;) are effectively assigned the function class. At the end of parsing the script code, for all unresolved method calls, the method name is set to null, which indicates a function pointer call. A function pointer call of the form "obj.functionField( );" is transformed to "obj.functionField.null( )". Then during simulation, on reaching a method call whose method name is null, the callee object values are obtained which provide the possible run-time values of the function class. Then method calls are generated to all those functions, and those method calls are simulated as usual. This allows the dynamic selection of the method to be called during simulation.

Figure 51:
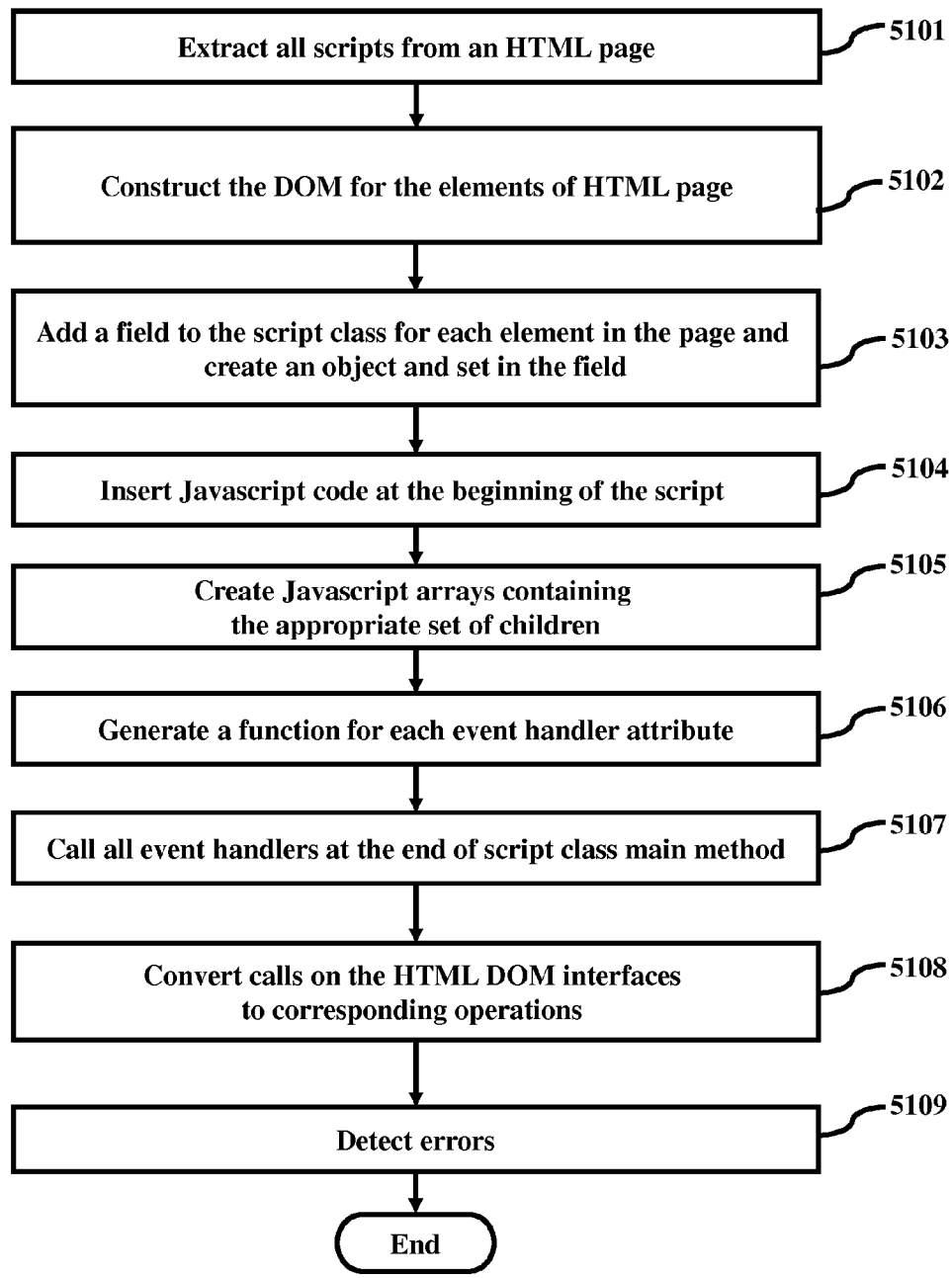
FIG. 51 illustrates a method for modeling a HTML page according to an embodiment herein.

Support for access to the HTML page DOM: Since most Javascript scripts are embedded in HTML web pages and perform operations which get/set/change the contents of the HTML page, it is necessary to model the HTML page accurately. FIG. 51 illustrates modeling of HTML page according to a preferred embodiment wherein the simulator first extracts all scripts from an HTML page (5101), including the event handlers (onclick etc). The DOM (Document Object Model) for the HTML page's elements is then constructed (5102) and for each element in the page, a field is added to the script class and an object is created and set in that field (5103). The simulator then inserts Javascript code at the beginning of the script to construct the page DOM tree by setting fields of each element object, e.g. "parentNode.childField=childNode;" (5104). Fields of type HTMLCollection are created as Javascript arrays containing the appropriate set of children (5105). For each event handler attribute, a function is generated, e.g. "elementId_onclick( )") (5106), and at the end of the script class main method, all the event handlers are called to ensure that their code gets simulated (5107). Finally all get/set calls on the HTML DOM interfaces are converted to read/write operations on the corresponding field (5108). The above support for the HTML page DOM enables detection of errors because of inconsistencies between the HTML page element structures and the embedded Javascript code which accesses the page structure (5109).

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments herein may include a system comprising at least one processor or central processing unit (CPU). The CPUs may be interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein. The system may further include a user interface adapter that connects a keyboard, mouse, speaker, microphone, and/or other user interface devices such as a touch screen device to the bus to gather user input. Additionally, a communication adapter connects the bus to a data processing network, and a display adapter connects the bus to a display device which may be embodied as an output device such as a monitor, printer, or transmitter, for example.

The foregoing description of the specific embodiments will so fully reveal the general nature of the embodiments herein that others can, by applying current knowledge, readily modify and/or adapt for various programming languages and applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of software simulation of a target software without actually running or testing the target software, the method comprising the steps of: reading a first set of configuration files that contain details of the code to be simulated, the simulation parameters, and output format; reading a second set of configuration files that contain details of the rules to be applied to the code being simulated; loading rules which describe the expected behavior of the software, the rules being loaded from said configuration files; reading said target software program code; constructing a program model, which is a memory representation of program structure of the target software; attaching the loaded rules to specific nodes in the program model in accordance with the rules; running a plurality of simulation algorithms on the target software program without running the target software, to check for defects and obtain metrics and other attributes of the target software code, wherein running the plurality of simulation algorithms on said target software program comprises determining context sensitivity and data structures, upon completion of operation processes values of variable from multiple caller methods, generating an output with defects and other results reported by the plurality of algorithms; and displaying the output on an interface.

2. The method of software simulation as in claim 1, where said target software program code is target software source code.

3. The method of software simulation as in claim 1, where said target software program code is target software binary code.

4. The method of software simulation as in claim 1, wherein generating a defect report comprises of prioritization and path generation for each defect as follows:
assigning priority to a bug according to specifications of each match element, if field value matches a predefined pattern;
assigning default priority, if field value does not match a predefined pattern;
associating a source node with each value object;
storing source node information in error records and display said source node information on an user interface; and
storing Simulation Call Graph (SCG), dynamically computing path and displaying said computed path on an user interface.

5. The method of software simulation as in claim 1, wherein generating a defect report comprises of matching defects with entries in an input defects file which may have been created by simulating a different version of the code, if said input defects file is provided, as follows:
storing in the defects file the line number of error relative to the line number of the beginning of the method code;
generating unique fingerprint for node where said error happened; and
storing the unique fingerprint in the defects file.

6. The method of software simulation as in claim 1, wherein running plurality of algorithms on said target software program further comprises of:
loading program variables and objects from the program model to be used for performing arithmetic, logical and pointer operations as specified in the source code of the target software;
performing the operations on input values and computing the result;
storing resulting values in the program model;
applying language specific rules to check for any violations;
invoking rules loaded from the configuration files; and
reporting defects on program structure and variable values violating the requirements of the rules.

7. The method of software simulation as in claim 1, where running plurality of algorithms on said target software program comprises of performing inter-procedural simulation if operation involves a method wherein the method involves a single or a plurality of methods for entry, exit, call, or branch point or join point of code paths, wherein handling the inter-procedural simulation in presence of inheritance, cycles in the flow graph, and recursive cycles further comprises of: constructing a Simulation Call Graph (SCG) containing Method Flow Graph (MFG); executing an iterative algorithm to simulate flow of data values in said SCG; performing a modified topological traversal over said SCG; executing a method body node; executing MFG for code in method body in program flow order; pushing a branch point BasicBlock on a stack of ready branches, if a node is a branch point; simulating one path from said branch, if a node is a branch point; continuing simulation with join BasicBlock Code wherein predecessors of join point Basic Block are reached if the node is a joint point; simulating ready path from ready branches stack wherein the predecessors of join point Basic Block are not reached if the node is a joint point; simulating callee method bodies, if a node is a method call; simulating the caller method body's execution blocks if the node is a method call; adding callee method to a blocked method set, if all callers of callee method body are not reached; switching path context, if all callers of callee method body are not reached; simulating the method body, if all callers of callee method body is reached; simulating available paths if any path is found for simulation; executing a method from the Blocked methods wherein said Blocked methods are set to break a deadlock, if any path is not found for simulation; picking a first method from sorted blocked method set, if any path is not found for simulation; simulating the body of said sorted blocked method set, if any path is not found for simulation; maintaining a Simulation started status for a method; flowing data values into method from caller wherein the caller is a recursive caller if the SimulationStarted status is true; flowing data values out of method from caller wherein the caller is a recursive caller if the SimulationStarted status is true; flowing the data values into method to caller wherein the caller is a recursive caller if the SimulationStarted status is true; flowing the data values out of method to caller wherein the caller is a recursive caller if the SimulationStarted status is true; continuing simulation after flowing of said data; blocking the caller if said caller is not a recusive caller wherein the SimulationStarted status is true; flowing the data values into method from caller wherein the method has completed simulation; flowing the data values out of method from caller wherein the method has completed simulation; flowing the data values into method to caller wherein the method has completed simulation; flowing the data values out of method to caller the method has completed simulation; and executing the MFG of the method wherein all callers are reached.

8. The method of software simulation as in claim 1, where running plurality of algorithms on said target software program comprises of determining inter-method flow path relationship, if the operation requires to determine inter-method flow path relationships, wherein determining inter-method flow path relationship between a first BasicBlock B1 and a second BasicBlock B1 further comprises of:
determining B2 as a flow-predecessor of B1 if B2Method is an ancestor of B1Method and B2 is a flow-predecessor of call site in B2Method;
determining B2 as a flow-predecessor of B1 if B1Method is an ancestor of B2Method and call site in B1Method leading to B2Method is a flow-predecessor of B2;
determining B2 as a flow-predecessor of B1 if B1Method and B2Method have a common ancestor method and call site leading to B2Method is a flow predecessor of call site leading to B1Method; and
determining B2 as not a flow-predecessor of B1 if said B2 is not determined as a flow-predecessor.

9. The method of software simulation as in claim 1, wherein determining context sensitivity and data structures further comprises of: using a context graph to represent calling contexts reaching a method body in Simulation Call Graph (SCG; representing values of a variable representing a memory location by a ValueMap; associating different values by caller's context graph in said ValueMap if the value of variables reaching from multiple callers are same; distinguishing different values by said caller's context graph if the value of variables reaching from multiple callers are different; and using union of context graphs as the context graph for value of variable wherein the value of variable reaching from multiple callers are different.

10. The method of software simulation as in claim 1, where running plurality of algorithms on said target software program comprises of determining accurate Reaching Defs and data structures, if the operation requires values of program variables and object fields, wherein determining reaching defs and data structures further comprises of: creating multiple Defs using Def cloning method; creating artificial Defs at call-sites and join points; computing value at artificial Def by creating a union of values of incoming Defs; adding an unknown value to value at an artificial Def if there is no incoming Def on all incoming paths; storing computed values at artificial Defs in memory sensitive manner; getting remaining values from previous Reaching Defs if real Def does not have a value for all required calling contacts; storing reaching Defs in Basic Block in DefMap if real Def has a value for all required calling contexts; restricting upward flow of Defs in a Simulation Call Graph (SCG) from a method body to callers; restricting number of Defs flowing downwards through said SCG from a caller method to callee method bodies; storing said Defs across fixed-point iterations at call-site BasicBlocks; computing reaching values for a variable from reaching Defs if said BasicBlock contains Def; computing reaching values for a variable from reaching Defs if Def is in Start BasicBlock for the use method and if said BasicBlock does not comprise of said Def; checking call site BasicBlocks for each caller of said use method; performing an upward check for Def in said SCG; and computing reaching values for a variable from said reaching Defs.

11. The method of software simulation as in claim 1, where running plurality of algorithms on said target software program comprises of restricting values of variable at conditional jump, if the operation is a conditional jump, wherein restricting values of variable at conditional jumps comprises of: inserting a Special Assert Node in a Method Flow Graph (MFG) for each path from a conditional jump; obtaining input values of variables restricted by conditional expression; executing conditional expression for each input value; adding values with true conditional expression to output values; creating a Def at Special Assert Node; and providing restricted values to variable uses after said Special Assert Node.

12. The method of software simulation as in claim 1, where running plurality of algorithms on said target software program comprises of determining path sensitivity, if the operation uses a variable whose values are related to other variables, wherein determining path sensitivity between two related variables, comprises of:
using values of a second variable mapping to feasible values of first variable;
finding all real reaching Defs of second variable at use node;
pruning real reaching Defs to feasible Defs; and
providing pruned set of feasible Defs to reaching values algorithm.

13. The method of software simulation as in claim 12, wherein the reaching values algorithm further comprises of combining values of real defs at roots of artificial Defs graph to compute reaching values of said second variable at use.

14. The method of software simulation as in claim 1, where running plurality of algorithms on said target software program comprises of determining relation sensitivity, if the operation uses a variable whose values are related to other variables, wherein determining relationship sensitivity between two variables comprises of:
creating a Def for a first variable containing Exact Relational Value of second variable;
creating a Def for a second variable containing an Exact Relational Value of first variable;
removing Exact Relational Value of said second variable from Def of said first variable at Special Assert if reaching values of said second variable does not contain Exact Relational Value of said first variable; and
adding Def for restricted values for said second variable if reaching values of said second variable contains Exact Relational Value of said first variable.

15. The method of software simulation as in claim 1, where running plurality of algorithms on said target software program comprises of detecting deadlock, if the operation is a synchronization or lock operation, wherein detection of deadlock further comprises of:
creating a lock graph whose nodes are objects;
creating an edge from a first node to a second node, where said first node is blocked before said second node;
creating a locked object global variable to store last object locked;
updating said locked object variable at entry and exit of synchronized block/method;
adding edges in lock order graph from previously locked objects to objects being locked; and
reporting a deadlock if there is a cycle in lock graph.

16. The method of software simulation as in claim 1, where running plurality of algorithms on said target software program comprises of detecting race condition, if the operation is a global object field read, write or access to classes/methods is marked with a concurrency annotation; where detection of race condition further comprises of:
- determining if a global variable has escaped;
- checking existence of adequate locks to protect said variable access;
- ensuring that only one thread can access said variable at a time; and
- reporting a race condition bug, if there are not adequate locks.

17. The method of software simulation as in claim 1, wherein determining if a global variable has escaped further comprises checking if at least one of following three conditions is true:
- if said variable is a static field;
- if said variable is has escaped flag set as true;
- if ValueMap of said variable is escaped and if containing object of said variable is escaped;
- if neither of the above three conditions are true then the variable has not escaped.

18. The method of software simulation as in claim 1, where running plurality of algorithms on said target software program comprises of detecting redundant synchronization, if the operation is a global object field read, write or access to classes/methods is marked with a concurrency annotation, wherein detection of redundant synchronization upon detection of race condition further comprises of:
- checking if all synchronization nodes being marked as necessary synchronizations; and
- reporting a redundant synchronization defect, if all synchronization nodes are not marked as necessary synchronizations.

19. The method of software simulation as in claim 1, where running plurality of algorithms on said target software program comprises of enforcing ordering rule, if the operation has an attached ordering rule, wherein ordering rule algorithms further comprises of: setting and getting rule states on associated objects; creating ordering rules for arbitrary state machine specifications; adding custom fields to arbitrary objects to hold rule state; constructing a custom state-machine using rule state; attaching ordering rule to all nodes in a Method Flow Graph (MFG) specified by rule event specification; tracking state of the state of rule across events in a context sensitive manner; setting state in the field of a single global object, if there is no bound variable; associating state with bound variable's referred objects; propagating state through a Simulation Call Graph (SCG) and the MFG; tracking rule state for wrapper objects; setting rule state on the appropriate branch from conditional jump; reporting defect, if a specific value is not associated with each event; and checking state of all objects at the exit nodes of the SCG for Follow/Order rules; and reporting defect if states are correct.

20. The method of software simulation as in claim 1, where running plurality of algorithms on said target software program comprises of modeling precise object types to handle multiple callee methods at virtual method calls, if the operation uses or creates objects whose precise type is unknown, wherein precise modeling of object types and handling multiple callee methods at virtual method calls further comprises of: setting artificial type field for unknown object values; propagating type fields values flow- and context-sensitively across a Simulation Call Graph (SCG) and a Method Flow Graph (MFG); using type from reaching Def, if there is a reaching Def of said type field at any point; using object value's type from allocation site; computing expression from sub-expressions contained by in said expression, if the type of said expression is unknown; restricting methods called at call sites; obtaining object values for callee objects; creating a set of callee types from types of object values; restricting callee types using compile-time type of callee method and callee expression; performing a search to find concrete method body; and calling concrete method bodies at method call site.

21. The method of software simulation as in claim 1, where running plurality of algorithms on said target software program comprises of modeling precise object types to handle multiple callee methods at virtual method calls, if the operation uses or creates objects whose precise type is unknown, wherein precise modeling of object types and handling multiple callee methods at virtual method calls further comprises of:
- setting artificial type field for unknown object values;
- propagating type fields values flow- and context-sensitively across SCG and MFG;
- using type from reaching Def, if there is a reaching Def of said type field at any point;
- using object value's type from allocation site;
- computing expression from sub-expressions contained by in said expression, if the type of said expression is unknown;
- restricting methods called at call sites;
- obtaining object values for callee objects;
- creating a set of callee types from types of object values;
- restricting callee types using compile-time type of callee method and callee expression;
- performing a search to find concrete method body; and
- calling concrete method bodies at method call site.

22. The method of software simulation as in claim 1, where running plurality of algorithms on said target software program comprises of modeling arrays as associative arrays, if the operation uses or creates arrays or array elements, wherein array modeling as associative arrays further comprises of:
- modeling an array as an associative array;
- storing elements of array in fields of array object;
- using ALL-ELEMENTS field to store the union of values of all array elements;
- using default value if no accurate reaching values are available for an element;
- using field names for concrete integer indexes for a program with concrete literal integer indexes;
- obtaining accurate value of elements read or written using concrete literal integer indexes;
- using field names for local variables used to index said array; and
- obtaining accurate values of elements within a local method scope or loop scope.

23. The method of software simulation as in claim 1, where running plurality of algorithms on said target software program comprises of modeling collections using generics, if the operation invokes method calls on Collection objects, wherein modeling collection using generics further comprises of:
- modeling sets as a single memory location;
- modeling methods by removing parameter values from the values of generic fields, if the method is a remove method;
- processing every method by creating union of values of parameters with generic field;
- modeling methods of collection with return value of generic element type;
- modeling Lists as arrays;
- modeling maps as objects with fields;
- adding a field to object value of Map for each key;
- converting put operation on a map to write;
- converting get operation on a map to read;

writing a default key/value field with a generic type name for said key/value; and modeling iterators.

24. The method of software simulation as in claim 1, where running plurality of algorithms on said target software program comprises of performing intra-procedural exception handling, if the operation throws exceptions or executes an exception handler, catch or finally block or invoke method calls which may throw exceptions, wherein intra-procedural exception handling further comprises of:

obtaining type for an exception object thrown;

obtaining exception handler, catch or finally block for said exception type from throw statement's exception map;

selecting exception map entry with exception handler, catch or finally block's exception type same as or super class of throw statements exception type;

reaching Defs from throw BasicBlock are flowed to an exception handler, catch or finally block, if a it is found; and merging exception object values into exception values stored in the exception handler, catch or finally block's variable, if it is found.

25. The method of software simulation as in claim 1, where running plurality of algorithms on said target software program comprises of performing inter-procedural exception handling, if the operation throws exceptions or executes a exception handler, catch or finally block or invoke method calls which may throw exceptions, wherein inter-procedural exception handling further comprises of:

obtaining type for an exception object thrown;

obtaining exception handler, catch or finally block for said exception type from throw statement's exception map;

selecting an exception map entry with exception handler, catch or finally block's exception type same as or super class of throw statements exception type, wherein when a exception handler, catch or finally block is found in callee method, the method further comprises of:

flowing reaching Defs from throw BasicBlock back to the exception handler, catch or finally block; and merging exception object values into the exception values stored in the exception handler, catch or finally block's variable, wherein when a exception handler, catch or finally block is not found in callee method, the method further comprises of:

adding a throw statement to Uncaught Exception Map of caller's method call expression;

processing uncaught exception map for method call after call completes; and connecting exceptions thrown by callee methods to exception handler, catch or finally blocks in caller method, and wherein when a exception handler, catch or finally block is found in caller method, the method further comprises of:

adding throw statements from callee methods to uncaught exceptions map of caller of the caller method; and continuing bubbling up exception throws until entry point of simulation.

26. The method of software simulation as in claim 1, where running plurality of algorithms on said target software program comprises of handling method calls for inline method body, if the operation involves a method call whose callee method may be inlined, wherein method body inlining further comprises of: selecting method call sites for inlining; creating a branch point and a join point at a method call site; creating a inlined start and inlined exit BasicBlock for callee methods; cloning a Method Flow Graph (MFG) for body of each callee method; attaching body between inlined start and inlined exit BasicBlocks; replacing callee method return statements with a local variable assignment; using local variable in caller method in place of return value of method call; and setting actual parameters from method call site into the local variable of inlined method body.

27. The method of software simulation as in claim 1, where running plurality of algorithms on said target software program comprises of computing expressions, if the operation is an arithmetic, logical, comparison or assignment operation, wherein computing expressions further comprises of:

computing result value for operand values corresponding to same calling context;

computing operation on values in corresponding operand value sets for same calling context, if the context graphs overlap; and storing resulting value set in associated value map with intersection context graph, if the context graphs overlap.

28. The method of software simulation as in claim 27, wherein computing expressions further comprises of:

computing operand values using an operand stack;

computing result value by applying unary, binary or ternary operator to operand value;

popping operands from the stack; and pushing result onto stack.

29. The method of software simulation as in claim 1, where running plurality of algorithms on said target software program comprises of performing redundant check and dead code detection, if the operation is a conditional jump, wherein redundant check and dead code detection further comprises of:

detecting redundant checks at special assert nodes;

determining a path headed by special assert node is dead path, if output values satisfy empty condition;

determining a path opposite of path headed by special assert node is dead path, if the output values are same as input values; and reporting error at redundant checks, if the output values are same as input values.

30. The method of software simulation as in claim 1, where running plurality of algorithms on said target software program comprises of handling looping constructs, if the operation is a looping construct, wherein handling loops further comprises of: marking loop header BasicBlocks; identifying loop exit BasicBlocks; simulating loop header; simulating loop body; simulating loop exit path; checking if right hand side (RHS) values are derived from same Def at left hand side (LHS) to identify iterator variables;

comparing old and new values of Def of iterator variable; adding an unknown value to iterators Def, if the value of iterator variable increasing or decreasing across iterations; adding a range value to Def, if the value of iterator variable is not increasing or decreasing across iterations; and processing loop condition at loop body to restrict iterator to loop bound.

31. The method of software simulation as in claim 1, where running plurality of algorithms on said target software program comprises of memo-izing, if the operation is the entry of a method body, wherein memo-ization further comprises of:

checking if a method is to be simulated, by checking at least the following conditions:

change in a parameter value, change in reaching Def of any of variables, change in return value of callee, and change in Def within any loop in said method; and using simulation results of previous iteration, if none of the said conditions is satisfied.

32. The method of software simulation as in claim 1, where running plurality of algorithms on said target software program comprises of performing interning, if the operation involves creating or comparing potentially duplicate data values, wherein when context graph or value set is being set in Def's value, interning further comprises of:
- associating "Frozen" state with Context Graph or ValueSet;
- replacing instance with existing canonical instance; and
- releasing new instance.

33. The method of software simulation as in claim 1, where running plurality of algorithms on said target software program comprises of a rules attachment framework, if the operation has attached rules, wherein rules attachment framework further comprises of:
- constructing a program model;
- reading all rules from all rule packs specified in project configuration;
- organizing rules by node type;
- executing a matching procedure between rules and program model nodes;
- traversing program model using a visitor pattern;
- obtaining set of rules applicable for node type of each node;
- pruning said set to satisfy requirements of each rule;
- attaching said set of rules to said program model node; and
- initiating simulation.

34. The method of software simulation as in claim 1, where running plurality of algorithms on said target software program comprises of designing value rules, if the operation has attached rules; wherein designing value rules further comprises of: using keyword "argN", if value of Nth argument of current expression is required; using keyword "this", if value of the callee object at a method call site is required; using keyword "node", if value of the current node is required; using keyword "rhs", if right hand side (RHS) value of an Assignment is required; and invoking Application Program Interface (APIs) from rule code.

35. The method of software simulation as in claim 1, where running plurality of algorithms on said target software program comprises of designing flag rule and applications, if the operation has attached rules which use flag values, wherein designing flag rule and applications further comprises of:
- getting and setting the values of flags on value maps for variable or expression values;
- setting multiple kinds of flags including but not limited to security taint flags by different rules;
- propagating flag values from operand values to result values during operations; and
- accumulating or performing custom operations on flag values from the input values at union operations or at join points.

36. The method of software simulation as in claim 1, where running plurality of algorithms on said target software program comprises of generating rules, if simulation configuration specifies rule generation, wherein generating rules further comprises of:
- generating @NonNull pre-condition annotation rule, if dereferenced parameter is Not checked for null value;
- generating a "parameter instanceof T" Precondition rule, if parameter is cast to type T without prior check if the parameter is an instance of type T; and
- generating a pre-condition rule which includes all conditional checks on path to exception, if method code is generating an exception and path to exception throw contains conditional checks.

37. The method of software simulation as in claim 1, where running plurality of algorithms on said target software program comprises of ordering rule generation, if simulation configuration specifies rule generation, wherein ordering rule generation between a first method and a second method further comprises of:
- checking if said first method is an initialization method;
- checking if said first method is a constructor;
- checking if said second method reads values of an object's private fields that are initialized in said first method without prior checks; and
- generating ordering rule between said first method and second method based on checked conditions.

38. The method of software simulation as in claim 1, where running plurality of algorithms on said target software program comprises of flowing the data values across multiple simulations, if the simulation configuration specifies a file containing a state from previous simulations, wherein flowing data across multiple simulations further comprises of:
- writing out values at boundaries of code being simulated;
- writing return values from entry point methods;
- writing values of fields of objects;
- reading values of parameters of entry point methods;
- reading return values of unknown callee methods at call sites; and
- using compact binary format for storing values and include source node for all values.

39. The method of software simulation as in claim 1, where running plurality of algorithms on said target software program comprises of using method summaries, if the simulation configuration specifies chunking and method summaries, wherein using method summary further comprises of:
- marking each parameter value with a dependency field to indicate dependency on input;
- adding operations with operands comprising of said dependency fields to dependency fields;
- retaining expressions that have operated on input parameters to create result value; and
- deleting other nodes from program model to produce method summary.

40. The method of software simulation as in claim 1, where running plurality of algorithms on said target software program comprises of using a combination of run-time dynamic analysis, testing and simulation, if the simulation configuration specifies the usage of testing and dynamic analysis, wherein using a combination of run-time dynamic analysis, testing and simulation further comprises of:
- executing program using concrete values and simulating program using unknown values and values set;
- executing methods which compute results only from input parameters, without global side effects;
- obtaining values of input parameters and unknown variables from run-time test executions;
- obtaining additional concrete values of input parameters for simulation using unit testing heuristics;
- obtaining additional concrete inputs values for simulation provided by user through configuration;
- correlating multiple inputs and results using calling contexts;
- applying rules separately for each input-result pair;
- generating new input sets of values or states by simulation, wherein said new input sets are used for white-box testing;
- creating a unified rule architecture for both simulation and testing;
- executing rule code during testing;
- storing and reporting results of rule execution;

generating ordering rules from run-time dynamic analysis; and checking ordering rules by simulation.

41. The method of software simulation as in claim 1, where running plurality of algorithms on said target software program comprises of framing rules for JSR 305 external annotations, if the operation has attached rules or if simulation configuration specifies rule generation wherein annotating Java Specific Request JSR 305 externally in Extensible Markup Language (XML) format further comprises: generating plurality of annotations; writing annotations in XML format; and loading and attaching XML annotations to appropriate program constructs.

42. The method of software simulation as in claim 1, running plurality of algorithms on said target software program comprises of performing incremental simulation, if the simulation configuration specifies incremental simulation, wherein incremental simulation further comprises of:
storing state of the simulation at end of simulation of entire program;
loading saved state;
restarting simulation at methods with changed codes; and
completing simulation.

43. The method of software simulation as in claim 1, wherein presenting simulation results further comprises of:
displaying simulation result values at every use of the variable in the source view window;
displaying a table of local variables;
highlighting variables with interesting values; and
displaying values obtained through dynamic analysis.

44. The method of software simulation as in claim 1, where running plurality of algorithms on said target software program comprises of fixing errors detected by simulation automatically wherein fixing errors detected by simulation automatically further comprises of:
providing suggestions for fixing identified errors;
receiving user's approval to execute the suggested method of error handling; and
fixing error by implementing said suggestions.

45. The method of software simulation as in claim 1, where running plurality of algorithms on said target software program comprises of assisting code assessment, migration and maintenance wherein assisting code assessment, migration and maintenance further comprises of:
performing code-level quality assessments;
calculating effort required for maintenance;
calculating defect density for each kind of defect;
measuring and displaying relative defect density;
identifying errors in changed code;
running rules of original code on changed or migrated code and detect violations of rules;
applying set of rules during simulation to obtain metrics and properties;
evaluating cost v/s benefit of migration; and
predicting potential issues during migration.

46. The method of software simulation as in claim 1, where running plurality of algorithms on said target software program comprises of simulating a service that depends on other services independent of said other services to detect errors in said service wherein simulating said further comprises: inferring rules of interaction of services; checking code of service being simulated for consistency with message description; checking code of service being simulated for consistency with message ordering rules in Business Process Execution Language (BPEL) specification; and simulating services together.

47. The method of software simulation as in claim 1, where running plurality of algorithms on said target software program comprises of applying simulation to detect errors in Structure Query Language (SQL) queries, if the simulation configuration specifies SQL query checking, wherein detecting errors in SQL queries further comprises of: deriving a list of possible Strings that can be sent as SQL strings to database; running SQL strings against a set of checks; running generated SQL strings against real databases and check the strings; obtaining results of checks for SQL correctness and performance errors; and detecting potentially problematic strings.

48. The method of software simulation as in claim 1, running plurality of algorithms on said target software program written in Javascript comprises of:
mapping global variables in Javascript to static fields of the script class generated for the Javascript source file;
representing each Javascript constructor function as a class whose constructor delegates to the method of same name in the script class;
modeling Javascript prototypes using artificial fields_ proto_ and prototype; and
modeling Javascript function pointers accurately using function class typed variables.

49. The method of software simulation as in claim 1, running plurality of algorithms on said target software program written in Javascript comprises of modeling Hyper Text Markup Language (HTML) pages, wherein modeling of a HTML page further comprises of: extracting all scripts from an HTML page; constructing Document Object Model (DOM) for elements of HTML page; adding a field to the script class for each element in said page and create an object and set in field; inserting Javascript code at beginning of the script; creating Javascript arrays containing appropriate set of children; generating a function for each event handler attribute; calling all event handlers at end of script class main method; converting calls on HTML DOM interfaces to corresponding operations; and detecting errors.

50. The method of software simulation as in claim 49, wherein processing a set of configuration files comprises of:
reading configuration for a plurality of projects;
identifying if one or more master projects are specified for each of said plurality of projects; and
execute algorithms for project configuration for each of projects that have one or more master projects specified, with inheritance from said one or more master projects.

51. The method of software simulation as in claim 50, wherein configuring projects with inheritance from master projects further comprises of:
configuring a project to extend a master project in configuration; and
specifying values in the project different from the corresponding master project.

52. A non-transitory program storage device readable by computer, tangibly embodying a program of instructions executable by said computer to perform a method of software simulation of a target software without actually running or testing the target software, the method comprising the steps of: reading a first set of configuration files that contain details of the code to be simulated, the simulation parameters, and output format; reading a second set of configuration files that contain details of the rules to be applied to the code being simulated; loading rules which describe the expected behavior of the software, the rules being loaded from said configuration files; reading said target software program code; constructing a program model, which is a memory representation of program structure of the target software; attaching the loaded rules to specific nodes in the program model in accordance with the rules; running a plurality of simulation algorithms on the target software program without running the target software, to check for defects and obtain metrics and other attributes of the target software code, wherein running the plurality of simulation algorithms on said target software program comprises determining context sensitivity and data structures, upon completion of operation processes values of variable from multiple caller methods, generating an output with defects and other results reported by the plurality of algorithms; and displaying the output on an interface.

* * * * *